(12) United States Patent
Brewer et al.

(10) Patent No.: US 12,450,854 B2
(45) Date of Patent: Oct. 21, 2025

(54) USER INTERFACES FOR CAPTURING MEDIA AND MANIPULATING VIRTUAL OBJECTS

(71) Applicant: Apple Inc., Cupertino, CA (US)

(72) Inventors: Anna L. Brewer, Santa Barbara, CA (US); Devin W. Chalmers, Oakland, CA (US); Allison W. Dryer, Tiburon, CA (US); Giancarlo Yerkes, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 137 days.

(21) Appl. No.: 18/370,363

(22) Filed: Sep. 19, 2023

(65) Prior Publication Data
US 2024/0104871 A1 Mar. 28, 2024

Related U.S. Application Data

(60) Provisional application No. 63/408,957, filed on Sep. 22, 2022.

(51) Int. Cl.
| | | |
|---|---|---|
| *G06T 19/20* | (2011.01) | |
| *G06T 5/50* | (2006.01) | |
| *G06T 7/70* | (2017.01) | |

(52) U.S. Cl.
CPC .............. *G06T 19/20* (2013.01); *G06T 5/50* (2013.01); *G06T 7/70* (2017.01); *G06T 2207/20221* (2013.01); *G06T 2219/2004* (2013.01)

(58) Field of Classification Search
CPC ........ G06F 1/1694; G06F 3/016; G06F 3/014; G06F 3/04815; G06F 1/1686; G06F 1/163; G06F 3/013; G06F 3/04845; G06F 3/0484; G06F 3/017; G06F 3/011; G06F 2200/1637; G06F 2200/1614; H04N 23/633; H04N 23/611; H04N 13/204; H04N 13/221; H04N 23/63; H04N 13/239; G06T 7/70; G06T 19/20; G06T 5/50; G06T 2207/20221; G06T 2219/2004; G06T 7/593; G06T 7/596; G06T 2200/24; G06V 10/141; G06V 10/17; G06V 20/00
See application file for complete search history.

(56) References Cited

U.S. PATENT DOCUMENTS

| | | |
|---|---|---|
| 5,664,133 A | 9/1997 | Malamud et al. |
| 5,949,432 A | 9/1999 | Gough et al. |

(Continued)

FOREIGN PATENT DOCUMENTS

| | | |
|---|---|---|
| AU | 2013368443 B2 | 3/2016 |
| CN | 101068311 A | 11/2007 |

(Continued)

OTHER PUBLICATIONS

Advisory Action received for U.S. Appl. No. 18/123,878, mailed on Jun. 24, 2024, 4 pages.

(Continued)

*Primary Examiner* — Xilin Guo
(74) *Attorney, Agent, or Firm* — DLA Piper LLP (US)

(57) ABSTRACT

Electronic devices provide extended reality experiences. In some embodiments, a media capture user interface is displayed, including a capture guide. In some embodiments, gaze information is used for targeting. In some embodiments, a virtual object is manipulated.

48 Claims, 18 Drawing Sheets

(56) References Cited

U.S. PATENT DOCUMENTS

| | | | |
|---|---|---|---|
| 8,073,207 B2 | 12/2011 | Ayaki et al. | |
| 8,102,429 B2 | 1/2012 | Molgaard | |
| 8,405,680 B1 | 3/2013 | Gomes et al. | |
| 8,408,706 B2 | 4/2013 | Yahav | |
| 8,854,452 B1 | 10/2014 | Raffle | |
| 8,922,588 B2 | 12/2014 | Makino et al. | |
| 9,001,226 B1 | 4/2015 | Ng et al. | |
| 9,007,301 B1 | 4/2015 | Raffle et al. | |
| 9,462,169 B2 | 10/2016 | Xie et al. | |
| 9,507,420 B2 | 11/2016 | Tartz et al. | |
| 9,602,796 B2 | 3/2017 | Chandra et al. | |
| 9,626,589 B1 | 4/2017 | Graham et al. | |
| 9,639,945 B2 | 5/2017 | Oberheu et al. | |
| 9,692,964 B2 | 6/2017 | Steinberg et al. | |
| 9,704,250 B1 | 7/2017 | Gilmour et al. | |
| 9,747,504 B2 | 8/2017 | Ma et al. | |
| 9,774,778 B2 | 9/2017 | Miyakawa et al. | |
| 9,785,323 B2 | 10/2017 | Lu et al. | |
| 9,852,768 B1 | 12/2017 | Oh et al. | |
| 9,913,246 B1 | 3/2018 | Carey et al. | |
| 9,928,411 B2 | 3/2018 | Sugita et al. | |
| 9,967,467 B2 | 5/2018 | Gao et al. | |
| 9,990,727 B2 | 6/2018 | Yoon et al. | |
| 10,027,903 B2 | 7/2018 | Yim | |
| 10,038,838 B2 | 7/2018 | Castillo et al. | |
| 10,104,282 B2 | 10/2018 | Graham et al. | |
| 10,110,678 B2 | 10/2018 | Hebsur et al. | |
| 10,127,639 B2 | 11/2018 | Miura et al. | |
| 10,225,471 B2 | 3/2019 | Poindexter, Jr. | |
| 10,248,399 B2 | 4/2019 | Yoon | |
| 10,303,973 B2 | 5/2019 | Nakada et al. | |
| 10,353,532 B1 | 7/2019 | Holz et al. | |
| 10,372,765 B2 | 8/2019 | Knaapen et al. | |
| 10,496,260 B2 | 12/2019 | Zambetti et al. | |
| 10,528,128 B1 | 1/2020 | Yoon et al. | |
| 10,528,243 B2 | 1/2020 | Manzari et al. | |
| 10,574,882 B2 | 2/2020 | Chen | |
| 10,580,149 B1 | 3/2020 | Lakshminarayanan et al. | |
| 10,666,856 B1 | 5/2020 | Rueckner | |
| 10,938,758 B2 | 3/2021 | Allen et al. | |
| 11,049,527 B2 | 6/2021 | Zhang | |
| 11,132,162 B2 | 9/2021 | Bar-Zeev et al. | |
| 11,204,692 B2 | 12/2021 | Manzari et al. | |
| 11,468,625 B2 | 10/2022 | Manzari et al. | |
| 11,550,444 B2 | 1/2023 | Josephson et al. | |
| 11,568,517 B2 | 1/2023 | Kaida | |
| 11,687,224 B2 | 6/2023 | Manzari et al. | |
| 11,714,592 B2 | 8/2023 | Bar-Zeev et al. | |
| 2002/0113943 A1 | 8/2002 | Trajkovic et al. | |
| 2004/0150584 A1 | 8/2004 | Chuman et al. | |
| 2004/0207635 A1 | 10/2004 | Miller et al. | |
| 2005/0024517 A1 | 2/2005 | Luciano | |
| 2005/0175218 A1 | 8/2005 | Vertegaal et al. | |
| 2006/0170781 A1 | 8/2006 | Sobol | |
| 2006/0228040 A1 | 10/2006 | Simon et al. | |
| 2007/0113099 A1 | 5/2007 | Takikawa et al. | |
| 2007/0162872 A1 | 7/2007 | Hong et al. | |
| 2007/0257992 A1 | 11/2007 | Kato | |
| 2008/0154494 A1 | 6/2008 | Kato et al. | |
| 2008/0181452 A1 | 7/2008 | Kwon et al. | |
| 2008/0211766 A1 | 9/2008 | Westerman et al. | |
| 2008/0307360 A1 | 12/2008 | Chaudhri et al. | |
| 2009/0073285 A1 | 3/2009 | Terashima | |
| 2009/0268076 A1 | 10/2009 | Kawamura et al. | |
| 2010/0093400 A1 | 4/2010 | Ju et al. | |
| 2011/0032377 A1 | 2/2011 | Kim et al. | |
| 2011/0037712 A1 | 2/2011 | Kim et al. | |
| 2011/0161890 A1 | 6/2011 | Anderson et al. | |
| 2012/0249416 A1 | 10/2012 | Maciocci et al. | |
| 2012/0313973 A1 | 12/2012 | Li et al. | |
| 2013/0007668 A1 | 1/2013 | Liu et al. | |
| 2013/0042296 A1 | 2/2013 | Hastings et al. | |
| 2013/0050258 A1 | 2/2013 | Liu et al. | |
| 2013/0050432 A1 | 2/2013 | Perez et al. | |
| 2013/0088614 A1 | 4/2013 | Lee | |
| 2013/0141419 A1 | 6/2013 | Mount et al. | |
| 2013/0141524 A1 | 6/2013 | Karunamuni et al. | |
| 2013/0155474 A1 | 6/2013 | Roach et al. | |
| 2013/0201354 A1 | 8/2013 | Lascolea et al. | |
| 2013/0222227 A1 | 8/2013 | Johansson et al. | |
| 2013/0222663 A1 | 8/2013 | Rydenhag et al. | |
| 2013/0241805 A1 | 9/2013 | Gomez | |
| 2013/0283208 A1 | 10/2013 | Bychkov et al. | |
| 2013/0328762 A1 | 12/2013 | Mcculloch et al. | |
| 2013/0336545 A1 | 12/2013 | Pritikin et al. | |
| 2014/0043227 A1 | 2/2014 | Skogoe et al. | |
| 2014/0043517 A1 | 2/2014 | Yim et al. | |
| 2014/0047389 A1 | 2/2014 | Aarabi | |
| 2014/0063313 A1 | 3/2014 | Choi et al. | |
| 2014/0071061 A1 | 3/2014 | Lin et al. | |
| 2014/0095122 A1 | 4/2014 | Appleman et al. | |
| 2014/0096076 A1 | 4/2014 | Ashbrook et al. | |
| 2014/0118560 A1 | 5/2014 | Bala et al. | |
| 2014/0160001 A1 | 6/2014 | Kinnebrew et al. | |
| 2014/0176565 A1 | 6/2014 | Adeyoola et al. | |
| 2014/0184550 A1 | 7/2014 | Hennessey et al. | |
| 2014/0192217 A1 | 7/2014 | Kim et al. | |
| 2014/0201844 A1 | 7/2014 | Buck | |
| 2014/0204002 A1 | 7/2014 | Bennet et al. | |
| 2014/0240471 A1* | 8/2014 | Srinivasa | H04N 23/64 348/50 |
| 2014/0253592 A1 | 9/2014 | Cho | |
| 2014/0267126 A1 | 9/2014 | Åberg et al. | |
| 2014/0267867 A1 | 9/2014 | Lee et al. | |
| 2014/0300722 A1 | 10/2014 | Garcia | |
| 2014/0333666 A1 | 11/2014 | Poulos et al. | |
| 2014/0351896 A1 | 11/2014 | Koo | |
| 2014/0362105 A1 | 12/2014 | Kocienda et al. | |
| 2015/0043806 A1 | 2/2015 | Sunkavalli et al. | |
| 2015/0062159 A1 | 3/2015 | Hildreth et al. | |
| 2015/0067513 A1 | 3/2015 | Zambetti et al. | |
| 2015/0084857 A1 | 3/2015 | Kimura | |
| 2015/0100803 A1 | 4/2015 | Chen et al. | |
| 2015/0103149 A1* | 4/2015 | McNamer | H04N 13/296 348/50 |
| 2015/0109417 A1 | 4/2015 | Zirnheld | |
| 2015/0116546 A1 | 4/2015 | Tanaka | |
| 2015/0130716 A1 | 5/2015 | Sridharan et al. | |
| 2015/0138079 A1 | 5/2015 | Lannsjö | |
| 2015/0172534 A1 | 6/2015 | Miyakawa et al. | |
| 2015/0189138 A1 | 7/2015 | Xie et al. | |
| 2015/0199005 A1 | 7/2015 | Haddon | |
| 2015/0205494 A1 | 7/2015 | Scott et al. | |
| 2015/0208001 A1 | 7/2015 | Nonaka et al. | |
| 2015/0229838 A1 | 8/2015 | Hakim et al. | |
| 2015/0248583 A1 | 9/2015 | Sekine et al. | |
| 2015/0256757 A1 | 9/2015 | Marriott et al. | |
| 2015/0268821 A1 | 9/2015 | Ramsby et al. | |
| 2015/0277686 A1 | 10/2015 | Laforge et al. | |
| 2015/0286724 A1 | 10/2015 | Knaapen et al. | |
| 2015/0293592 A1 | 10/2015 | Cheong et al. | |
| 2015/0302116 A1 | 10/2015 | Howell | |
| 2015/0302621 A1 | 10/2015 | Liu et al. | |
| 2015/0317518 A1 | 11/2015 | Fujimaki et al. | |
| 2015/0317837 A1 | 11/2015 | Sholudko et al. | |
| 2015/0323990 A1 | 11/2015 | Maltz | |
| 2015/0347114 A1 | 12/2015 | Yoon | |
| 2015/0362729 A1 | 12/2015 | Jang et al. | |
| 2016/0005229 A1 | 1/2016 | Lee et al. | |
| 2016/0018645 A1 | 1/2016 | Haddick et al. | |
| 2016/0018654 A1 | 1/2016 | Haddick et al. | |
| 2016/0025981 A1 | 1/2016 | Burns et al. | |
| 2016/0026242 A1 | 1/2016 | Burns et al. | |
| 2016/0026253 A1 | 1/2016 | Bradski et al. | |
| 2016/0026371 A1 | 1/2016 | Lu et al. | |
| 2016/0037056 A1 | 2/2016 | Takahashi et al. | |
| 2016/0065861 A1 | 3/2016 | Steinberg et al. | |
| 2016/0065930 A1 | 3/2016 | Chandra et al. | |
| 2016/0085301 A1 | 3/2016 | Lopez | |
| 2016/0116980 A1 | 4/2016 | George-Svahn et al. | |
| 2016/0117829 A1 | 4/2016 | Yoon et al. | |
| 2016/0127645 A1 | 5/2016 | Sudo | |
| 2016/0131903 A1 | 5/2016 | Kollin | |
| 2016/0142649 A1 | 5/2016 | Mm | |

(56) References Cited

U.S. PATENT DOCUMENTS

| | | |
|---|---|---|
| 2016/0179336 A1 | 6/2016 | Ambrus et al. |
| 2016/0182877 A1 | 6/2016 | Deluca |
| 2016/0241767 A1 | 8/2016 | Cho et al. |
| 2016/0246457 A1 | 8/2016 | Goldenberg |
| 2016/0259518 A1 | 9/2016 | King et al. |
| 2016/0262614 A1 | 9/2016 | Ninomiya et al. |
| 2016/0267708 A1 | 9/2016 | Nistico et al. |
| 2016/0274762 A1 | 9/2016 | Lopez et al. |
| 2016/0283097 A1 | 9/2016 | Voss et al. |
| 2016/0284123 A1* | 9/2016 | Hare .................. G06V 40/67 |
| 2016/0287067 A1 | 10/2016 | Fan |
| 2016/0292759 A1 | 10/2016 | Gonzalez Miranda et al. |
| 2016/0295038 A1 | 10/2016 | Rao et al. |
| 2016/0307045 A1 | 10/2016 | Ma et al. |
| 2016/0307324 A1 | 10/2016 | Higuchi et al. |
| 2016/0313875 A1 | 10/2016 | Williams et al. |
| 2016/0353030 A1 | 12/2016 | Tang et al. |
| 2016/0357387 A1 | 12/2016 | Bovet et al. |
| 2016/0363774 A1 | 12/2016 | Kawasima |
| 2016/0366323 A1 | 12/2016 | Chen et al. |
| 2016/0366344 A1 | 12/2016 | Pan et al. |
| 2016/0371888 A1 | 12/2016 | Wright et al. |
| 2016/0379418 A1 | 12/2016 | Osborn et al. |
| 2017/0038829 A1 | 2/2017 | Lanier et al. |
| 2017/0060230 A1 | 3/2017 | Faaborg et al. |
| 2017/0061635 A1 | 3/2017 | Petrovich et al. |
| 2017/0061953 A1 | 3/2017 | An et al. |
| 2017/0064200 A1 | 3/2017 | Castillo et al. |
| 2017/0068500 A1 | 3/2017 | Rochford et al. |
| 2017/0078825 A1 | 3/2017 | Mangiat et al. |
| 2017/0090566 A1 | 3/2017 | George-Svahn et al. |
| 2017/0094132 A1 | 3/2017 | Miyata |
| 2017/0094161 A1 | 3/2017 | Graham et al. |
| 2017/0099481 A1 | 4/2017 | Held et al. |
| 2017/0109604 A1 | 4/2017 | Graham et al. |
| 2017/0134553 A1 | 5/2017 | Jeon et al. |
| 2017/0153701 A1 | 6/2017 | Mahon et al. |
| 2017/0185156 A1 | 6/2017 | Shotton et al. |
| 2017/0185276 A1 | 6/2017 | Lee et al. |
| 2017/0194768 A1 | 7/2017 | Powers et al. |
| 2017/0221276 A1 | 8/2017 | Osborn et al. |
| 2017/0237974 A1 | 8/2017 | Samec et al. |
| 2017/0272654 A1 | 9/2017 | Poindexter, Jr. |
| 2017/0318019 A1 | 11/2017 | Gordon et al. |
| 2017/0352379 A1 | 12/2017 | Oh et al. |
| 2018/0001198 A1 | 1/2018 | Frappiea |
| 2018/0004283 A1 | 1/2018 | Mathey-Owens et al. |
| 2018/0007414 A1 | 1/2018 | Li et al. |
| 2018/0035031 A1 | 2/2018 | Kwak et al. |
| 2018/0052571 A1 | 2/2018 | Seol et al. |
| 2018/0054487 A1 | 2/2018 | Hebsur et al. |
| 2018/0081171 A1 | 3/2018 | Park et al. |
| 2018/0095635 A1 | 4/2018 | Valdivia et al. |
| 2018/0096202 A1* | 4/2018 | Stathacopoulos ..... G06F 1/1694 |
| 2018/0098059 A1 | 4/2018 | Valdivia et al. |
| 2018/0204385 A1 | 7/2018 | Sarangdhar et al. |
| 2018/0218163 A1 | 8/2018 | Ananthapur Bache et al. |
| 2018/0249086 A1 | 8/2018 | Ozawa et al. |
| 2018/0349008 A1 | 12/2018 | Manzari et al. |
| 2019/0025910 A1 | 1/2019 | Gilra |
| 2019/0122420 A1 | 4/2019 | Terahata |
| 2019/0244416 A1 | 8/2019 | Tamaoki et al. |
| 2019/0286406 A1 | 9/2019 | Chen |
| 2019/0318660 A1 | 10/2019 | Kimoto |
| 2019/0378423 A1* | 12/2019 | Bachrach .............. H04L 67/12 |
| 2020/0082599 A1 | 3/2020 | Manzari |
| 2020/0105041 A1 | 4/2020 | Garofalo et al. |
| 2020/0142577 A1 | 5/2020 | Manzari et al. |
| 2020/0192622 A1 | 6/2020 | Stoyles et al. |
| 2020/0201444 A1 | 6/2020 | Stoyles et al. |
| 2020/0225746 A1 | 7/2020 | Bar-Zeev et al. |
| 2020/0225747 A1 | 7/2020 | Bar-Zeev et al. |
| 2020/0225901 A1 | 7/2020 | Boissière et al. |
| 2020/0250874 A1 | 8/2020 | Assouline et al. |
| 2020/0301553 A1 | 9/2020 | Taylor et al. |
| 2021/0003847 A1 | 1/2021 | Tanaka et al. |
| 2021/0096726 A1 | 4/2021 | Faulkner et al. |
| 2021/0097776 A1 | 4/2021 | Faulkner et al. |
| 2021/0141227 A1 | 5/2021 | Iwasa |
| 2021/0240331 A1 | 8/2021 | Olson et al. |
| 2021/0287343 A1 | 9/2021 | Kaida |
| 2021/0318798 A1 | 10/2021 | Manzari et al. |
| 2021/0365228 A1 | 11/2021 | Stoyles et al. |
| 2021/0382559 A1 | 12/2021 | Segev et al. |
| 2022/0012002 A1 | 1/2022 | Bar-Zeev et al. |
| 2022/0083303 A1 | 3/2022 | Stoyles et al. |
| 2022/0113926 A1 | 4/2022 | Boissière et al. |
| 2022/0150345 A1 | 5/2022 | Woo et al. |
| 2022/0245900 A1* | 8/2022 | Tan ..................... G06T 7/55 |
| 2022/0319100 A1 | 10/2022 | Manzari et al. |
| 2022/0397759 A1 | 12/2022 | Vignau |
| 2023/0229297 A1 | 7/2023 | Manzari et al. |
| 2023/0325140 A1 | 10/2023 | Bar-Zeev et al. |
| 2023/0376261 A1 | 11/2023 | Stoyles et al. |
| 2023/0393796 A1 | 12/2023 | Stoyles et al. |
| 2023/0394170 A1 | 12/2023 | Boissière et al. |
| 2024/0103614 A1 | 3/2024 | Dryer et al. |
| 2024/0320930 A1 | 9/2024 | Ravasz et al. |
| 2024/0340371 A1 | 10/2024 | Rua et al. |
| 2024/0373120 A1 | 11/2024 | Manzari et al. |
| 2024/0373121 A1 | 11/2024 | Manzari et al. |
| 2024/0373122 A1 | 11/2024 | Manzari et al. |
| 2024/0373124 A1 | 11/2024 | Manzari et al. |
| 2024/0377877 A1 | 11/2024 | Kasar et al. |
| 2024/0404075 A1 | 12/2024 | Lu et al. |
| 2024/0406368 A1 | 12/2024 | Lemay et al. |
| 2024/0411497 A1 | 12/2024 | Stoyles et al. |
| 2025/0103133 A1 | 3/2025 | Pastrana Vicente et al. |
| 2025/0147651 A1 | 5/2025 | Manzari et al. |
| 2025/0181760 A1 | 6/2025 | Boissière et al. |
| 2025/0190161 A1 | 6/2025 | Stoyles et al. |

FOREIGN PATENT DOCUMENTS

| | | |
|---|---|---|
| CN | 101388965 A | 3/2009 |
| CN | 101821707 A | 9/2010 |
| CN | 101883213 A | 11/2010 |
| CN | 201788344 U | 4/2011 |
| CN | 102202208 A | 9/2011 |
| CN | 102541537 A | 7/2012 |
| CN | 102567953 A | 7/2012 |
| CN | 102843523 A | 12/2012 |
| CN | 103037075 A | 4/2013 |
| CN | 103164017 A | 6/2013 |
| CN | 103460256 A | 12/2013 |
| CN | 103765346 A | 4/2014 |
| CN | 103823553 A | 5/2014 |
| CN | 104125210 A | 10/2014 |
| CN | 104487928 A | 4/2015 |
| CN | 104516497 A | 4/2015 |
| CN | 104754203 A | 7/2015 |
| CN | 104903834 A | 9/2015 |
| CN | 105009039 A | 10/2015 |
| CN | 105144057 A | 12/2015 |
| CN | 105245774 A | 1/2016 |
| CN | 105264480 A | 1/2016 |
| CN | 105393190 A | 3/2016 |
| CN | 105493138 A | 4/2016 |
| CN | 105493501 A | 4/2016 |
| CN | 105794196 A | 7/2016 |
| CN | 106164818 A | 11/2016 |
| CN | 106257540 A | 12/2016 |
| CN | 106371206 A | 2/2017 |
| CN | 106415444 A | 2/2017 |
| CN | 106462733 A | 2/2017 |
| CN | 106951069 A | 7/2017 |
| CN | 107148592 A | 9/2017 |
| CN | 115914824 A | 4/2023 |
| EP | 0513584 A2 | 11/1992 |
| EP | 1055200 B1 | 5/2003 |
| EP | 2940556 A1 | 11/2015 |
| EP | 2947546 A1 | 11/2015 |
| EP | 3046070 A1 | 7/2016 |
| EP | 3107065 A1 | 12/2016 |

(56) References Cited

FOREIGN PATENT DOCUMENTS

| | | |
|---|---|---|
| EP | 3111272 A1 | 1/2017 |
| EP | 3118722 A1 | 1/2017 |
| EP | 3209012 A1 | 8/2017 |
| EP | 3111272 B1 | 8/2018 |
| EP | 3046070 B1 | 10/2020 |
| EP | 4089521 A1 | 11/2022 |
| GB | 2519363 A | 4/2015 |
| JP | 2003-338975 A | 11/2003 |
| JP | 2004-37149 A | 2/2004 |
| JP | 2004-513403 A | 4/2004 |
| JP | 2004-517359 A | 6/2004 |
| JP | 2005-157329 A | 6/2005 |
| JP | 2008-158583 A | 7/2008 |
| JP | 2009-64395 A | 3/2009 |
| JP | 2010-160581 A | 7/2010 |
| JP | 2010-211497 A | 9/2010 |
| JP | 2011-249887 A | 12/2011 |
| JP | 2012-124608 A | 6/2012 |
| JP | 2015-14977 A | 1/2015 |
| JP | 2015-90635 A | 5/2015 |
| JP | 2015-126857 A | 7/2015 |
| JP | 2015-146619 A | 8/2015 |
| JP | 2015-180987 A | 10/2015 |
| JP | 2015-201839 A | 11/2015 |
| JP | 2016-502120 A | 1/2016 |
| JP | 2016-85588 A | 5/2016 |
| JP | 2016-192132 A | 11/2016 |
| JP | 2017-4354 A | 1/2017 |
| JP | 2017-69776 A | 4/2017 |
| KR | 10-2002-0086590 A | 11/2002 |
| KR | 10-2007-0067332 A | 6/2007 |
| KR | 10-2009-0066319 A | 6/2009 |
| KR | 10-2014-0138346 A | 12/2014 |
| KR | 10-2015-0098361 A | 8/2015 |
| KR | 10-2015-0098362 A | 8/2015 |
| KR | 10-2015-0125472 A | 11/2015 |
| KR | 10-2016-0016910 A | 2/2016 |
| KR | 10-2016-0035050 A | 3/2016 |
| SU | 1610470 A1 | 11/1990 |
| WO | 2008/030779 A2 | 3/2008 |
| WO | 2008/109644 A2 | 9/2008 |
| WO | 2009/032638 A2 | 3/2009 |
| WO | 2011/078913 A1 | 6/2011 |
| WO | 2013/144807 A1 | 10/2013 |
| WO | 2013/169870 A1 | 11/2013 |
| WO | 2014/033306 A1 | 3/2014 |
| WO | 2014/105276 A1 | 7/2014 |
| WO | 2014/105277 A2 | 7/2014 |
| WO | 2014/200734 A1 | 12/2014 |
| WO | 2014/204755 A1 | 12/2014 |
| WO | 2015/017312 A1 | 2/2015 |
| WO | 2015/037211 A1 | 3/2015 |
| WO | 2015/059349 A1 | 4/2015 |
| WO | 2015/110852 A1 | 7/2015 |
| WO | 2015/166684 A1 | 11/2015 |
| WO | 2016/099706 A1 | 6/2016 |
| WO | 2016/203282 A1 | 12/2016 |
| WO | 2017/031089 A1 | 2/2017 |
| WO | 2017/071559 A1 | 5/2017 |
| WO | 2017/096097 A1 | 6/2017 |
| WO | 2017/112692 A2 | 6/2017 |
| WO | 2023/049170 A2 | 3/2023 |
| WO | 2023/049418 A2 | 3/2023 |
| WO | 2023/116418 A1 | 6/2023 |

OTHER PUBLICATIONS

Applicant-Initiated Interview Summary received for U.S. Appl. No. 18/123,878, mailed on Apr. 15, 2024, 4 pages.
Applicant-Initiated Interview Summary received for U.S. Appl. No. 18/123,878, mailed on Jun. 3, 2024, 3 pages.
Applicant-Initiated Interview Summary received for U.S. Appl. No. 18/229,059. mailed on Apr. 26, 2024, 2 pages.
Chatterjee et al., "Gaze+Gesture: Expressive. Precise and Targeted Free-Space Interactions", ICMI '15: Proceedings of the 2015 ACM on International Conference on Multimodal Interaction, Online available at: https://dl.acm.org/doi/10.1145/2818346.2820752. Nov. 9-13, 2015, pp. 131-138.
Decision to Grant received for European Patent Application No. 22151131.4, mailed on Nov. 16, 2023, 3 pages.
Decision to Grant received for Japanese Patent Application No. 2023-041079, mailed on Mar. 28, 2024, 3 pages (1 page of English Translation and 2 pages of Official Copy).
Extended European Search Report received for European Patent Application No. 23173161.3, mailed on Oct. 30, 2023, 9 pages.
Extended European Search Report received for European Patent Application No. 23204776.1, mailed on May 6, 2024, 8 pages.
Extended European Search Report received for European Patent Application No. 23219457.1, mailed on Apr. 16, 2024, 10 pages.
Final Office Action received for U.S. Appl. No. 18/123,878, mailed on Apr. 26, 2024, 23 pages.
International Search Report and Written Opinion received for PCT Patent Application No. PCT/US2023/033501, mailed on Feb. 26, 2024, 21 pages.
International Search Report and Written Opinion received for PCT Patent Application No. PCT/US2023/033549, mailed on Jan. 15, 2024, 15 pages.
Invitation to Pay Additional Fees and Partial International Search Report received for PCT Patent Application No. PCT/US2023/033501, mailed on Jan. 5, 2024, 15 pages.
Non-Final Office Action received for U.S. Appl. No. 18/123,878, mailed on Jan. 31, 2024, 19 pages.
Non-Final Office Action received for U.S. Appl. No. 18/229,059, mailed on Mar. 7, 2024, 15 pages.
Non-Final Office Action received for U.S. Appl. No. 18/235,693, mailed on Jul. 3, 2024, 25 pages.
Notice of Acceptance received for Australian Patent Application No. 2023204616, mailed on Oct. 31, 2023, 3 pages.
Notice of Allowance received for Chinese Patent Application No. 201980028660.1, mailed on Feb. 27, 2024, 2 pages (1 page of English Translation and 1 page of Official Copy).
Notice of Allowance received for U.S. Appl. No. 18/229,059, mailed on Jul. 11, 2024, 7 pages.
Office Action received for Chinese Patent Application No. 201880036400.4, mailed on Jan. 20, 2024, 14 pages (6 pages of English Translation and 8 pages of Official Copy).
Office Action received for Chinese Patent Application No. 201880063680.8, mailed on Nov. 10, 2023, 20 pages (4 pages of English Translation and 16 pages of Official Copy).
Office Action received for Chinese Patent Application No. 201980028660.1, mailed on Oct. 18, 2023, 11 pages (5 pages of English Translation and 6 pages of Official Copy).
Office Action received for Japanese Patent Application No. 2023-041079, mailed on Nov. 21, 2023, 6 pages (3 pages of English Translation and 3 pages of Official Copy),.
Office Action received for Korean Patent Application No. 10-2023-7022376, mailed on Jan. 30, 2024, 9 pages (4 pages of English Translation and 5 pages of Official Copy).
Office Action received for Korean Patent Application No. 10-2023-7037005, mailed on Nov. 13, 2023, 13 pages (6 pages of English Translation and 7 pages of Official Copy).
Decision to Grant received for Japanese Patent Application No. 2023-149802, mailed on Dec. 3, 2024, 3 pages (1 page of English Translation and 2 pages of Official Copy).
Final Office Action received for U.S. Appl. No. 18/209,931, mailed on Dec. 13, 2024, 23 pages.
International Search Report and Written Opinion received for PCT Patent Application No. PCT/US2024/024016, mailed on Jul. 30, 2024, 10 pages.
International Search Report and Written Opinion received for PCT Patent Application No. PCT/US2024/031468, mailed on Nov. 20, 2024, 17 pages.
Invitation to Pay Additional Fees and Partial International Search Report received for PCT Patent Application No. PCT/US2024/031468, mailed on Sep. 30, 2024, 9 pages.

(56) References Cited

OTHER PUBLICATIONS

Notice of Allowance received for U.S. Appl. No. 18/235,693, mailed on Dec. 13, 2024, 10 pages.
Corrected Notice of Allowance received for U.S. Appl. No. 18/123,878, mailed on May 5, 2025, 2 pages.
Corrected Notice of Allowance received for U.S. Appl. No. 18/373,158, mailed on Apr. 29, 2025, 2 pages.
Non-Final Office Action received for U.S. Appl. No. 19/017,062, mailed on Apr. 23, 2025, 20 pages.
Board Opinion received for Chinese Patent Application No. 201880063680.8, mailed on Sep. 14, 2024, 19 pages (9 pages of English Translation and 10 pages of Official Copy).
International Search Report and Written Opinion received for PCT Patent Application No. PCT/US2024/020880. mailed on Aug. 26, 2024, 22 pages,.
Non-Final Office Action received for U.S. Appl. No. 18/234,583, mailed on Sep. 30, 2024, 17 pages.
International Preliminary Report on Patentability received for PCT Patent Application No. PCT/US2023/033549, mailed on Apr. 3, 2025, 10 pages.
Non-Final Office Action received for U.S. Appl. No. 18/209,931, mailed on Apr. 10, 2025, 7 pages.
Notice of Allowance received for U.S. Appl. No. 18/123,878, mailed on Apr. 16, 2025, 11 pages.
Notice of Allowance received for U.S. Appl. No. 18/373,158, mailed on Apr. 15, 2025, 14 pages.
Applicant-Initiated Interview Summary received for U.S. Appl. No. 18/209,931, mailed on Nov. 27, 2024, 2 pages.
International Search Report and Written Opinion received for PCT Patent Application No. PCT/US2024/026652, mailed on Sep. 3, 2024, 15 pages.
Notice of Allowance received for Chinese Patent Application No. 201880036400.4, mailed on Nov. 8, 2024, 2 pages (1 page of English Translation and 1 page of Official Copy).
Notice of Allowance received for U.S. Appl. No. 18/234,583, mailed on Nov. 18, 2024, 5 pages.
Board Decision received for Chinese Patent Application No. 201880063680.8, mailed on Nov. 22, 2024, 20 pages (5 pages of English Translation and 15 pages of Official Copy).
Office Action received for Chinese Patent Application No. 202210616910.7, mailed on Nov. 22, 2024, 17 pages (9 pages of English Translation and 8 pages of Official Copy).
Office Action received for Japanese Patent Application No. 2024-073909, mailed on Dec. 19. 2024, 5 pages (2 pages of English Translation and 3 pages of Official copy).
Corrected Notice of Allowance received for U.S. Appl. No. 18/235,693, mailed on Feb. 20, 2025, 2 pages.
International Preliminary Report on Patentability received for PCT Patent Application No. PCT/US2023/033501, mailed on Apr. 3, 2025, 16 pages.
International Search Report and Written Opinion received for PCT Patent Application No. PCT/US2024/045209, mailed on Jan. 31, 2025, 14 pages.
International Search Report and Written Opinion received for PCT Patent Application No. PCT/US2024/048985, mailed on Feb. 13, 2025, 19 pages.
Invitation to Pay Additional Fees and Partial International Search Report received for PCT Patent Application No. PCT/US2024/045209, mailed on Dec. 10, 2024, 11 pages.
Invitation to Pay Additional Fees and Partial International Search Report received for PCT Patent Application No. PCT/US2024/048985, mailed on Dec. 23, 2024, 13 pages.
Office Action received for Australian Patent Application No. 2024200819, mailed on Mar. 24, 2025, 4 pages.
Notice of Allowance received for U.S. Appl. No. 18/235,693, mailed on Aug. 28, 2024, 11 pages.
Office Action received for Chinese Patent Application No. 201880036400.4, mailed on Aug. 24, 2024, 16 pages (9 pages of English Translation and 7 pages of Official Copy).
Office Action received for Chinese Patent Application No. 202210616910.7, mailed on Aug. 8, 2024, 19 pages (10 pages of English Translation and 9 pages of Official Copy).
Office Action received for Chinese Patent Application No. 202210618012.5, mailed on Aug. 9, 2024, 16 pages (9 pages of English Translation and 7 pages of Official Copy).
Office Action received for Japanese Patent Application No. 2023-149802, mailed on Jul. 29, 2024, 2 pages (1 page of English Translation and 1 page of Official Copy).
Office Action received for Japanese Patent Application No. 2024-073909, mailed on Aug. 1, 2024, 4 pages (2 pages of English Translation and 2 pages of Official Copy).
Corrected Notice of Allowance received for U.S. Appl. No. 18/123,878, mailed on Oct. 18, 2024, 2 pages.
Intention to Grant received for European Patent Application No. 23204776.1, mailed on Oct. 4, 2024, 8 pages.
Notice of Allowance received for Korean Patent Application No. 10-2024-7032875, mailed on Oct. 10, 2024, 8 pages (2 pages of English Translation and 6 pages of Official Copy).
Notice of Hearing received for Indian Patent Application No. 202118046032, mailed on Oct. 8, 2024, 2 pages.
Notice of Hearing received for Indian Patent Application No. 202118046033, mailed on Oct. 8, 2024, 3 pages.
Notice of Hearing received for Indian Patent Application No. 202118046044, mailed on Oct. 8, 2024, 2 pages.
Notice of Allowance received for Chinese Patent Application No. 202210618012.5, mailed on Jan. 1, 2025, 5 pages (1 page of English Translation and 4 pages of Official Copy).
Notice of Allowance received for U.S. Appl. No. 18/234,583, mailed on Jan. 13, 2025, 2 pages.
Advisory Action received for U.S. Appl. No. 16/833,230, mailed on Jun. 4, 2021, 3 pages.
Applicant-Initiated Interview Summary received for U.S. Appl. No. 16/733,718, mailed on Nov. 2, 2020, 4 pages.
Applicant-Initiated Interview Summary received for U.S. Appl. No. 16/802,188, mailed on Mar. 23, 2021, 2 pages.
Applicant-Initiated Interview Summary received for U.S. Appl. No. 16/802,320, mailed on Apr. 9, 2021, 2 pages.
Applicant-Initiated Interview Summary received for U.S. Appl. No. 16/828,852, mailed on Jan. 27, 2021, 4 pages.
Applicant-Initiated Interview Summary received for U.S. Appl. No. 16/828,852, mailed on Jun. 8, 2021, 2 pages.
Applicant-Initiated Interview Summary received for U.S. Appl. No. 16/828,857, mailed on Jun. 10, 2021, 3 pages.
Applicant-Initiated Interview Summary received for U.S. Appl. No. 16/833,230, mailed on Aug. 16, 2021, 4 pages.
Applicant-Initiated Interview Summary received for U.S. Appl. No. 16/833,230, mailed on Mar. 10, 2021, 4 pages.
Applicant-Initiated Interview Summary received for U.S. Appl. No. 16/833,230, mailed on May 14, 2021, 2 pages.
Applicant-Initiated Interview Summary received for U.S. Appl. No. 17/052,081, mailed on Oct. 18, 2021, 4 pages.
Applicant-Initiated Interview Summary received for U.S. Appl. No. 17/356,322, mailed on Dec. 27, 2022, 4 pages.
Applicant-Initiated Interview Summary received for U.S. Appl. No. 17/486,646, mailed on Aug. 23, 2022, 2 pages.
Applicant-Initiated Interview Summary received for U.S. Appl. No. 17/486,646, mailed on Dec. 28, 2022, 2 pages.
Applicant-Initiated Interview Summary received for U.S. Appl. No. 17/534,102, mailed on Sep. 27, 2022, 2 pages.
Applicant-Initiated Interview Summary received for U.S. Appl. No. 17/561,043, mailed on Apr. 10, 2023, 5 pages.
Applicant-Initiated Interview Summary received for U.S. Appl. No. 17/561,043, mailed on Nov. 18, 2022, 3 pages.
Brief Communication regarding Oral Proceedings received for European Patent Application No. 18786644.7, mailed on Feb. 27, 2023, 3 pages.
Businesswire, "SMI Gaze Interaction Powers Google Glass Prototype", Online Available at: https://www.youtube.com/watch?v=R3xxqap7DmQ&t=1s, Mar. 3, 2015, 3 pages.
Channel Highway, "Virtual Makeover in Real-time and in full 3D", Available online at:—https://www.youtube.com/watch?v=NgUbBzb5qZg, Feb. 16, 2016, 1 page.

(56) References Cited

OTHER PUBLICATIONS

Corrected Notice of Allowance received for U.S. Appl. No. 16/733,718, mailed on Aug. 18, 2021, 2 pages.
Corrected Notice of Allowance received for U.S. Appl. No. 16/733,718, mailed on Nov. 17, 2021, 2 pages.
Corrected Notice of Allowance received for U.S. Appl. No. 16/828,857, mailed on Sep. 1, 2021, 3 pages.
Corrected Notice of Allowance received for U.S. Appl. No. 17/356,322, mailed on Feb. 15, 2023, 2 pages.
Corrected Notice of Allowance received for U.S. Appl. No. 17/356,322, mailed on Mar. 8, 2023, 2 pages.
Corrected Notice of Allowance received for U.S. Appl. No. 17/394,114, mailed on Jun. 14, 2023, 2 pages.
Decision of Rejection received for Japanese Patent Application No. 2021-142308, mailed on May 15, 2023, 4 pages (2 pages of English Translation and 2 pages of Official Copy).
Decision to Grant received for Danish Patent Application No. PA201770719, mailed on Feb. 3, 2022, 2 pages.
Decision to Grant received for European Patent Application No. 18704732.9, mailed on Aug. 18, 2023, 3 pages.
Decision to Grant received for European Patent Application No. 18793079.7, mailed on Jun. 2, 2022, 2 pages.
Decision to Grant received for Japanese Patent Application No. 2019-566087, mailed on Jan. 26, 2022, 2 pages (1 page of English Translation and 1 page of Official Copy).
Decision to Grant received for Japanese Patent Application No. 2020-512573, mailed on Aug. 2, 2021, 3 pages (1 page of English Translation and 2 pages of Official Copy).
Decision to Grant received for Japanese Patent Application No. 2020-517967, mailed on Dec. 6, 2021, 2 pages (1 page of English Translation and 1 page of Official Copy).
Decision to Refuse received for European Patent Application No. 18786644.7, mailed on Mar. 27, 2023, 9 pages.
Digital Trends, "ModiFace Partners With Samsung to Bring AR Makeup to the Galaxy S9", Available online at:—https://www.digitaltrends.com/mobile/modiface-samsung-partnership-ar-makeup-galaxy-s9/, 2018, 16 pages.
Examiner-Initiated Interview Summary received for U.S. Appl. No. 17/356,322, mailed on Sep. 29, 2022, 4 pages.
Extended European Search Report received for European Patent Application No. 22151131.4, mailed on Mar. 24, 2022, 6 pages.
Final Office Action received for U.S. Appl. No. 15/728,147, mailed on Aug. 29, 2018, 39 pages.
Final Office Action received for U.S. Appl. No. 15/728,147, mailed on May 28, 2019, 45 pages.
Final Office Action received for U.S. Appl. No. 16/802,188, mailed on May 14, 2021, 18 pages.
Final Office Action received for U.S. Appl. No. 16/828,852, mailed on Mar. 9, 2021, 16 pages.
Final Office Action received for U.S. Appl. No. 16/833,230, mailed on Mar. 23, 2021, 21 pages.
Final Office Action received for U.S. Appl. No. 17/356,322, mailed on Nov. 29, 2022, 19 pages.
Final Office Action received for U.S. Appl. No. 17/486,646, mailed on Oct. 5, 2022, 20 pages.
Final Office Action received for U.S. Appl. No. 17/534,102, mailed on Nov. 30, 2022, 14 pages.
Final Office Action received for U.S. Appl. No. 17/561,043, mailed on Feb. 1, 2023, 26 pages.
Gadgets Portal, "Galaxy J5 Prime Camera Review! (vs J7 Prime) 4K", Available Online at:—https://www.youtube.com/watch?v=Rf2Gy8QmDqc, Oct. 24, 2016, 3 pages.
Helpvideostv, "How to Use Snap Filters on Snapchat", Retrieved from <https://www.youtube.com/watch?v=oR-7clWPszU&feature=youtu.be>, Mar. 22, 2017, pp. 1-2.
Howmuchtech, "5 Best Smart Glasses of 2022", Online Available at: https://www.youtube.com/watch?v=xll2Ycc6Fv0&t=162s, Dec. 24, 2021, 6 pages.
Intention to Grant received for European Patent Application No. 18704732.9, mailed on Dec. 6, 2022, 10 pages.
Intention to Grant received for European Patent Application No. 18793079.7, mailed on Feb. 1, 2022, 8 pages.
Intention to Grant received for European Patent Application No. 22151131.4, mailed on Aug. 4, 2023, 10 pages.
International Preliminary Report on Patentability received for PCT Patent Application No. PCT/US2018/015591, mailed on Dec. 19, 2019, 10 pages.
International Preliminary Report on Patentability received for PCT Patent Application No. PCT/US2018/052868, mailed on Apr. 9, 2020, 10 pages.
International Preliminary Report on Patentability received for PCT Patent Application No. PCT/US2018/053415, mailed on Apr. 9, 2020, 10 pages.
International Preliminary Report on Patentability received for PCT Patent Application No. PCT/US2018/053422, mailed on Apr. 9, 2020, 10 pages.
International Preliminary Report on Patentability received for PCT Patent Application No. PCT/US2018/053427, mailed on Apr. 9, 2020, 14 pages.
International Preliminary Report on Patentability received for PCT Patent Application No. PCT/US2018/053428, mailed on Apr. 9, 2020, 8 pages.
International Preliminary Report on Patentability received for PCT Patent Application No. PCT/US2019/028980, mailed on Nov. 19, 2020, 10 pages.
International Search Report and Written Opinion Received for PCT Application No. PCT/US2018/052868, mailed on Jan. 18, 2019, 11 pages.
International Search Report and Written Opinion received for PCT Patent Application No. PCT/US2018/015591, mailed on Jun. 14, 2018, 14 pages.
International Search Report and Written Opinion received for PCT Patent Application No. PCT/US2018/053415, mailed on Dec. 13, 2018, 14 pages.
International Search Report and Written Opinion received for PCT Patent Application No. PCT/US2018/053422, mailed on Dec. 19, 2018, 13 pages.
International Search Report and Written Opinion received for PCT Patent Application No. PCT/US2018/053427, mailed on Mar. 25, 2019, 18 pages.
International Search Report and Written Opinion received for PCT Patent Application No. PCT/US2018/053428, mailed on Jan. 25, 2019, 9 pages.
International Search Report and Written Opinion received for PCT Patent Application No. PCT/US2019/028980, mailed on Aug. 16, 2019, 14 pages.
Invitation to Pay Additional Fees received for PCT Patent Application No. PCT/US2018/053427, mailed on Feb. 1, 2019, 13 pages.
Invitation to Pay Search Fees received for European Patent Application No. 18704732.9, mailed on Jun. 2, 2021, 3 pages.
Kunhee et al., "Distant 3D Object Grasping with Gaze-supported Selection", The 12th International Conference on Ubiquitous Robots and Ambient Intelligence (URAI 2015), Oct. 28-30, 2015, pp. 541-544.
Liu et al., "Video avatar-based remote video collaboration", Journal of Beijing University of Aeronautics and Astronautics, vol. 41, No. 6, Jun. 2015, pp. 1087-1094 (Official Copy Only). {See Communication under 37 CFR § 1.98(a) (3)}.
Messelodi et al., "A Kalman filter based background updating algorithm robust to sharp illumination changes.", International Conference on Image Analysis and Processing. Springer, Berlin, Heidelberg, 2005, pp. 163-170.
Minutes of the Oral Proceedings received for European Patent Application No. 18786644.7, mailed on Mar. 24, 2023, 5 pages.
Mobiscrub, "Galaxy S4 mini camera review", Available Online at:—https://www.youtube.com/watch?v=KYKOydw8QT8, Aug. 10, 2013, 3 pages.
Mobiscrub, "Samsung Galaxy S5 Camera Review—HD Video", Available Online on:—https://www.youtube.com/watch?v=BFgwDtNKMjg, Mar. 27, 2014, 3 pages.
Modifacechannel, "Sephora 3D Augmented Reality Mirror", Available Online at: https://www.youtube.com/watch?v=wwBO4PU9EXI, May 15, 2014, 1 page.

(56) References Cited

OTHER PUBLICATIONS

Non-Final Office Action received for U.S. Appl. No. 15/728,147, mailed on Feb. 22, 2018, 20 pages.
Non-Final Office Action received for U.S. Appl. No. 15/728,147, mailed on Jan. 31, 2019, 41 pages.
Non-Final Office Action received for U.S. Appl. No. 16/733,718, mailed on Sep. 16, 2020, 25 pages.
Non-Final Office Action received for U.S. Appl. No. 16/802,188, mailed on Dec. 16, 2020, 15 pages.
Non-Final Office Action received for U.S. Appl. No. 16/802,320, mailed on Dec. 24, 2020, 19 pages.
Non-Final Office Action received for U.S. Appl. No. 16/828,852, mailed on Nov. 9, 2020, 14 pages.
Non-Final Office Action received for U.S. Appl. No. 16/828,857, mailed on Feb. 17, 2021, 12 pages.
Non-Final Office Action received for U.S. Appl. No. 16/833,230, mailed on Dec. 10, 2020, 19 pages.
Non-Final Office Action received for U.S. Appl. No. 16/833,230, mailed on Jun. 24, 2021, 21 pages.
Non-Final Office Action received for U.S. Appl. No. 17/052,081, mailed on Jul. 14, 2021, 16 pages.
Non-Final Office Action received for U.S. Appl. No. 17/356,322, mailed on Aug. 11, 2022, 17 pages.
Non-Final Office Action received for U.S. Appl. No. 17/394,114, mailed on Jul. 6, 2022, 17 pages.
Non-Final Office Action received for U.S. Appl. No. 17/486,646, mailed on Jun. 15, 2022, 17 pages.
Non-Final Office Action received for U.S. Appl. No. 17/534,102, mailed on Jul. 7, 2022, 14 pages.
Non-Final Office Action received for U.S. Appl. No. 17/561,043, mailed on Sep. 2, 2022, 30 pages.
Notice of Acceptance received for Australian Patent Application No. 2018279787, mailed on Dec. 10, 2019, 3 pages.
Notice of Acceptance received for Australian Patent Application No. 2020201969, mailed on Mar. 26, 2021, 3 pages.
Notice of Acceptance received for Australian Patent Application No. 2021203177, mailed on Jul. 14, 2022, 3 pages.
Notice of Acceptance received for Australian Patent Application No. 2022218463, mailed on Apr. 18, 2023, 3 pages.
Notice of Allowance received for Chinese Patent Application No. 201880051530.5, mailed on Apr. 8, 2022, 5 pages (1 page of English Translation and 4 pages of Official Copy).
Notice of Allowance received for Chinese Patent Application No. 201880052303.4, mailed on Mar. 9, 2022, 4 pages (1 page of English Translation and 3 pages of Official Copy).
Notice of Allowance received for Chinese Patent Application No. 201880055893.6, mailed on Mar. 30, 2022, 4 pages (1 page of English Translation and 3 pages of Official Copy).
Notice of Allowance received for Chinese Patent Application No. 202010218168.5, mailed on Aug. 25, 2021, 6 pages (3 pages of English Translation and 3 pages of Official Copy).
Notice of Allowance received for Chinese Patent Application No. 202111323807.5, mailed on Jan. 10, 2023, 4 pages (1 page of English Translation and 3 pages of Official Copy).
Notice of Allowance received for Chinese Patent Application No. 202210063070.6, mailed on May 2, 2023, 2 pages (1 page of English Translation and 1 page of Official Copy).
Notice of Allowance received for Japanese Patent Application No. 2022-027861, mailed on Feb. 13, 2023, 3 pages (1 page of English Translation and 2 pages of Official Copy).
Notice of Allowance received for Korean Patent Application No. 10-2019-7035478, mailed on Apr. 24, 2020, 4 pages (1 page of English Translation and 3 pages of Official Copy).
Notice of Allowance received for Korean Patent Application No. 10-2020-7006018, mailed on Apr. 18, 2022, 4 pages (1 page of English Translation and 3 pages of Official Copy).
Notice of Allowance received for Korean Patent Application No. 10-2020-7009322, mailed on Oct. 8, 2021, 3 pages (1 page of English Translation and 2 pages of Official Copy).
Notice of Allowance received for Korean Patent Application No. 10-2020-7021870, mailed on Apr. 26, 2021, 4 pages (1 page of English Translation and 3 pages of Official Copy).
Notice of Allowance received for Korean Patent Application No. 10-2021-7020693, mailed on Dec. 27, 2021, 5 pages (1 page of English Translation and 4 pages of Official Copy).
Notice of Allowance received for Korean Patent Application No. 10-2022-7006310, mailed on Sep. 20, 2022, 8 pages (2 pages of English Translation and 6 pages of Official Copy).
Notice of Allowance received for Korean Patent Application No. 10-2022-7043663, mailed on Jul. 25, 2023, 8 pages (2 pages of English Translation and 6 pages of Official Copy).
Notice of Allowance received for U.S. Appl. No. 15/728,147, mailed on Aug. 19, 2019, 13 pages.
Notice of Allowance received for U.S. Appl. No. 16/733,718, mailed on Feb. 5, 2021, 14 pages.
Notice of Allowance received for U.S. Appl. No. 16/733,718, mailed on Jul. 29, 2021, 26 pages.
Notice of Allowance received for U.S. Appl. No. 16/733,718, mailed on Oct. 20, 2021, 24 pages.
Notice of Allowance received for U.S. Appl. No. 16/802,188, mailed on Jul. 29, 2021, 8 pages.
Notice of Allowance received for U.S. Appl. No. 16/802,320, mailed on Apr. 30, 2021, 9 pages.
Notice of Allowance received for U.S. Appl. No. 16/828,852, mailed on Jul. 27, 2021, 10 pages.
Notice of Allowance received for U.S. Appl. No. 16/828,857, mailed on Jul. 14, 2021, 6 pages.
Notice of Allowance received for U.S. Appl. No. 16/833,230, mailed on Dec. 3, 2021, 8 pages.
Notice of Allowance received for U.S. Appl. No. 16/833,230, mailed on Jan. 12, 2022, 3 pages.
Notice of Allowance received for U.S. Appl. No. 17/052,081, mailed on Jan. 14, 2022, 7 pages.
Notice of Allowance received for U.S. Appl. No. 17/356,322, mailed on Feb. 2, 2023, 11 pages.
Notice of Allowance received for U.S. Appl. No. 17/356,322, mailed on May 8, 2023, 10 pages.
Notice of Allowance received for U.S. Appl. No. 17/394,114, mailed on Feb. 7, 2023, 10 pages.
Notice of Allowance received for U.S. Appl. No. 17/394,114, mailed on Jun. 2, 2023, 11 pages.
Notice of Allowance received for U.S. Appl. No. 17/394,114, mailed on Oct. 21, 2022, 10 pages.
Notice of Allowance received for U.S. Appl. No. 17/486,646, mailed on Mar. 22, 2023, 9 pages.
Notice of Allowance received for U.S. Appl. No. 17/534,102, mailed on Jan. 11, 2023, 8 pages.
Notice of Allowance received for U.S. Appl. No. 17/534,102, mailed on May 2, 2023, 8 pages.
Notice of Allowance received for U.S. Appl. No. 17/561,043, mailed on May 30, 2023, 8 pages.
Office Action received for Australian Patent Application No. 2020201969, mailed on Sep. 25, 2020, 5 pages.
Office Action received for Australian Patent Application No. 2021203177, mailed on May 4, 2022, 7 pages.
Office Action received for Australian Patent Application No. 2022218463, mailed on Mar. 17, 2023, 2 pages.
Office Action received for Chinese Patent Application No. 201880051530.5, mailed on Sep. 6, 2021, 18 pages (6 pages of English Translation and 12 pages of Official Copy).
Office Action received for Chinese Patent Application No. 201880052303.4, mailed on Sep. 27, 2021, 20 pages (7 pages of English Translation and 13 pages of Official Copy).
Office Action received for Chinese Patent Application No. 201880055893.6, mailed on Sep. 6, 2021, 21 pages (6 pages of English Translation and 15 pages of Official Copy).
Office Action received for Chinese Patent Application No. 201880063680.8, mailed on Jan. 5, 2023, 20 pages (8 pages of English Translation and 12 pages of Official Copy).
Office Action received for Chinese Patent Application No. 201880063680.8, mailed on Jul. 29, 2023, 20 pages (6 pages of English Translation and 14 pages of Official Copy).

(56) References Cited

OTHER PUBLICATIONS

Office Action received for Chinese Patent Application No. 202010218168.5, mailed on Feb. 9, 2021, 21 pages (9 pages of English Translation and 12 pages of Official Copy).
Office Action received for Chinese Patent Application No. 202111323807.5, mailed on Jul. 15, 2022, 12 pages (6 pages of English Translation and 6 pages of Official Copy).
Office Action received for Chinese Patent Application No. 202210063070.6, mailed on Jan. 5, 2023, 12 pages (6 pages of English Translation and 6 pages of Official Copy).
Office Action received for Danish Patent Application No. PA201770563, mailed on Aug. 13, 2018, 5 pages.
Office Action received for Danish Patent Application No. PA201770563, mailed on Jan. 28, 2020, 3 pages.
Office Action received for Danish Patent Application No. PA201770563, mailed on Jun. 28, 2019, 5 pages.
Office Action received for Danish Patent Application No. PA201770719, mailed on Aug. 14, 2018, 6 pages.
Office Action received for Danish Patent Application No. PA201770719, mailed on Feb. 19, 2019, 4 pages.
Office Action received for Danish Patent Application No. PA201770719, mailed on Jan. 17, 2020, 4 pages.
Office Action received for Danish Patent Application No. PA201770719, mailed on Jun. 30, 2021, 3 pages.
Office Action received for Danish Patent Application No. PA201770719, mailed on Nov. 16, 2020, 5 pages.
Office Action received for Danish Patent Application No. PA201770719, mailed on Nov. 16, 2021, 2 pages.
Office Action received for European Patent Application No. 18704732.9, mailed on Sep. 7, 2021, 10 pages.
Office Action received for European Patent Application No. 18786644.7, mailed on Apr. 28, 2021, 6 pages.
Office Action received for European Patent Application No. 18793079.7, mailed on Jan. 22, 2021, 6 pages.
Office Action received for Indian Patent Application No. 201917053025, mailed on Mar. 19, 2021, 7 pages.
Office Action received for Indian Patent Application No. 202018006172, mailed on May 5, 2021, 6 pages.
Office Action received for Indian Patent Application No. 202118046032, mailed on Apr. 25, 2022, 6 pages.
Office Action received for Indian Patent Application No. 202118046033, mailed on Apr. 25, 2022, 7 pages.
Office Action received for Indian Patent Application No. 202118046044, mailed on Apr. 25, 2022, 6 pages.
Office Action received for Japanese Patent Application No. 2019-566087, mailed on Oct. 18, 2021, 10 pages (6 pages of English Translation and 4 pages of Official Copy).
Office Action received for Japanese Patent Application No. 2020-512573, mailed on Apr. 12, 2021, 7 pages (4 pages of English Translation and 3 pages of Official Copy).
Office Action received for Japanese Patent Application No. 2020-517967, mailed on May 24, 2021, 7 pages (4 pages of English Translation and 3 pages of Official Copy).
Office Action received for Japanese Patent Application No. 2020-517967, mailed on Sep. 13, 2021, 4 pages (2 pages of English Translation and 2 pages of Official Copy).
Office Action received for Japanese Patent Application No. 2021-142308, mailed on Oct. 31, 2022, 10 pages (7 pages of English Translation and 3 pages of Official Copy).
Office Action received for Japanese Patent Application No. 2022-027861, mailed on Nov. 21, 2022, 4 pages (2 pages of English Translation and 2 pages of Official Copy).
Office Action received for Korean Patent Application No. 10-2019-7035478, mailed on Jan. 17, 2020, 17 pages (9 pages of English Translation and 8 pages of Official Copy).
Office Action received for Korean Patent Application No. 10-2020-7006018, mailed on Oct. 9, 2021, 9 pages (4 pages of English Translation and 5 pages of Official Copy).
Office Action received for Korean Patent Application No. 10-2020-7009322, mailed on Apr. 23, 2021, 9 pages (4 pages of English Translation and 5 pages of Official Copy).
Office Action received for Korean Patent Application No. 10-2020-7021870, mailed on Nov. 11, 2020, 11 pages (5 pages of English Translation and 6 pages of Official Copy).
Office Action received for Korean Patent Application No. 10-2021-7020693, mailed on Jul. 14, 2021, 7 pages (3 pages of English Translation and 4 pages of Official Copy).
Office Action received for Korean Patent Application No. 10-2022-7006310, mailed on Mar. 8, 2022, 6 pages (2 pages of English Translation and 4 pages of Official Copy).
Office Action received for Korean Patent Application No. 10-2022-7022762, mailed on Apr. 11, 2023, 8 pages (4 pages of English Translation and 4 pages of Official Copy).
Office Action received for Korean Patent Application No. 10-2022-7022762, mailed on Jan. 27, 2023, 6 pages (3 pages of English Translation and 3 pages of Official Copy).
Office Action received for Korean Patent Application No. 10-2022-7022762, mailed on Jul. 19, 2022, 9 pages (4 pages of English Translation and 5 pages of Official Copy).
Office Action received for Korean Patent Application No. 10-2022-7043663, mailed on Jan. 6, 2023, 12 pages (5 pages of English Translation and 7 pages of Official Copy).
Office Action received for Korean Patent Application No. 10-2023-7022376, mailed on Jul. 26, 2023, 9 pages (4 pages of English Translation and 5 pages of Official Copy).
Paine Steve, "Samsung Galaxy Camera Detailed Overview—User Interface", Retrieved from: <https://www.youtube.com/watch?v=td8UYSySulo&feature=youtu.be>, Sep. 18, 2012, pp. 1-2.
Phonearena, "Sony Xperia Z5 camera app and UI overview", Retrieved from <https://www.youtube.com/watch?v=UtDzdTsmkfU&feature=youtu.be>, Sep. 8, 2015, pp. 1-3.
Search Report and Opinion received for Danish Patent Application No. PA201770563, mailed on Oct. 10, 2017, 9 pages.
Search Report received for Danish Patent Application No. PA201770719, mailed on Oct. 17, 2017, 9 pages.
Snapchat Lenses, "How to Get All Snapchat Lenses Face Effect Filter on Android", Retrieved from: <https://www.youtube.com/watch?v=0PfnF1RInfw&feature=youtu.be>, Sep. 21, 2015, pp. 1-2.
Special Effect, "Open Drive—Eye Gaze Games | Eye Gaze Controls & Options", Online Available at: https://www.youtube.com/watch?v=IJi2aOdSau8&t=63s, Mar. 18, 2022, 3 pages.
Stellmach et al., "Look & Touch: Gaze-supported Target Acquisition", CHI'12: Proceedings of the SIGGHI Conference on Human Factors in Computing Systems; Available online at: https://dl.acm.org/doi/10.1145/2207676.2208709, May 5-10, 2012, pp. 2981-2990.
Stellmach et al., "Still Looking: Investigating Seamless Gaze-supported Selection, Positioning, and Manipulation of Distant Targets", CHI'13: Proceedings of the SIGCHI Conference on Human Factors in Computing Systems; Available online at: https://dl.acm.org/doi/10.1145/2470654.2470695, Apr. 2013, pp. 285-294.
Summons to Attend Oral Proceedings received for European Patent Application No. 18786644.7, mailed on Nov. 10, 2022, 5 pages.
Supplemental Notice of Allowance received for U.S. Appl. No. 16/733,718, mailed on Mar. 9, 2021, 21 pages.
Supplemental Notice of Allowance received for U.S. Appl. No. 16/733,718, mailed on Mar. 29, 2021, 2 pages.
Takase et al., "Gestural Interface and the Intuitive Interaction with Virtual Objects", ICROS-SICE International Joint Conference, 2009, pp. 3260-3263.
Techtag, "Samsung J5 Prime Camera Review | True Review", Available online at:—https://www.youtube.com/watch?v=a_p906ai6PQ, Oct. 26, 2016, 3 pages.
Techtag, "Samsung J7 Prime Camera Review (Technical Camera)", Available Online at:—https://www.youtube.com/watch?v=AJPcLP8GpFQ, Oct. 4, 2016, 3 pages.
Vickgeek, "Canon 80D Live View Tutorial | Enhance your image quality", Available online at:—https://www.youtube.com/watch?v=JGNCiy6Wt9c, Sep. 27, 2016, 3 pages.

(56) References Cited

OTHER PUBLICATIONS

Wang Zichuan, "Transmissive smart glasses based on image recognition and gesture tracking", Innovation Technology Frontier, pp. 26-28 (Official Copy Only). {See Communication under 37 CFR § 1.98(a) (3)}.
X-Tech, "Test Make up via Slick Augmented Reality Mirror Without Putting It on", Available Online at: http://x-tech.am/test-make-up-via-slick-augmented-reality-mirror-without-putting-it-on/, Nov. 29, 2014, 5 pages.
Corrected Notice of Allowance received for U.S. Appl. No. 18/123,878, mailed on Nov. 5, 2024, 3 pages.
Non-Final Office Action received for U.S. Appl. No. 18/209,931, mailed on Oct. 22, 2024, 18 pages.
Notice of Allowance received for Korean Patent Application No. 10-2023-7022376, mailed on Oct. 21, 2024, 7 pages (2 pages of English Translation and 5 pages of Official Copy).
Applicant-Initiated Interview Summary received for U.S. Appl. No. 18/209,931, mailed on Feb. 3, 2025, 4 pages.
Intention to Grant received for European Patent Application No. 23204776.1, mailed on Feb. 25, 2025, 8 pages.
Notice of Allowance received for U.S. Appl. No. 18/234,583, mailed on Mar. 3, 2025, 2 pages.
Applicant-Initiated Interview Summary received for U.S. Appl. No. 19/017,062, mailed on May 28, 2025, 4 pages.
Decision to Grant received for Japanese Patent Application No. 2024-073909, mailed on May 29, 2025, 3 pages (1 page of English Translation and 2 pages of Official Copy).
Non-Final Office Action received for U.S. Appl. No. 18/811,647, mailed on Jun. 30, 2025, 12 pages.
Non-Final Office Action received for U.S. Appl. No. 19/017,062, mailed on Jun. 12, 2025, 21 pages.
Notice of Allowance received for U.S. Appl. No. 18/209,931, mailed on May 21, 2025, 16 pages.
Decision to Grant received for European Patent Application No. 23204776.1, mailed on Jul. 3, 2025, 4 pages.
Notice of Acceptance received for Australian Patent Application No. 2024200819, mailed on Jun. 30, 2025, 3 pages.
Notice of Allowance received for U.S. Appl. No. 18/373,158, mailed on Jul. 1, 2025, 15 pages.
Non-FInal Office Action received for U.S. Appl. No. 18/611,281, mailed on Jul. 14, 2025, 30 pages.

\* cited by examiner

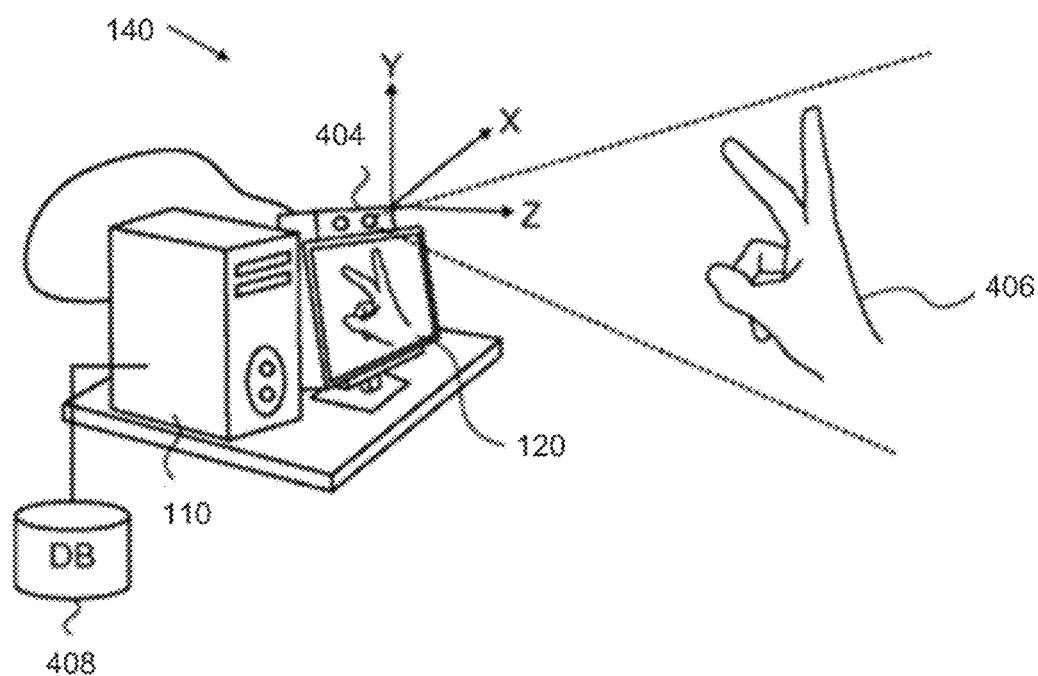
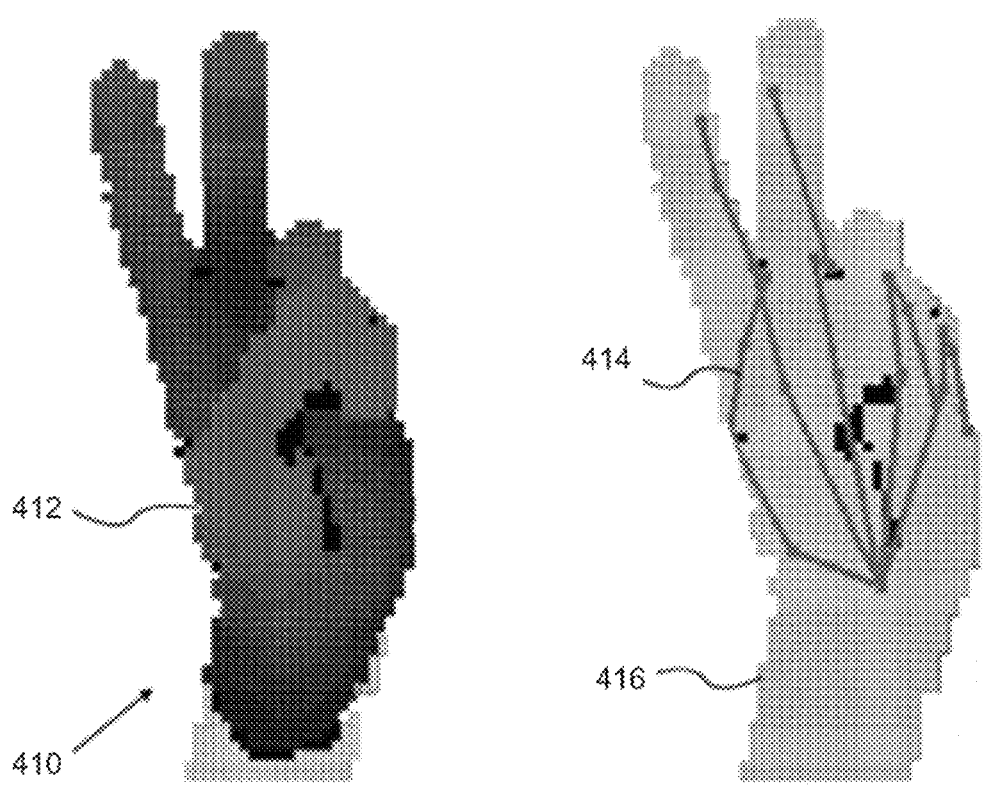
FIG. 4

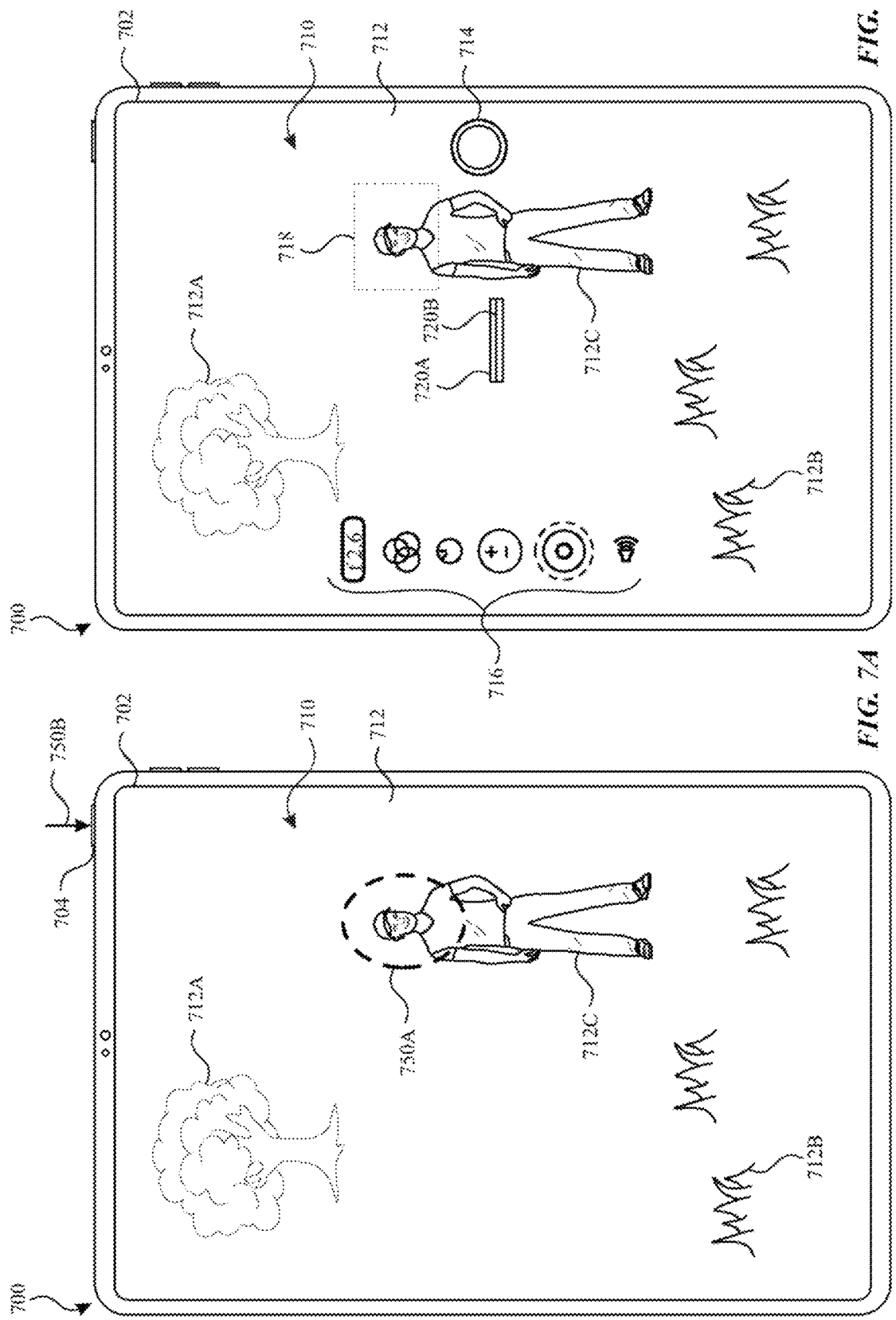

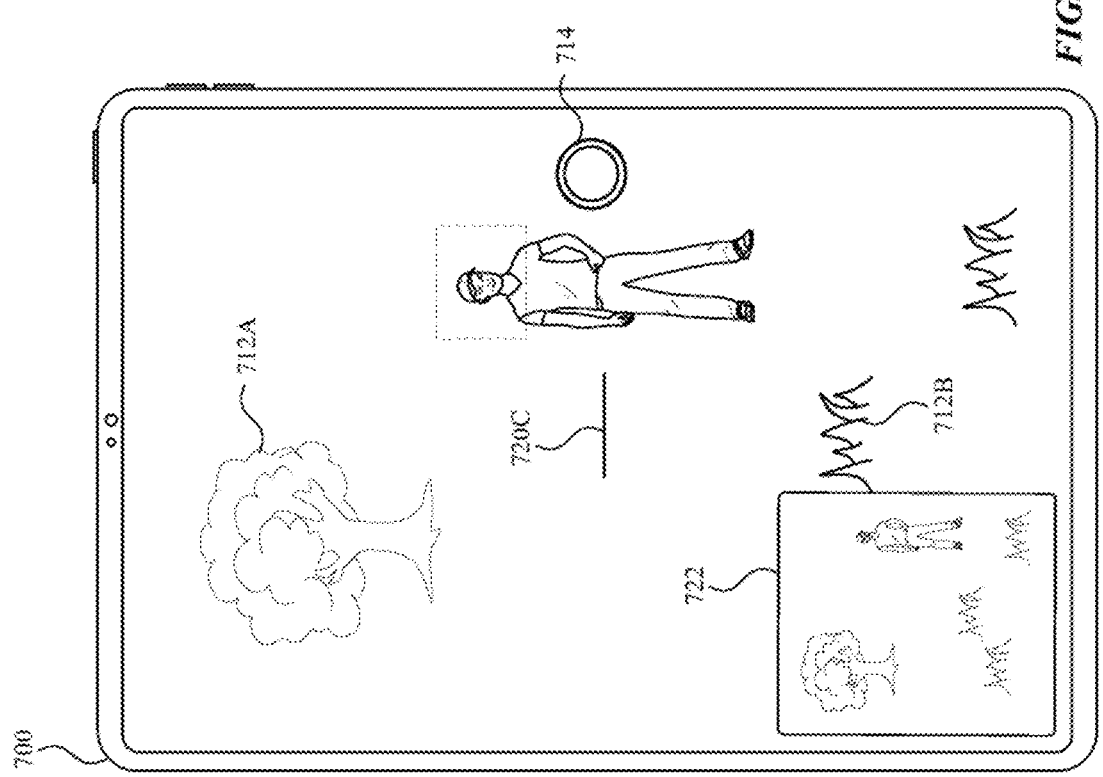
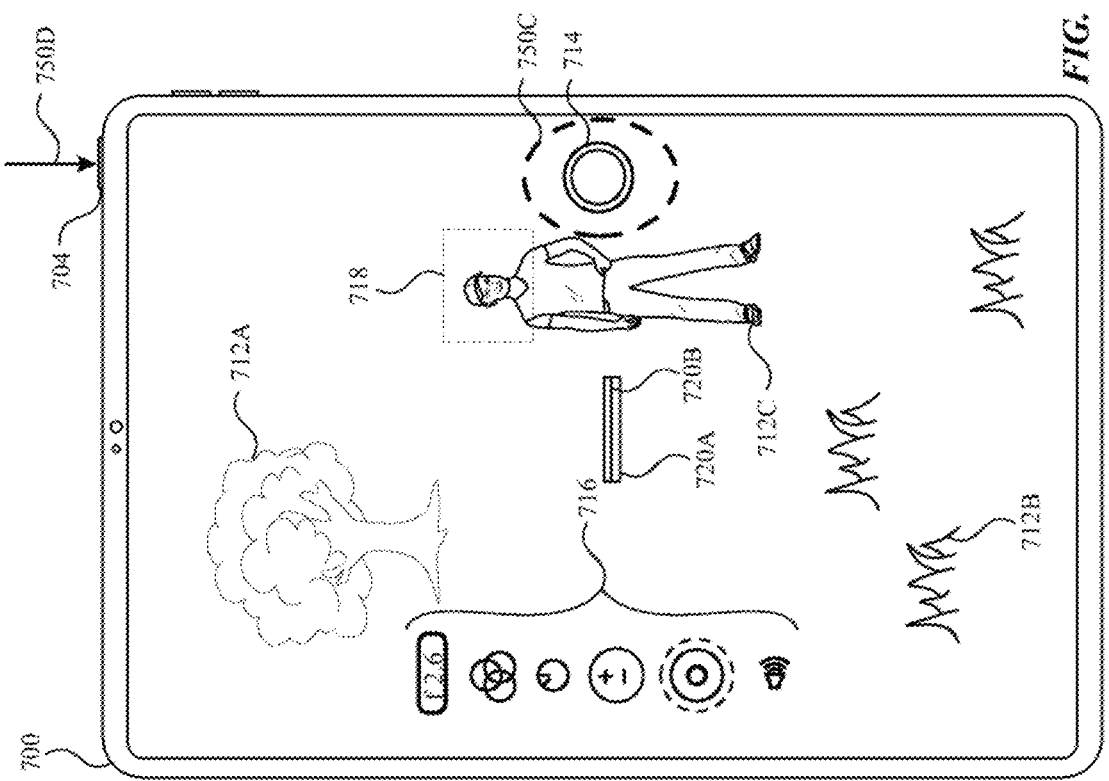

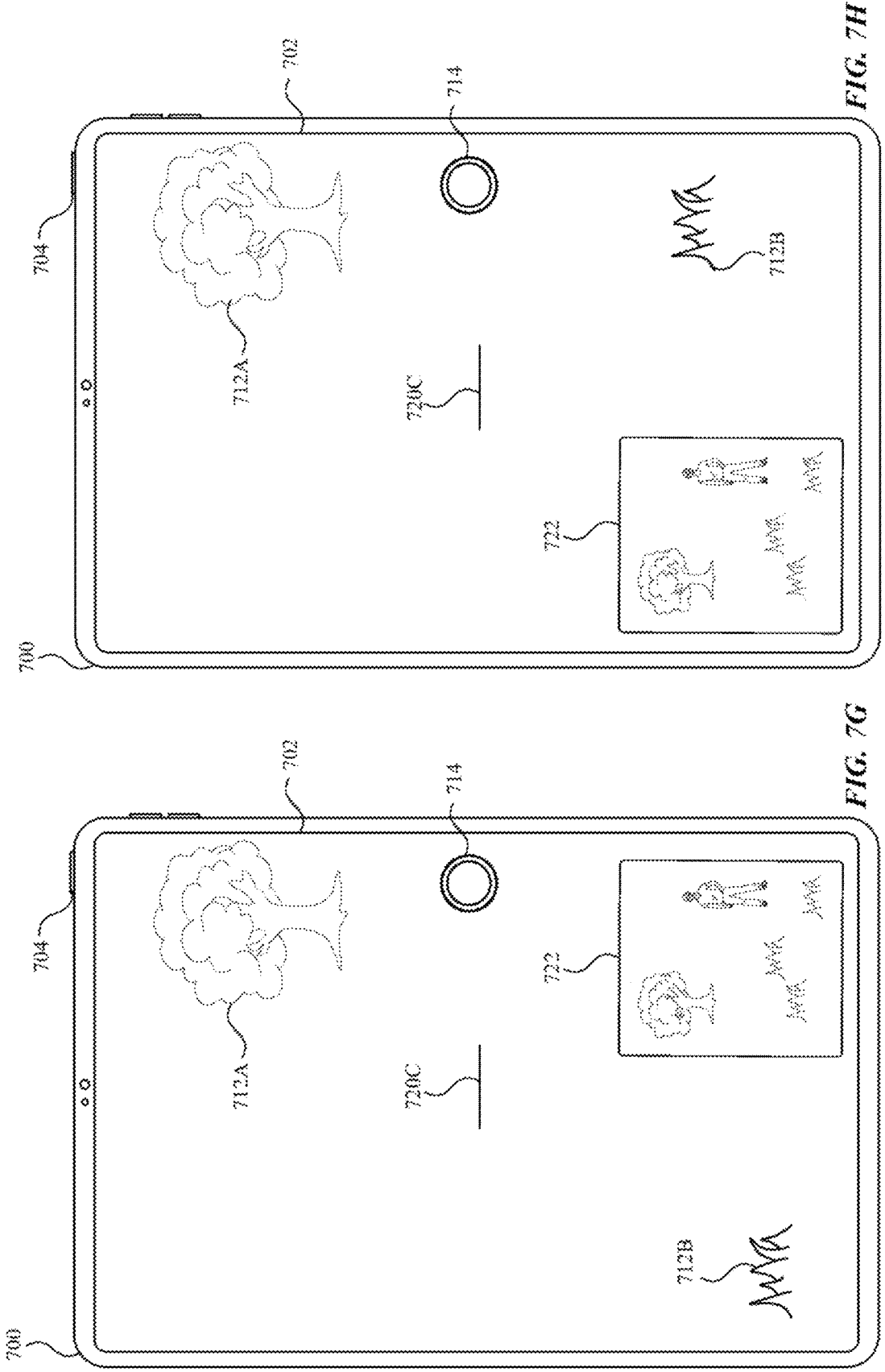

800 ⟶

802
Displaying, via the display generation component, a media capture user interface for capturing stereoscopic media that combines image information captured by the first camera and the second camera during a same time period, including a capture guide with a first portion of the capture guide and a second portion of the capture guide, wherein the first portion of the capture guide has a first appearance and the second portion of the capture guide has a second appearance.

804
While displaying the media capture user interface including the capture guide:

806
In accordance with a determination that an orientation of an axis between the first camera and the second camera has changed in a first manner relative to a physical environment, changing a position of the first portion of the capture guide relative to the second portion of the capture guide to indicate a change in orientation of the axis between the first camera and the second camera relative to the physical environment, wherein the changing includes changing an appearance of the first portion of the capture guide to have a same orientation relative to the physical environment before and after the change in orientation of the one or more input devices relative to the physical environment.

808
In accordance with a determination that the orientation of the axis between the first camera and the second camera has not changed in the first manner relative to the physical environment, maintaining the position of the first portion of the capture guide relative to the second portion of the capture guide.

*FIG. 8*

USER INTERFACES FOR CAPTURING MEDIA AND MANIPULATING VIRTUAL OBJECTS

CROSS-REFERENCE TO RELATED APPLICATIONS

This application claims priority to U.S. Provisional Patent Application 63/408,957, entitled "USER INTERFACES FOR CAPTURING MEDIA AND MANIPULATING VIRTUAL OBJECTS," filed Sep. 22, 2022, the contents of which is hereby incorporated by reference in its entirety.

TECHNICAL FIELD

The present disclosure relates generally to computer systems that are in communication with a display generation component and that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with a three-dimensional environment. Such methods and interfaces may complement or replace conventional methods for interacting with a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges. In some embodiments, such methods and interfaces enable a user to accurately position/align their device with respect to a physical environment. In some embodiments, such methods and interfaces enable a user to provide targeting information using gaze. In some embodiments, such methods and interfaces enable a user to manipulate a virtual object.

In accordance with some embodiments, a method is described. The method comprises: at a computer system that is in communication with a display generation component, one or more input devices, a first camera, and a second camera: displaying, via the display generation component, a media capture user interface for capturing stereoscopic media that combines image information captured by the first camera and the second camera during a same time period, including a capture guide with a first portion of the capture guide and a second portion of the capture guide, wherein the first portion of the capture guide has a first appearance and the second portion of the capture guide has a second appearance; and while displaying the media capture user interface including the capture guide: in accordance with a determination that an orientation of an axis between the first camera and the second camera has changed in a first manner relative to a physical environment, changing a position of the first portion of the capture guide relative to the second portion of the capture guide to indicate a change in orientation of the axis between the first camera and the second camera relative to the physical environment, wherein the changing includes changing an appearance of the first portion of the capture guide to have a same orientation relative to the physical environment before and after the change in orientation of the one or more input devices relative to the physical environment; and in accordance with a determination that the orientation of the axis between the first camera and the second camera has not changed in the first manner relative to the physical environment, maintaining the position of the first portion of the capture guide relative to the second portion of the capture guide.

In accordance with some embodiments a non-transitory computer-readable storage medium is described. The non-transitory computer-readable storage medium stores one or more programs configured to be executed by one or more processors of a computer system that is in communication with a display generation component, one or more input devices, a first camera, and a second camera, the one or more programs including instructions for: displaying, via the display generation component, a media capture user interface for capturing stereoscopic media that combines image information captured by the first camera and the second camera during a same time period, including a capture guide with a first portion of the capture guide and a second portion of the capture guide, wherein the first portion of the capture guide has a first appearance and the second portion of the capture guide has a second appearance; and while displaying the media capture user interface including the capture guide: in accordance with a determination that an orientation of an axis between the first camera and the second camera has changed in a first manner relative to a physical environment, changing a position of the first portion of the capture guide relative to the second portion of the capture guide to indicate a change in orientation of the axis between the first camera and the second camera relative to the physical environment, wherein the changing includes changing an appearance of the first portion of the capture guide to have a same orientation relative to the physical environment before and after the change in orientation of the one or more input devices relative to the physical environment; and in accordance with a determination that the orientation of the axis between the first camera and the second camera has not changed in the first manner relative to the physical environment, maintaining the position of the first portion of the capture guide relative to the second portion of the capture guide.

In accordance with some embodiments a transitory computer-readable storage medium is described. The transitory computer-readable storage medium stores one or more programs configured to be executed by one or more processors of a computer system that is in communication with a display generation component, one or more input devices, a first camera, and a second camera, the one or more programs including instructions for: displaying, via the display generation component, a media capture user interface for capturing stereoscopic media that combines image information captured by the first camera and the second camera during a same time period, including a capture guide with a first portion of the capture guide and a second portion of the capture guide, wherein the first portion of the capture guide has a first appearance and the second portion of the capture guide has a second appearance; and while displaying the media capture user interface including the capture guide: in accordance with a determination that an orientation of an axis between the first camera and the second camera has changed in a first manner relative to a physical environment, changing a position of the first portion of the capture guide relative to the second portion of the capture guide to indicate a change in orientation of the axis between the first camera and the second camera relative to the physical environment, wherein the changing includes changing an appearance of the first portion of the capture guide to have a same orientation relative to the physical environment before and after the change in orientation of the one or more input devices relative to the physical environment; and in accordance with a determination that the orientation of the axis between the first camera and the second camera has not changed in the first manner relative to the physical environment, maintaining the position of the first portion of the capture guide relative to the second portion of the capture guide.

In accordance with some embodiments, a computer system is described. The computer system is configured to communicate with a display generation component, one or more input devices, a first camera, and a second camera. The computer system comprises: one or more processors; and memory storing one or more programs configured to be executed by the one or more processors, the one or more programs including instructions for: displaying, via the display generation component, a media capture user interface for capturing stereoscopic media that combines image information captured by the first camera and the second camera during a same time period, including a capture guide with a first portion of the capture guide and a second portion of the capture guide, wherein the first portion of the capture guide has a first appearance and the second portion of the capture guide has a second appearance; and while displaying the media capture user interface including the capture guide: in accordance with a determination that an orientation of an axis between the first camera and the second camera has changed in a first manner relative to a physical environment, changing a position of the first portion of the capture guide relative to the second portion of the capture guide to indicate a change in orientation of the axis between the first camera and the second camera relative to the physical environment, wherein the changing includes changing an appearance of the first portion of the capture guide to have a same orientation relative to the physical environment before and after the change in orientation of the one or more input devices relative to the physical environment; and in accordance with a determination that the orientation of the axis between the first camera and the second camera has not changed in the first manner relative to the physical environment, maintaining the position of the first portion of the capture guide relative to the second portion of the capture guide.

In accordance with some embodiments, a computer system is described. The computer system is configured to communicate with a display generation component, one or more input devices, a first camera, and a second camera. The computer system comprises: means for displaying, via the display generation component, a media capture user interface for capturing stereoscopic media that combines image information captured by the first camera and the second camera during a same time period, including a capture guide with a first portion of the capture guide and a second portion of the capture guide, wherein the first portion of the capture guide has a first appearance and the second portion of the capture guide has a second appearance; and means, while displaying the media capture user interface including the capture guide, for: in accordance with a determination that an orientation of an axis between the first camera and the second camera has changed in a first manner relative to a physical environment, changing a position of the first portion of the capture guide relative to the second portion of the capture guide to indicate a change in orientation of the axis between the first camera and the second camera relative to the physical environment, wherein the changing includes changing an appearance of the first portion of the capture guide to have a same orientation relative to the physical environment before and after the change in orientation of the one or more input devices relative to the physical environment; and in accordance with a determination that the orientation of the axis between the first camera and the second camera has not changed in the first manner relative to the physical environment, maintaining the position of the first portion of the capture guide relative to the second portion of the capture guide.

In accordance with some embodiments, a computer program product is described. The computer program product comprises one or more programs configured to be executed by one or more processors of a computer system that is in communication with a display generation component, one or more input devices, a first camera, and a second camera. The one or more programs include instructions for: displaying, via the display generation component, a media capture user interface for capturing stereoscopic media that combines image information captured by the first camera and the second camera during a same time period, including a capture guide with a first portion of the capture guide and a second portion of the capture guide, wherein the first portion of the capture guide has a first appearance and the second portion of the capture guide has a second appearance; and while displaying the media capture user interface including the capture guide: in accordance with a determination that an orientation of an axis between the first camera and the second camera has changed in a first manner relative to a physical environment, changing a position of the first portion of the capture guide relative to the second portion of the capture guide to indicate a change in orientation of the axis between the first camera and the second camera relative to the physical environment, wherein the changing includes changing an appearance of the first portion of the capture guide to have a same orientation relative to the physical environment before and after the change in orientation of the one or more input devices relative to the physical environment; and in accordance with a determination that the orientation of the axis between the first camera and the second camera has not changed in the first manner relative to the physical environment, maintaining the position of the first portion of the capture guide relative to the second portion of the capture guide.

In accordance with some embodiments, a method is described. The method comprises: at a computer system that is in communication with a display generation component and a hardware input device: displaying, via the display generation component, a user interface including a first portion of the user interface and a second portion of the user interface, wherein the second portion of the user interface is different from the first portion of the user interface; detecting activation of the hardware input device; and in response to detecting the activation of the hardware input device: in accordance with a determination that the attention of a user is directed to the first portion of the user interface, performing a first operation; and in accordance with a determination that the attention of the user is directed to the second portion of the user interface, performing a second operation that is different from the first operation.

In accordance with some embodiments, a non-transitory computer-readable storage medium is described. The non-transitory computer-readable storage medium stores one or more programs configured to be executed by one or more processors of a computer system that is in communication with a display generation component and a hardware input device. The one or more programs including instructions for: displaying, via the display generation component, a user interface including a first portion of the user interface and a second portion of the user interface, wherein the second portion of the user interface is different from the first portion of the user interface; detecting activation of the hardware input device: and in response to detecting the activation of the hardware input device: in accordance with a determination that the attention of a user is directed to the first portion of the user interface, performing a first operation; and in accordance with a determination that the attention of the user is directed to the second portion of the user interface, performing a second operation that is different from the first operation.

In accordance with some embodiments, a transitory computer-readable storage medium is described. The transitory computer-readable storage medium stores one or more programs configured to be executed by one or more processors of a computer system that is in communication with a display generation component and a hardware input device. The one or more programs including instructions for: displaying, via the display generation component, a user interface including a first portion of the user interface and a second portion of the user interface, wherein the second portion of the user interface is different from the first portion of the user interface; detecting activation of the hardware input device; and in response to detecting the activation of the hardware input device: in accordance with a determination that the attention of a user is directed to the first portion of the user interface, performing a first operation; and in accordance with a determination that the attention of the user is directed to the second portion of the user interface, performing a second operation that is different from the first operation.

In accordance with some embodiments, a computer system is described. The computer system is configured to communicate with a display generation component and a hardware input device. The computer system comprises: one or more processors; and memory storing one or more programs configured to be executed by the one or more processors, the one or more programs including instructions for: displaying, via the display generation component, a user interface including a first portion of the user interface and a second portion of the user interface, wherein the second portion of the user interface is different from the first portion of the user interface; detecting activation of the hardware input device; and in response to detecting the activation of the hardware input device: in accordance with a determination that the attention of a user is directed to the first portion of the user interface, performing a first operation; and in accordance with a determination that the attention of the user is directed to the second portion of the user interface, performing a second operation that is different from the first operation.

In accordance with some embodiments, a computer system is described. The computer system is configured to communicate with a display generation component and a hardware input device. The computer system comprises: means for displaying, via the display generation component, a user interface including a first portion of the user interface and a second portion of the user interface, wherein the second portion of the user interface is different from the first portion of the user interface; means for detecting activation of the hardware input device; and means, responsive to detecting the activation of the hardware input device, for: in accordance with a determination that the attention of a user is directed to the first portion of the user interface, performing a first operation: and in accordance with a determination that the attention of the user is directed to the second portion of the user interface, performing a second operation that is different from the first operation.

In accordance with some embodiments, a computer program product is described. The computer program product comprises one or more programs configured to be executed by one or more processors of a computer system that is in communication with a display generation component and a hardware input device. The one or more programs include instructions for: displaying, via the display generation component, a user interface including a first portion of the user interface and a second portion of the user interface, wherein the second portion of the user interface is different from the first portion of the user interface; detecting activation of the hardware input device; and in response to detecting the activation of the hardware input device: in accordance with a determination that the attention of a user is directed to the first portion of the user interface, performing a first operation; and in accordance with a determination that the attention of the user is directed to the second portion of the user interface, performing a second operation that is different from the first operation.

In accordance with some embodiments, a method is described. The method comprises: at a computer system that is in communication with a display generation component and one or more input devices: detecting input corresponding to a request to display a virtual object; in response to detecting the input: in accordance with a determination that the virtual object is a first type, displaying, via the display generation component, the virtual object at a first location corresponding to a physical object: while displaying the virtual object at the first location, detecting, via the one or more input devices, a change in location of the physical object with respect to a viewpoint of a user; and in response to detecting the change in location of the physical object with respect to the viewpoint of the user, displaying, via the display generation component, the virtual object at a second location different from the first location, wherein the second location corresponds to the location of the physical object.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for detecting input corresponding to a request to display a virtual object; in response to detecting the input: in accordance with a determination that the virtual object is a first type, displaying, via the display generation component, the virtual object at a first location corresponding to a physical object; while displaying the virtual object at the first location, detecting, via the one or more input devices, a change in location of the physical object with respect to a viewpoint of a user; and in response to detecting the change in location of the physical object with respect to the viewpoint of the user, displaying, via the display generation component, the virtual object at a second location different from the first location, wherein the second location corresponds to the location of the physical object.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: detecting input corresponding to a request to display a virtual object: in response to detecting the input: in accordance with a determination that the virtual object is a first type, displaying, via the display generation component, the virtual object at a first location corresponding to a physical object; while displaying the virtual object at the first location, detecting, via the one or more input devices, a change in location of the physical object with respect to a viewpoint of a user; and in response to detecting the change in location of the physical object with respect to the viewpoint of the user, displaying, via the display generation component, the virtual object at a second location different from the first location, wherein the second location corresponds to the location of the physical object.

In accordance with some embodiments, a computer system is described. The computer system is configured to communicate with a display generation component and one or more input devices. The computer system comprises: one or more processors; and memory storing one or more programs configured to be executed by the one or more processors, the one or more programs including instructions for: detecting input corresponding to a request to display a virtual object; in response to detecting the input: in accordance with a determination that the virtual object is a first type, displaying, via the display generation component, the virtual object at a first location corresponding to a physical object; while displaying the virtual object at the first location, detecting, via the one or more input devices, a change in location of the physical object with respect to a viewpoint of a user; and in response to detecting the change in location of the physical object with respect to the viewpoint of the user, displaying, via the display generation component, the virtual object at a second location different from the first location, wherein the second location corresponds to the location of the physical object.

In accordance with some embodiments, a computer system is described. The computer system is configured to communicate with a display generation component and one or more input devices. The computer system comprises: means for detecting input corresponding to a request to display a virtual object; means, responsive to detecting the input, for: in accordance with a determination that the virtual object is a first type, displaying, via the display generation component, the virtual object at a first location corresponding to a physical object; means, while displaying the virtual object at the first location, for detecting, via the one or more input devices, a change in location of the physical object with respect to a viewpoint of a user: and means, responsive to detecting the change in location of the physical object with respect to the viewpoint of the user, for displaying, via the display generation component, the virtual object at a second location different from the first location, wherein the second location corresponds to the location of the physical object.

In accordance with some embodiments, a computer program product is described. The computer program product comprises one or more programs configured to be executed by one or more processors of a computer system that is in communication with a display generation component and one or more input devices. The one or more programs include instructions for: detecting input corresponding to a request to display a virtual object; in response to detecting the input: in accordance with a determination that the virtual object is a first type, displaying, via the display generation component, the virtual object at a first location corresponding to a physical object; while displaying the virtual object at the first location, detecting, via the one or more input devices, a change in location of the physical object with respect to a viewpoint of a user; and in response to detecting the change in location of the physical object with respect to the viewpoint of the user, displaying, via the display generation component, the virtual object at a second location different from the first location, wherein the second location corresponds to the location of the physical object.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4 is a block diagram illustrating a hand tracking unit of a computer system that is configured to capture gesture inputs of the user in accordance with some embodiments.

FIGS. 7A-7H illustrate exemplary techniques for displaying a media capture user interface that includes a capture guide, in accordance with some embodiments.

FIG. 8 is a flow diagram of methods of displaying a media capture user interface that includes a capture guide, in accordance with various embodiments.

DESCRIPTION OF EMBODIMENTS

The present disclosure relates to user interfaces for providing an extended reality (XR) experience to a user, in accordance with some embodiments.

The systems, methods, and GUIs described herein improve user interface interactions with virtual/augmented reality environments in multiple ways.

In some embodiments, a computer system allows a user to accurately position and/or align the computer system with respect to a physical environment. In some embodiments, a computer system allows a user to provide targeting information using the user's gaze. In some embodiments, a computer system allows a user to manipulate a virtual object.

Figure 9B:
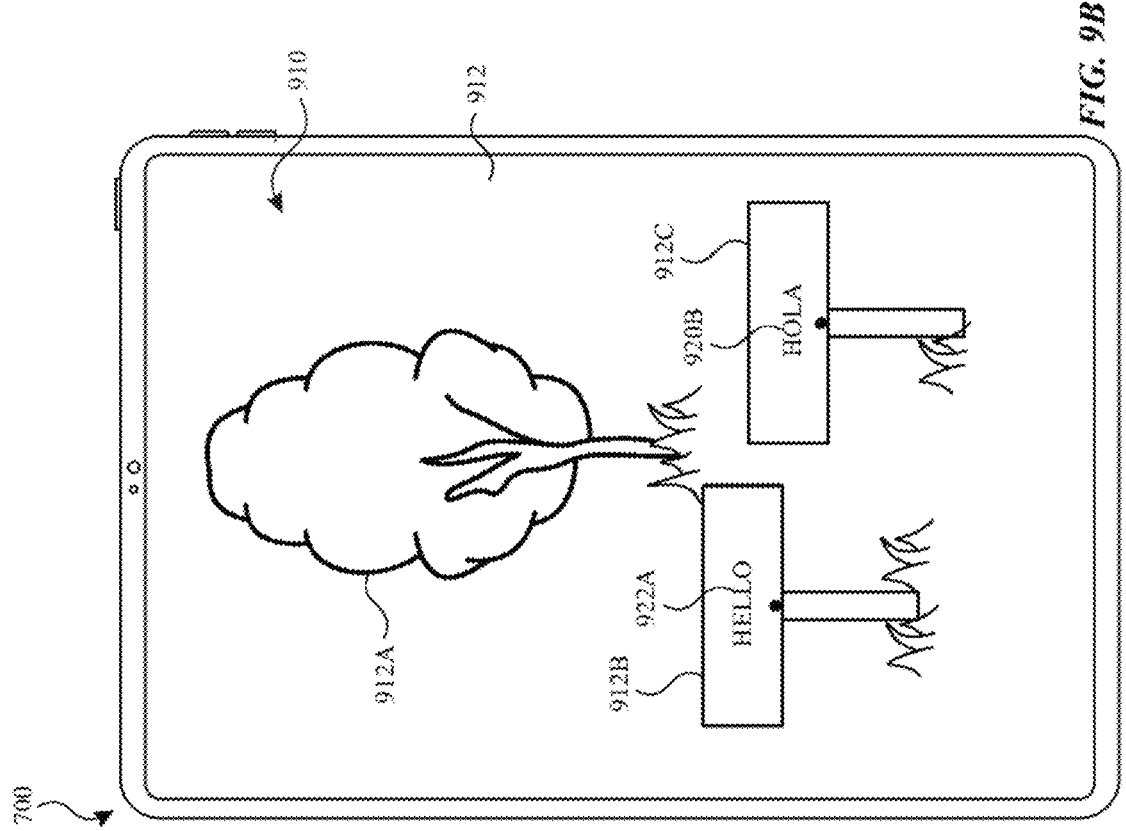
FIGS. 9A-9D illustrate exemplary techniques for using gaze information for targeting, in accordance with some embodiments.
Figure 10:
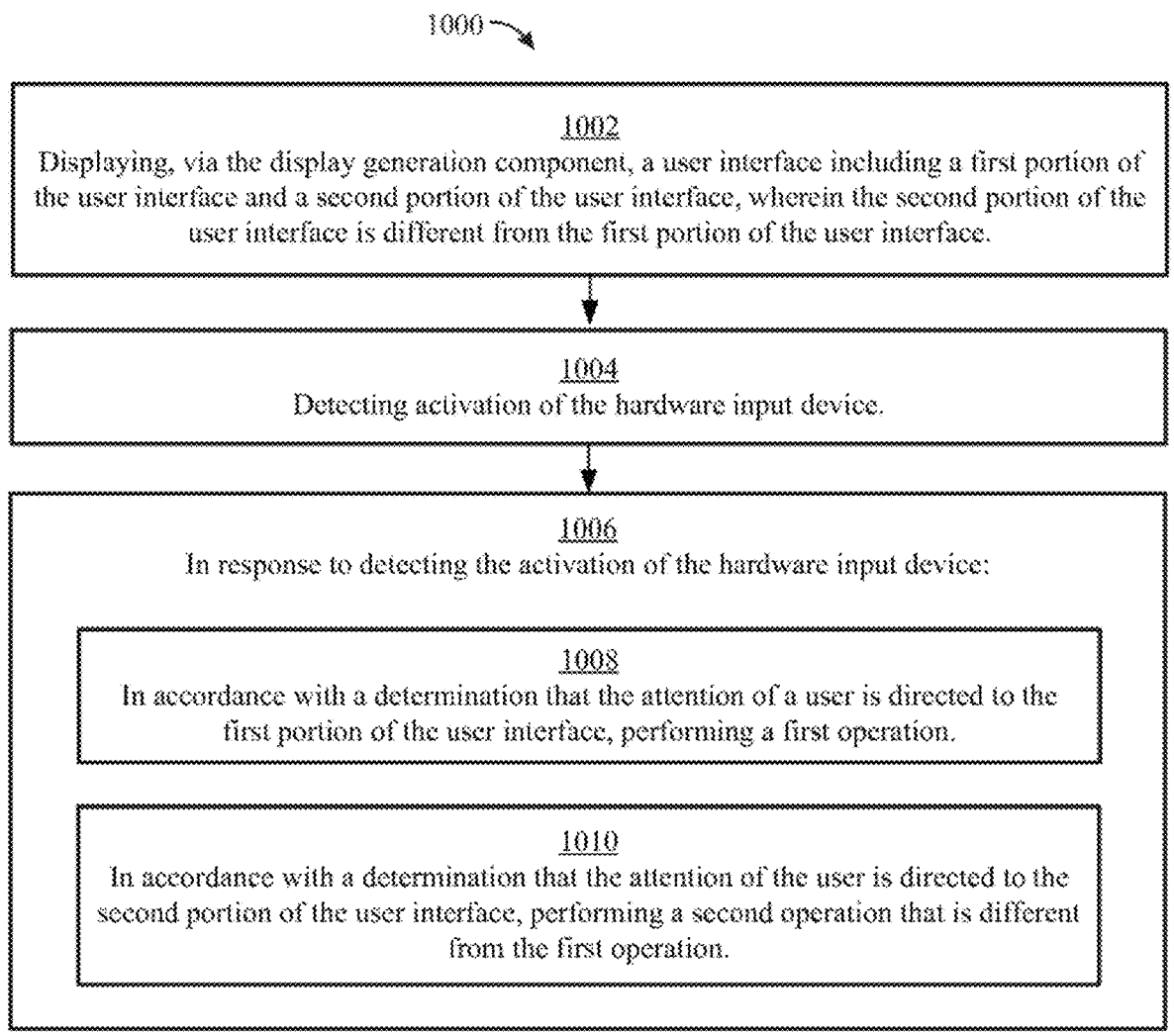
FIG. 10 is a flow diagram of methods of using gaze information for targeting, in accordance with various embodiments.
Figure 11B:
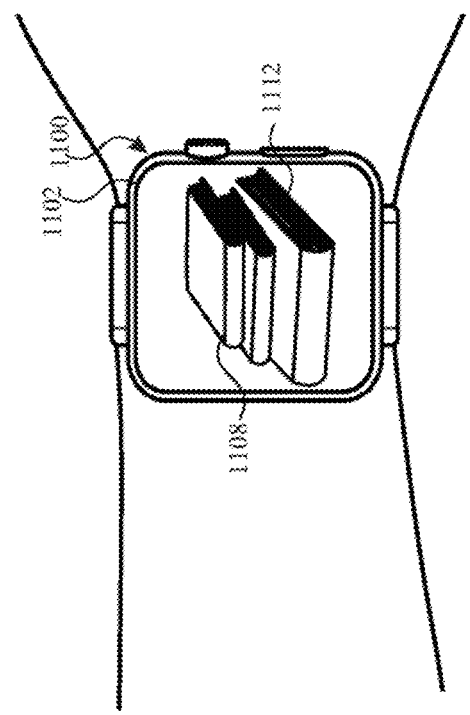
FIGS. 11A-11E illustrate exemplary techniques for manipulating a virtual object, in accordance with some embodiments.

FIGS. 1-6 provide a description of example computer systems for providing XR experiences to users. FIGS. 7A-7H illustrate exemplary techniques for displaying a media capture user interface that includes a capture guide, in accordance with some embodiments. FIG. 8 is a flow diagram of methods of displaying a media capture user interface that includes a capture guide, in accordance with various embodiments. The user interfaces in FIGS. 7A-7H are used to illustrate the processes in FIGS. 8 and 10. FIGS. 9A-9D illustrate exemplary techniques for using gaze information for targeting, in accordance with some embodiments. FIG. 10 is a flow diagram of methods of using gaze information for targeting, in accordance with various embodiments. The user interfaces in FIGS. 9A-9D are used to illustrate the processes in FIG. 10. FIGS. 11A-11E illustrate exemplary techniques for manipulating a virtual object, in accordance with some embodiments. FIG. 12 is a flow diagram of methods of manipulating a virtual object, in accordance with various embodiments. The user interfaces in FIGS. 11A-11E are used to illustrate the processes in FIG. 12.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Figure 1:
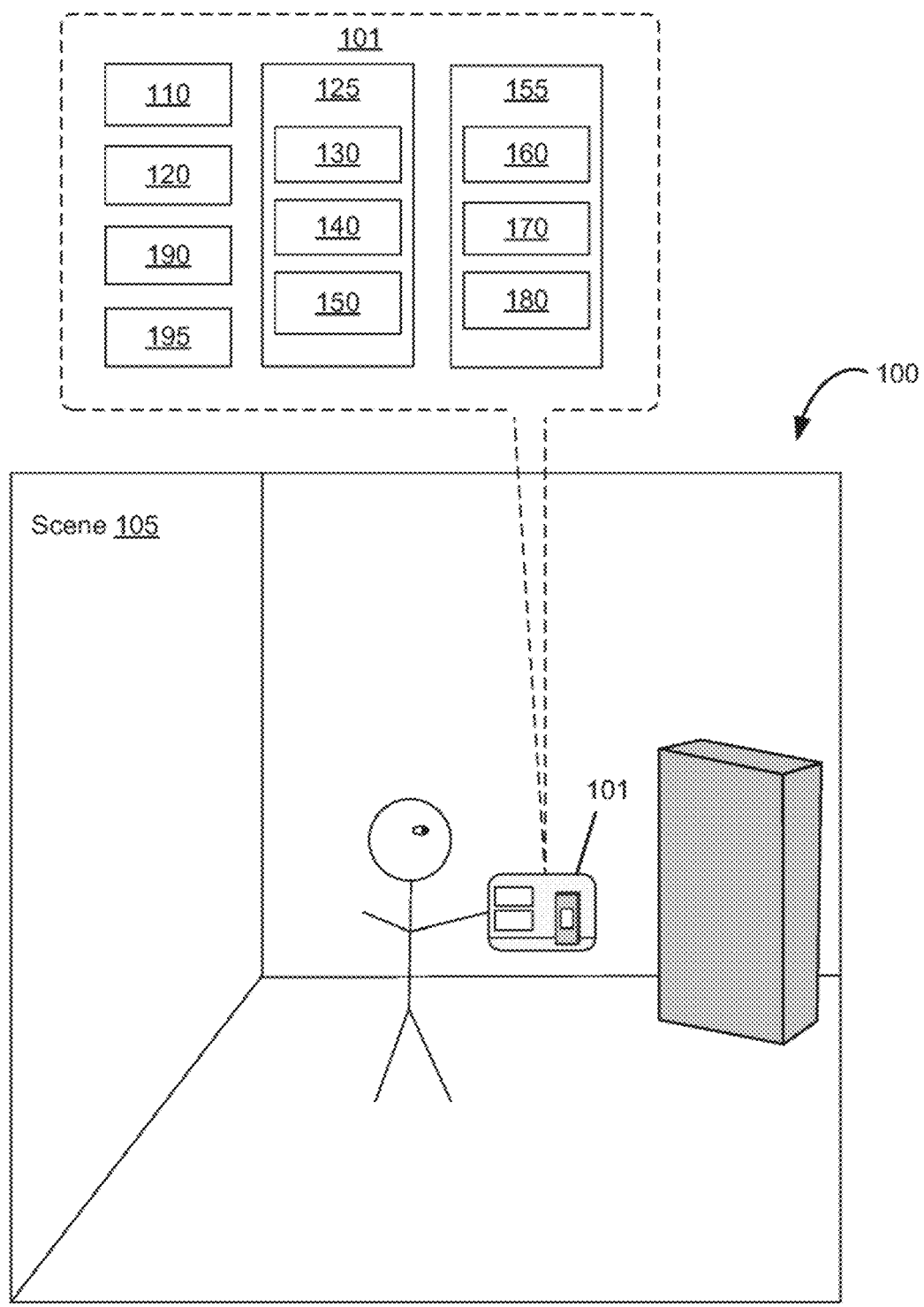
FIG. 1 is a block diagram illustrating an operating environment of a computer system for providing XR experiences in accordance with some embodiments.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof).

For example, a system may account for movements so that a virtual tree appears stationary with respect to the physical ground.

Examples of mixed realities include augmented reality and augmented virtuality. Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field of view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

In some embodiments, spatial media includes spatial visual media and/or spatial audio. In some embodiments, a spatial capture is a capture of spatial media. In some embodiments, spatial visual media (also referred to as stereoscopic media) (e.g., a spatial image and/or a spatial video) is media that includes two different images or sets of images, representing two perspectives of the same or overlapping fields-of-view, for concurrent display. A first image representing a first perspective is presented to a first eye of the viewer and a second image representing a second perspective, different from the first perspective, is concurrently presented to a second eye of the viewer. The first image and the second image have the same or overlapping fields-of-view. In some embodiments, a computer system displays the first image via a first display that is positioned for viewing by the first eye of the viewer and concurrently displays the second image via a second display, different from the first display, that is position for viewing by the second eye of the viewer. In some embodiments, the first image and the second image, when viewed together, create a depth effect and provide the viewer with depth perception for the contents of the images. In some embodiments, a first video representing a first perspective is presented to a first eye of the viewer and a second video representing a second perspective, different from the first perspective, is concurrently presented to a second eye of the viewer. The first video and the second video have the same or overlapping fields-of-view. In some embodiments, the first video and the second video, when viewed together, create a depth effect and provide the viewer with depth perception for the contents of the videos.

In some embodiments, spatial audio experiences in headphones are produced by manipulating sounds in the headphone's two audio channels (e.g., left and right) so that they resemble directional sounds arriving in the ear-canal. For example, the headphones can reproduce a spatial audio signal that simulates a soundscape around the listener (also referred to as the user). An effective spatial sound reproduction can render sounds such that the listener perceives the sound as coming from a location within the soundscape external to the listener's head, just as the listener would experience the sound if encountered in the real world.

The geometry of the listener's ear, and in particular the outer ear (pinna), has a significant effect on the sound that arrives from a sound source to a listener's eardrum. The spatial audio sound experience is possible by taking into account the effect of the listener's pinna, the listener's head, and/or the listener's torso to the sound that enters to the listener's ear-canal. The geometry of the user's ear is optionally determined by using a three-dimensional scanning device that produces a three-dimensional model of at least a portion of the visible parts of the user's ear. This geometry is optionally used to produce a filter for producing the spatial audio experience. In some embodiments, spatial audio is audio that has been filtered such that a listener of the audio perceives the audio as coming from one or more directions and/or locations in three-dimensional space (e.g., from above, below, and/or in front of the listener).

An example of such a filter is a Head-Related Transfer Function (HRTF) filter. These filters are used to provide an effect that is similar to how a human ear, head, and torso filter sounds. When the geometry of the ears of a listener is known, a personalized filter (e.g., a personalized HRTF filter) can be produced so that the sound experienced by that listener through headphones (e.g., in-ear headphones, on-ear headphones, and/or over-ear headphones) is more realistic. In some embodiments, two filters are produced-one filter per ear-so that each ear of the listener has a corresponding personalized filter (e.g., personalized HRTF filter), as the ears of the listener may be of different geometry.

In some embodiments, a HRTF filter includes some (or all) acoustic information required to describe how sound reflects or diffracts around a listener's head before entering the listener's auditory system. In some embodiments, a personalized HRTF filter can be selected from a database of previously determined HRTFs for users having similar anatomical characteristics. In some embodiments, a personalized HRTF filter can be generated by numerical modeling based on the geometry of the listener's ear. One or more processors of the computer system optionally apply the personalized HRTF filter for the listener to an audio input signal to generate a spatial input signal for playback by headphones that are connected (e.g., wirelessly or by wire) to the computer system.

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may include speakers and/or other audio output devices integrated into the head-mounted system for providing audio output. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touchscreen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field of view of the user. In some embodiments, the display generation component 120 is a handheld device (such as a smartphone or tablet) configured to present XR content, and the user holds the device with a display directed towards the field of view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR, content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
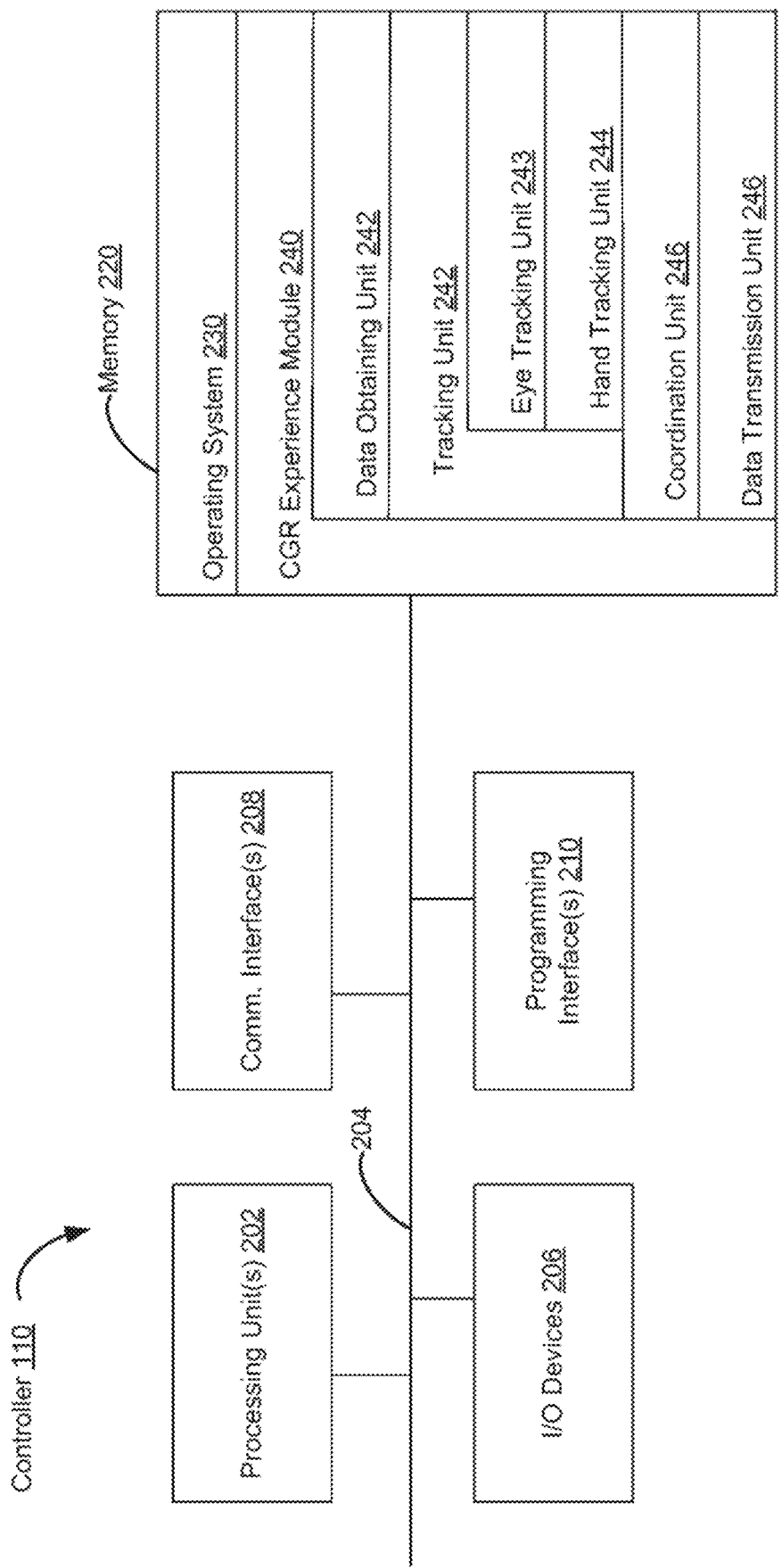
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIRE WIRE, THUNDERBOLT, IEEE 802.3x, IEEE 802.11 x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
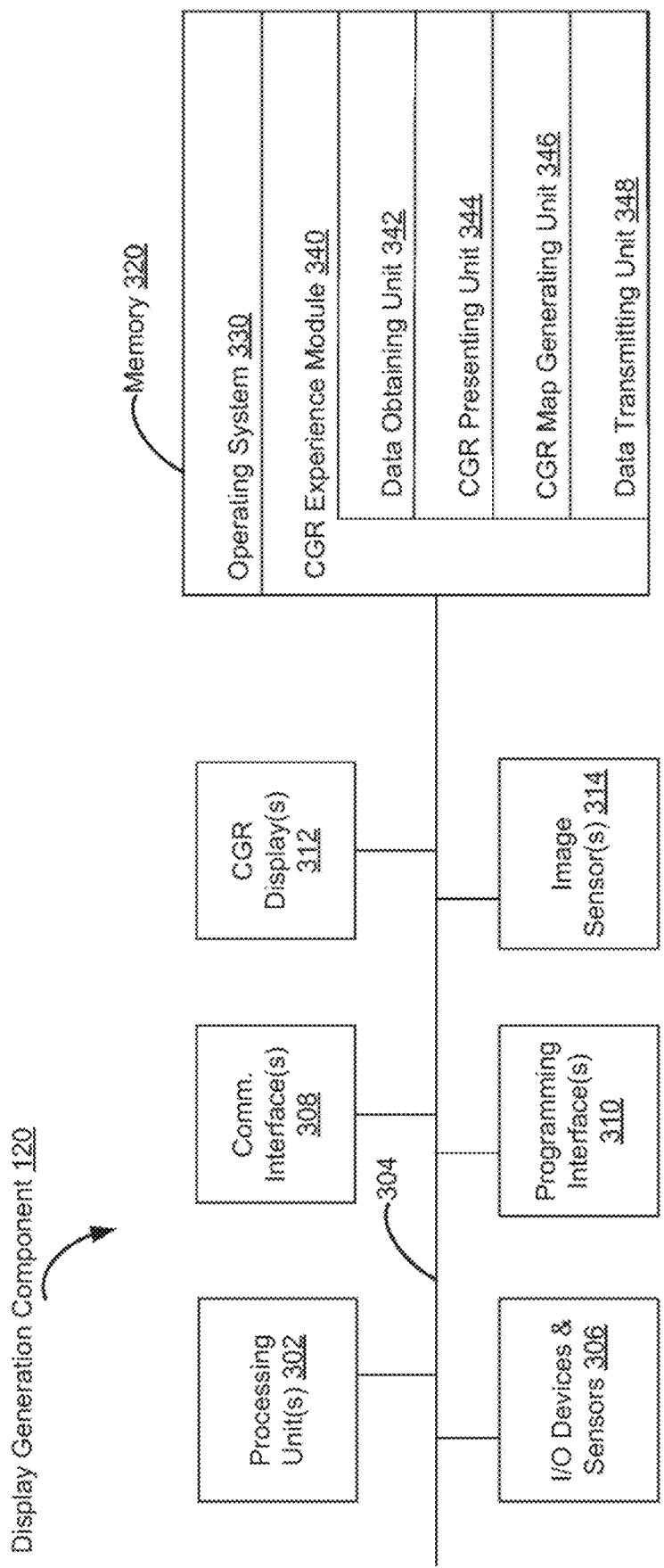
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

FIG. 4 is a schematic, pictorial illustration of an example embodiment of the hand tracking device 140. In some embodiments, hand tracking device 140 (FIG. 1) is controlled by hand tracking unit 244 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand). In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) (or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user, user inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, wherein the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
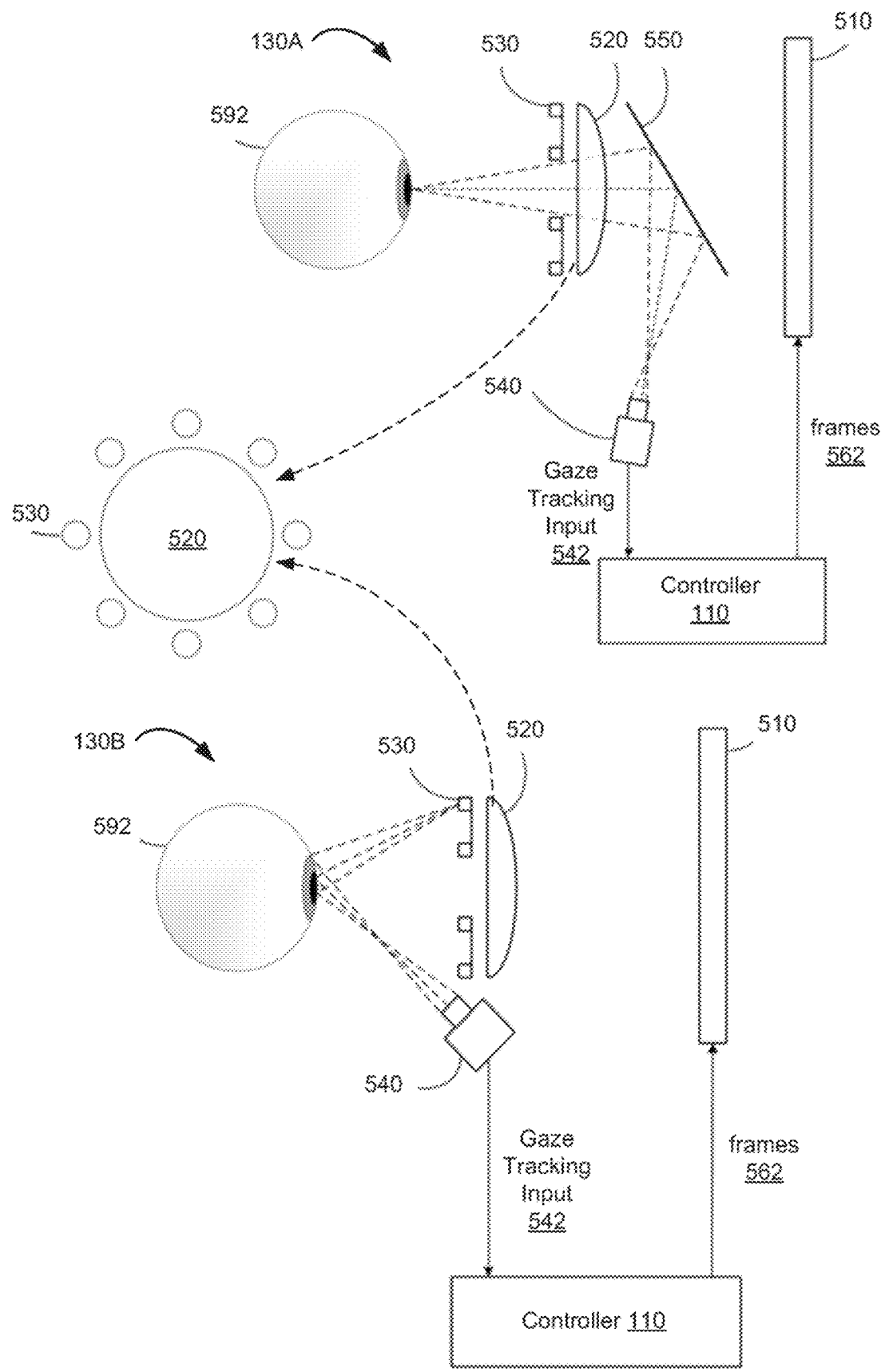
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., JR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected JR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs)), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and or augmented virtuality experiences to the user.

Figure 6:
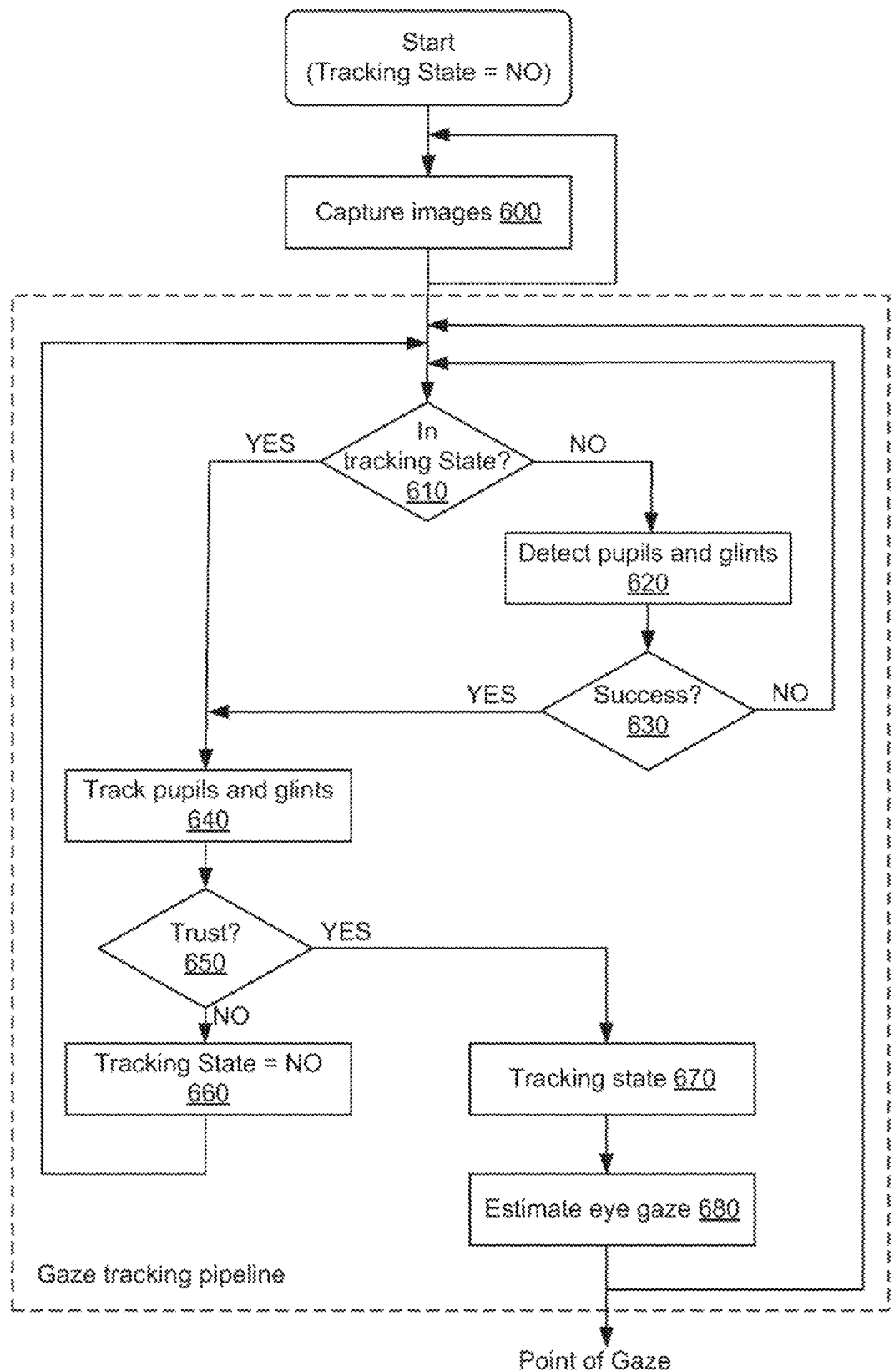
FIG. 6 is a flow diagram illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with a display generation component, one or more input devices, and (optionally) one or cameras.

FIGS. 7A-7H illustrate exemplary techniques for displaying a media capture user interface that includes a capture guide, in accordance with some embodiments. FIG. 8 is a flow diagram of an exemplary method 800 for displaying a media capture user interface that includes a capture guide, in accordance with various embodiments. The user interfaces in FIGS. 7A-7H are used to illustrate the processes described below, including the processes in FIG. 8.

FIG. 7A illustrates computer system 700 with a display generation component (e.g., display 702), hardware input device 704 (e.g., a physical button), and two camera sensors (e.g., a first camera and a second camera). At FIG. 7A, computer system 700 is displaying, via a display generation component (e.g., display 702), user interface 710 of a camera application. In some embodiments, computer system 700 is configured to present virtual objects on one or more transparent or translucent displays, so that a person, using the system, perceives virtual objects superimposed over the physical environment. In some embodiments, computer system 700 is configured to use pass-through video, meaning one or more camera or image sensors capture images of the physical environment, and uses those images in presenting the AR environment on the opaque display.

In some embodiments, user interface 710 includes display of a viewfinder 712 that optionally includes a representation of a field of view of the first camera, the second camera, and/or the overlap between the fields-of-view of the first camera and the second camera. Although FIGS. 7A-7H illustrate techniques using computer system 700 that is a tablet, the techniques are optionally also applicable using a head-mounted device. In some embodiments where computer system 700 is a head-mounted device, computer system 700 optionally includes two displays (one for each eye of the user of computer system 700), with each display displaying a field of view of a respective camera, to enable the user to perceive depth of the field of view of the two camera sensors.

As shown in FIG. 7A, the representation of the field of view includes tree 712A that is at a first depth (far back) in the field of view, shrubs 712B that are at a second depth (close) in the field of view, and person 712C that is at a third depth (intermediate and/or closer than the physical tree and further than the shrubs) in the field of view.

At FIG. 7A, while computer system 700 detects (e.g., via eye tracking device 130 and/or one or more sensors of computer system 700) a gaze 750A of the user of computer system 700 being directed to representation 712C of the person, computer system 700 detects a first type of input 750B on (e.g., resting a finger on, a first amount of pressure, and/or without depressing) hardware input device 704.

As illustrated in FIG. 7B, in response to detecting first type of input 750B, computer system 700 displays a capture guide, including first camera reticle 720A and second camera reticle 720B. In some embodiments, in response to detecting first type of input 750B, computer system 700 also displays shutter user interface object 714 and camera controls 716. Camera controls 716 include controls for modifying the media being captured, such as by modifying the f-stop, color balance, and/or zoom. Shutter user interface object 714, when activated, initiates an image and or video capture of the field of views of the first camera and or second camera. In some embodiments, first camera reticle 720A has a different appearance as compared to second camera reticle 720B (e.g., different size, different width, different shape, different color, and/or different length).

As illustrated in FIG. 7B, in response to detecting first type of input 750B and in accordance with a determination that the gaze of the user is directed to a location corresponds to person 712C, computer system 7M) displays indication 718 at a location corresponding to person 712C. In some embodiments, such as when computer system 700 is a head-mounted device, indication 718 is displayed such that it appears to have the same third depth as person 712C. As person 712C moves with respect to the field of view displayed in viewfinder 712 (e.g., person 712C moves in the environment and/or field of views of the two camera sensors change), computer system 700 updates the location of the display of indication 718 to correspond to the location of person 712C (e.g., in multiple axes or in three axes). Display of indication 718 enables computer system 700 to provide the user of computer system 700 with feedback about the subject (e.g., person 712C) of the media capture (e.g., for focus, lighting, and/or tracking purposes). In some embodiments, in response to detecting first type of input 750B and in accordance with a determination that the gaze of the user is directed to representation 712A of the tree, computer system 700 displays indication 718 at a location corresponding to the representation 712A of the tree.

As shown in FIG. 7B, the capture guide, including first camera reticle 720A and second camera reticle 720B, provides the user with visual feedback about an orientation between the first camera and the second camera in relation to the physical environment. First camera reticle 720A rotates such that an orientation of first camera reticle 720A is based on and/or matches the physical environment. In this example, first camera reticle 720A rotates (e.g., based on information from an accelerometer and/or gyroscope and/or based on image processing of the field of view) such that first camera reticle 720A remains perpendicular to the direction of gravity and/or remains parallel to a horizon of the environment, thereby indicating to the user of the computer system the typical angle at which captured media will be subsequently viewed by viewers. Second camera reticle 720B is based on and/or matches an orientation of a line between the first camera and the second camera, thereby indicating to the user of the computer system the angle (e.g., of the Z-axis of the computer system) at which media will be captured. The combination of first camera reticle 720A and second camera reticle 720B encourages the user to align the two reticles, such that media is captured with the two reticles aligned, thereby causing computer system 700 to be aligned such that a spatial image captured using the first camera and the second camera can be later comfortably viewed by a viewer (since the cameras will be positioned similarly to the viewers eyes). In some embodiments, as shown in FIG. 7B, computer system 700 displays an indication (e.g., a glow, a change in shape, color, and/or size of first camera reticle 720A and/or second camera reticle 720B) when the angle between first camera reticle 720A (corresponding to the environment) and second camera reticle 720B (corresponding to the two camera sensors) is less than a threshold (e.g., zero or non-zero) amount. In some embodiments, first camera reticle 720A and/or second camera reticle 720B display lazy follow behavior, as described in further detail above.

Figure 7D:
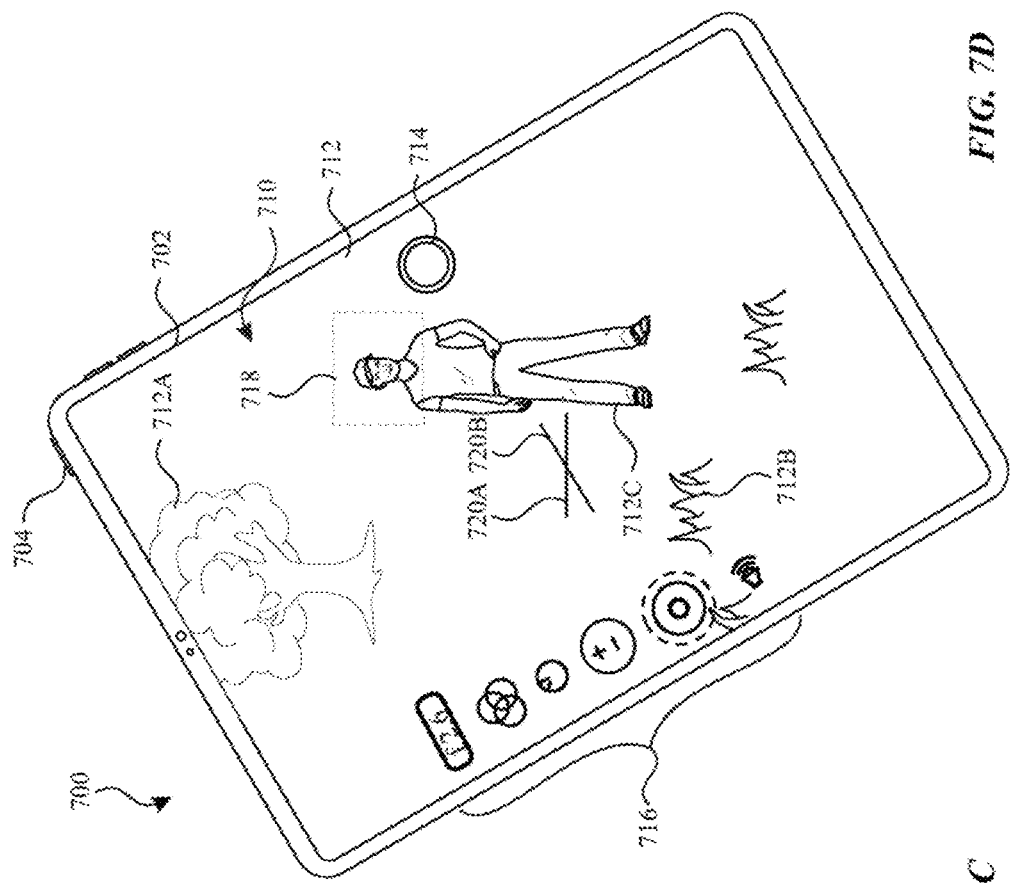
Figure 7C:
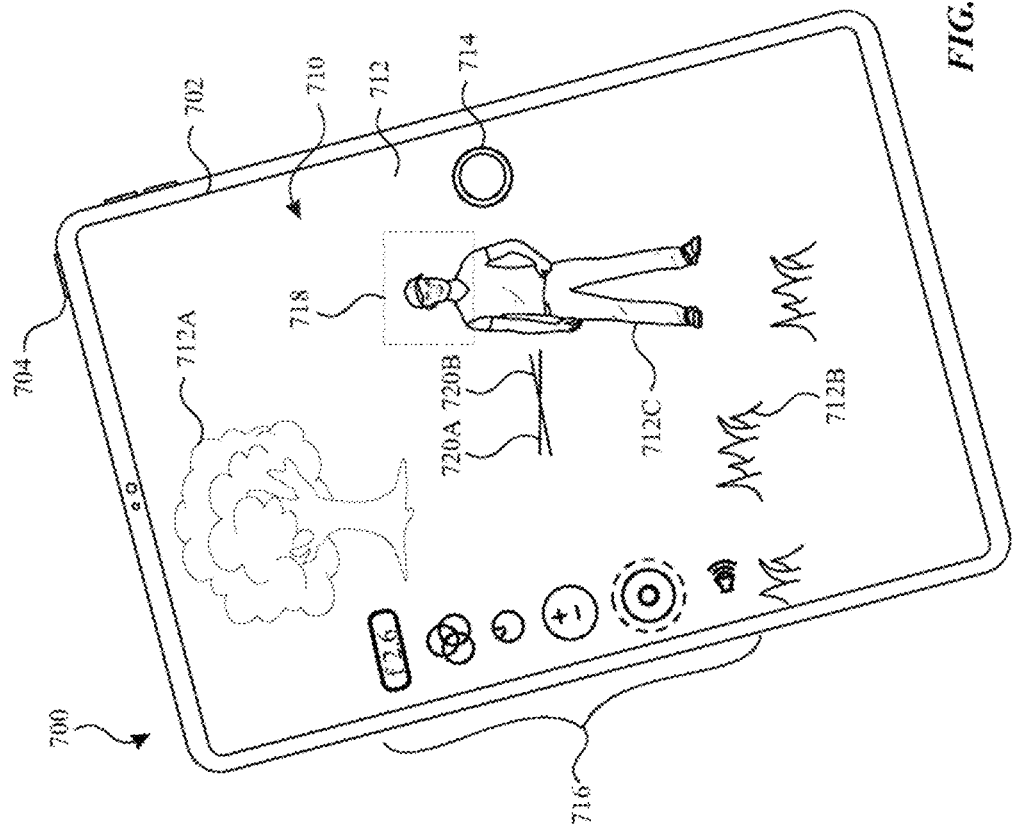

At FIG. 7C, the user changes an orientation of computer system 700. In some examples, when computer system 700 is a tablet, the user rotates the tablet. In some examples, when computer system 700 is a head-mounted device, the user changes the orientation of computer system 700 (and therefore the orientation of the line between the first camera and the second camera) by tilting the user's head (on which the HMD is being worn), thereby rotating computer system 700. As a result of the rotation of computer system 700, the field of view in viewfinder 712 changes and computer system 700 displays first camera reticle 720A such that it continues to be aligned with the environment (e.g., parallel to a horizon of the environment and/or perpendicular to the direction of gravity) and displays second camera reticle 720B such that it continues to be aligned with the two camera sensors (e.g., matching the orientation of a line between the first camera and the second camera), thereby displaying to the user whether and/or how much the angle between the environment and the two camera sensors has deviated.

At FIG. 7D, the user further changes the orientation of computer system 700 (e.g., by further tilting their head, thereby further rotating computer system 700). As a result of the further rotation of computer system 700, the field of view in viewfinder 712 further changes, and computer system 700 displays first camera reticle 720A such that it continues to be aligned with the environment (e.g., parallel to a horizon of the environment and/or perpendicular to the direction of gravity) and displays second camera reticle 720B such that it continues to be aligned with the two camera sensors (e.g., matching the orientation of a line between the first camera and the second camera), thereby displaying for the user how much the angle between the environment and the two camera sensors has deviated.

At FIG. 7E, the user changes the orientation of computer system 700 back (e.g., by straightening the title of their head) so that computer system 700 aligns with the environment. As a result, the field of view in viewfinder 712 changes. Computer system 700 continues to display first camera reticle 720A aligned with the environment (e.g., parallel to a horizon of the environment and/or perpendicular to the direction of gravity) and displays second camera reticle 720B aligned with the two camera sensors (e.g., matching the orientation of a line between the first camera and the second camera). As shown in FIG. 7E, first camera reticle 720A and second camera reticle 720B indicate (e.g., by being parallel and/or by overlapping) that computer system 700 is at an orientation at which spatial captures will be comfortable to subsequently view.

At FIG. 7E, while computer system 700 detects (e.g., via eye tracking device 130 and/or one or more sensors of computer system 700) a gaze 750C of the user of computer system 700 being directed to shutter user interface object 714, computer system 700 detects second type of input 750D (different from first type of input 750B) on (e.g., pressing down on, a second amount of pressure more than the first amount of pressure, and/or with depressing) hardware input device 704.

In some embodiments, in response to detecting second type of input 750 (and, optionally, in accordance with a determination that gaze 750C of the user is directed to shutter user interface object 714), computer system 700 initiates a capture of spatial media (e.g., capture of a spatial image and/or a capture of spatial video). In some embodiments, first camera reticle 720A and second camera reticle 720B continue to be displayed as part of user interface 710 of the camera application (e.g., overlaid on viewfinder 712) while spatial media is captured (e.g., during a video capture) and continue to indicate the how much the angle between the environment and the two camera sensors has deviated. In some embodiments, although first camera reticle 720A and second camera reticle 720B are displayed as part of user interface 710 of the camera application, first camera reticle 720A and second camera reticle 720B are not included in captured media.

At FIG. 7F, in some embodiments, in response to completing the capture of spatial media, computer system 700 displays representation 722 of the captured spatial media, which includes an image captured by one or more of the two camera sensors during the capture of spatial media. In some embodiments, representation 722 of the captured spatial media is based on and/or matches an orientation of a line between the first camera and the second camera, thereby indicating to the user of the computer system the angle (e.g., of the Z-axis of the computer system) at which media will be captured. In some embodiments, camera reticle 720C operates the same as first camera reticle 720A. In some embodiments, representation 722 includes a live view of a field of view of one or more of the two camera sensors, rather than a representation of captured spatial media.

At FIG. 7F, in some embodiments, representation 722 of the captured spatial media instead rotates such that an orientation of representation 722 is based on and/or matches the physical environment. In this example, representation 722 rotates (e.g., based on an accelerometer, gyroscope, and/or based on image processing) such that representation 722 remains upright as compared to a horizon of the environment and/or remains perpendicular to the direction of gravity, thereby indicating to the user of the computer system the typical angle at which captured media will be subsequently viewed by viewers. In some embodiments, camera reticle 720C operates the same as second camera reticle 720B. In some embodiments, representation 722 includes a live view of a field of view of one or more of the two camera sensors, rather than a representation of captured spatial media.

As illustrated in FIGS. 7F-7H, representation 722 optionally exhibits lazy follow behavior, as described in detail above. Between FIGS. 7H and 7G, computer system 700 has shifted and/or rotated to the left, causing the field of view displayed in viewfinder 712 to change, as shown in FIG. 7O. In some embodiments, in response to computer system 700 shifting and/or moving to the left, representation 722 shifts to the right on via the display generation component (e.g., display 702) in conjunction with detecting the shift and/or rotation to the left of computer system 700 such that representation 722 initially appears to be environment-locked, as shown in FIG. 7G. For example, at FIG. 7O, representation 722 maintains its location with respect to representation 712A of the tree before moving over time back to its original location, as shown in FIG. 711. In some embodiments (e.g., where computer system 700 is a head-mounted device, computer system 700 shifts and/or moves to the left based on the head of the user turning to the left and computer system 700 shifts and/or moves to the right based on the head of the user turning to the right.

Additional descriptions regarding FIGS. 7A-7K are provided below in reference to method 800 described with respect to FIG. 8 and in reference to method 1000 described with respect to FIG. 10.

FIG. 8 is a flow diagram of an exemplary method 800 for displaying a media capture user interface that includes a capture guide, in accordance with various embodiments. In some embodiments, method 800 is performed at a computer system (e.g., computer system 101 in FIG. 1 and/or computer system 700) (e.g., a desktop computer, a portable device (e.g., a notebook computer, tablet computer, or handheld device), or a personal electronic device (e.g., a wearable electronic device, such as a watch or a head-mounted display)) that is in communication with a display generation component (e.g., display generation component 120 in FIGS. 1, 3, and 4, a heads-up display, a display, a touchscreen, and/or a projector), one or more input devices (e.g., a touchpad, a touch-sensitive display, and/or one or more eye-tracking components), a first camera, and a second camera. In some embodiments, the display generation component is at least partially opaque. In some embodiments, method 800 is governed by instructions that are stored in a non-transitory (or transitory) computer-readable storage medium and that are executed by one or more processors of a computer system, such as the one or more processors 202 of computer system 101 (e.g., control 110 in FIG. 1). Some operations in method 800 are, optionally, combined and/or the order of some operations is, optionally, changed.

The computer system (e.g., 700) displays (802), via the display generation component (e.g., 702), a media capture user interface (e.g., 710) for capturing stereoscopic media that combines image information captured by the first camera and the second camera during a same time period (e.g., simultaneously or concurrently or with less than a threshold amount of difference in time), including a capture guide (e.g., a camera reticle, a pattern of lines, and/or a pattern of markings) with a first portion (e.g., 720A) of the capture guide (e.g., a first line, a first marking, a first color, and/or a first shape) and a second portion (e.g., 720B) of the capture guide (e.g., a second line, a second marking, a second color, and/or a second shape). The first portion (e.g., 720A) of the capture guide has a first appearance and the second portion (e.g., 720B) of the capture guide has a second appearance. In some embodiments, the first portion (e.g., 720A) has a spatial positioning parameter that is fixed relative to a physical environment. In some embodiments, the first portion is aligned with a first axis. In some embodiments, the second appearance is different from the first appearance. In some embodiments, the second portion (e.g., 720B) has a spatial positioning parameter that is fixed relative to a viewpoint of a user. In some embodiments, the second portion is aligned with a second axis.

While displaying (804) the media capture user interface (e.g., 710) including the capture guide (e.g., 720A and 720B), in accordance with a determination that an orientation of an axis between the first camera and the second camera has changed in a first manner relative to a physical environment (e.g., the physical environment that is visible concurrently with the media capture user interface either through virtual or optical passthrough)(e.g., a rotation along an axis perpendicular to an axis parallel to gravity), the computer system (e.g., 700) changes (806) a position of the first portion (e.g., 720A) of the capture guide relative to the second portion (e.g., 720B) of the capture guide to indicate a change in orientation of the axis between the first camera and the second camera relative to the physical environment (e.g., as in the transition from FIG. 7B to FIG. 7C), wherein the changing includes changing an appearance of the first portion (e.g., 720A) of the capture guide to have a same orientation relative to the physical environment before and after the change in orientation of the one or more input devices relative to the physical environment (e.g., changing the position of the first portion of the reticle relative to the second portion of the reticle based on a direction and or magnitude of the change in orientation of the computer system relative to the physical environment).

While displaying (804) the media capture user interface (e.g., 710) including the capture guide (e.g., 720A and 720B), in accordance with a determination that the orientation of the axis between the first camera and the second camera has not changed in the first manner relative to the physical environment, the computer system (e.g., 700) maintains (808) the position of the first portion (e.g., 720A) of the capture guide relative to the second portion (e.g., 720B) of the capture guide. Displaying a media capture user interface for capturing stereoscopic media that includes a capture guide with a portion that changes based on an axis relative to a physical environment provides feedback about a state of the computer system. For example, the first portion helps guide a user to properly align the computer system for spatial capture of spatial media such that the captured media will be comfortable to view. In particular, the capture guide provides feedback to the user with respect to the alignment of the cameras that will be capturing the spatial media.

In accordance with some embodiments, changing the appearance of the first portion (e.g., 720A) of the capture guide to have the same orientation relative to the physical environment before and after the change in orientation of the one or more input devices relative to the physical environment includes changing the appearance of the first portion of the capture guide to have the same orientation relative to a horizon of the physical environment (e.g., the environment in which 712A, 712B, and 712C are in) before and after the change in orientation of the one or more input devices relative to the physical environment. In some embodiments, the changing indicates a change in orientation of the axis between the first camera and the second camera relative to the horizon of the physical environment. In some embodiments, the changing is in accordance with a determination that the orientation of the axis between the first camera and the second camera has changed in the first manner relative to a horizon of the physical environment. In some embodiments, the first portion of the capture guide is locked (e.g., world-locked) to the horizon of the physical environment. Locking the first portion of the capture guide to the horizon of the physical environment provides the user with feedback about an orientation of the computer system relative to the horizon, thereby providing improved visual feedback. In addition, locking the first portion of the capture guide to the horizon enables the computer system to encourage users to take spatial captures that are aligned to the horizon, thereby making the spatial capture more comfortable to view using a standard head position.

In accordance with some embodiments, the change in orientation of the axis between the first camera and the second camera relative to the physical environment is based on a change in an orientation of the computer system (e.g., 700) (e.g., while the computer system is worn on a head of the user and the head of the users tilts (e.g., to the left or the right)). In some embodiments, changing the position of the first portion of the capture guide relative to the second portion of the capture guide to indicate a change in orientation of the axis between the first camera and the second camera relative to the physical environment includes changing an appearance of or maintaining an appearance of the second portion of the capture guide to have a same orientation relative to the axis between the first camera and the second camera before and after the change in orientation of the one or more input devices. In some embodiments, the computer system is a head-mounted device, wherein the position of the second portion of the capture guide is based on a tilt of the head-mounted device. Locking the second portion of the capture guide to the axis between the two cameras provides feedback about a state of the computer system (e.g., a relative orientation of the two cameras). In addition, such locking combined with the first portion of the capture guide locking with respect to the physical environment provides feedback about a state of the computer system (e.g., to compare how the relative orientation of the two cameras compares with the orientation of the physical environment), thereby providing the user with improved visual feedback. In addition, locking the second portion of the capture guide to the axis between the two cameras enables the computer system to encourage users to take spatial captures that are aligned to the horizon, thereby making the spatial capture more comfortable to view using a standard head position.

In accordance with some embodiments, while displaying the media capture user interface (e.g., 710) including the capture guide (e.g., 720A and 720B), in accordance with a determination that the orientation of the axis between the first camera and the second camera has changed in a second manner relative to the physical environment (e.g., rotating around an axis that is perpendicular to the ground and/or rotating around an axis that is parallel to the direction of gravity) that is different from the first manner relative to the physical environment, the computer system (e.g., 700) maintains the position of the first portion (e.g., 720A) of the capture guide relative to the second portion (e.g., 720B) of the capture guide. In some embodiments, while the position of the first portion relative to the second portion of the capture guide is maintained, both the position of the first portion and the position of the second portion of the capture guide are moved an equal amount in the same manner (e.g., direction and/or orientation) such that the relative position is maintained. Maintaining the position of the first portion relative to the second portion of the capture guide in situations in which movement does not affect the technical quality of a capture provides the user with visual feedback about a state of the device, thereby providing improved visual feedback.

In accordance with some embodiments, while displaying the media capture user interface (e.g., 710) including the capture guide (e.g., 720A and 720B): the computer system (e.g., 700) detects movement of the computer system (e.g., 700) and, in response to detecting movement of the computer system (e.g., 700), the computer system (e.g., 700) changes display positions of the first portion (e.g., 720A) of the capture guide and the second portion (e.g., 720B) of the capture guide (e.g., with or without maintaining the position of the first portion of the capture guide relative to the second portion of the capture guide). In some embodiments, the first portion and the second portion of the capture guide move as the computer system moves. In some embodiments, the computer system is a head-mounted device that is worn on a head of the user and the computer system moves as the head of the user moves. Moving both the first portion and the second portion of the capture guide as the computer system moves provides the user with visual feedback the movement of the computer system (e.g., that the computer system is moving and/or the direction in which the computer system is moving), thereby providing improved visual feedback.

In accordance with some embodiments, displaying the media capture user interface (e.g., 710) includes displaying a media capture affordance (e.g., 714). In accordance with some embodiments, while displaying the media capture user interface (e.g., 714), the computer system (e.g., 700) detects (e.g., via the one or more input devices) input (e.g., 750C and/or 750)) selecting the media capture affordance (e.g., 714). In response to detecting input selecting the media capture affordance (e.g., 714), the computer system (e.g., 700) captures media (e.g., as represented by 722) (e.g., capturing one or more (2D or stereoscopic) images and/or capturing a (2D or stereoscopic) video, such as by using the first camera and the second camera). In some embodiments, detecting user input corresponding to the media capture affordance results in capture of media. Displaying a media capture affordance with the capture guide provides the user with feedback that media is able to be captured, thereby providing improved visual feedback.

In accordance with some embodiments, while displaying the media capture user interface (e.g., 710) including the capture guide (e.g., 720A and 720B), the computer system (e.g., 700) captures media of contents in a field of view of the first camera and the second camera. In some embodiments, the media is captured without displaying a media capture affordance before, during, or after the media is captured. In some embodiments, capturing media includes capturing one or more (2D or stereoscopic) images and/or capturing a (2D or stereoscopic) video of the contents in the field of view of both the first camera and the second camera (e.g., without capturing media of content in the field of view of the first camera and not in the field of view of the second camera). Capturing media in a field of view of the first camera and the second camera while displaying the capture guide provides visual feedback about the quality of the capture based on feedback provided by the capture guide, which enables the user to orient the computer system to improve the capture quality, thereby providing improved visual feedback.

In accordance with some embodiments, the captured media is spatial media. In some embodiments, the captured media is spatial visual media, such as a spatial image or a spatial video. When first portion and second portion of the capture guide are aligned, captured spatial media will be displayable in an orientation that is comfortable to view (e.g., won't cause the user to feel the alignment of the camera sensors that causes discomfort).

In accordance with some embodiments, the computer system (e.g., 700) detects (e.g., via one or more sensors (e.g., an accelerometer, an optical sensor (e.g., a camera))) a change in a field of view of the first camera and/or the second camera that occurs at a first speed and in a first direction. In response to detecting the change in the field of view, the computer system shifts (e.g., as in FIGS. 7F-7H) a display position, via the display generation component (e.g., 702), of one or more portions of the capture guide (e.g., 720A or 720B) in a second direction that is based on the first direction (e.g., second direction is opposite the first direction, the same as the first direction, and/or in a direction that enables the one or more portions to appear to move more slowly than if it were fixed on the display) and at a second speed that is different from the first speed (e.g., slower than the first speed). In some embodiments, the second direction is an opposite direction as the movement of the computer system. In some embodiments, the one or more portions are displayed at a first position via the display generation component just prior to detecting the change in the field of view and is, after the field of view of ceases to change, re-displayed at the first position via the display generation component. In some embodiments, the second direction is opposite the first direction and the one or more portions are shifted in the first direction after being shifted in the second direction such that it appears as if the one or more portions catch up to the change in the field of view after a brief period of time in which the one or more portions lag behind the change in the field of view. In some embodiments, in accordance with a determination that a set of one or more follow criteria are not met, the computer system displays, via the display generation component, a portion of the capture guide (e.g., the first portion and/or the second portion) at a first location (e.g., a default location), wherein a first criterion of the set of one or more follow criteria is met when a field of view of at least one camera of the computer system has moved within a threshold amount of time (e.g., a non-zero amount of time) and in accordance with a determination that the set of one or more follow criteria are met, displaying, via the displaying generation component, the portion of the capture guide at a location different from the first location. In some embodiments, the location different from the first location changes overtime as the computer system is moved such that the portion of the capture appears to be following (e.g., lazily following) the movement. In some embodiments, the portion of the capture guide is moved opposite to movement such that if movement is in the left direction, then the portion of the capture guide is moved in the right direction on the display. In some embodiments, the portion of the capture guide continues to move for the threshold amount of time after the computer system has stopped moving. Causing one or more portions of the capture guide to move on the display in a direction and speed that are based on a direction and speed of the movement of the computer system makes the capture guide more comfortable to view and provides feedback about a state of the device (e.g., that the computer system is moving).

In accordance with some embodiments, the one or more portions of the capture guide includes the second portion (e.g., 720B and/or 722) of the capture guide. Causing the second portion of the capture guide to move on the display in a direction and speed that are based on a direction and speed of the movement of the computer system makes the capture guide more comfortable to view and provides feedback about a state of the device (e.g., that the computer system is moving).

In accordance with some embodiments, the second portion (e.g., 722) includes display of media (e.g., an image or spatial media) captured by (e.g., a copy of content in a field of view of) at least one of (e.g., one or both of) the first camera and the second camera. In some embodiments, the media corresponds to a representation of what would be or is being captured with a current orientation. The second portion including display of content of the field of view of the first camera and/or the second camera provides feedback about a state of the computer system (e.g., what would be captured or what is being captured in a current state) and allows the computer system to display the media such that the user can also perceive the physical environment separately (e.g., through the media capture user interface including a representation of the physical environment or including a portion that is at least partially see-through).

In accordance with some embodiments, the one or more portions of the capture guide includes the first portion (e.g., 722). Causing the second portion of the capture guide to move on the display in a direction and speed that are based on a direction and speed of the movement of the computer system makes the capture guide more comfortable to view and provides feedback about a state of the device (e.g., that the computer system is moving). In addition, the first portion will be both providing feedback about a relative orientation of the physical environment as well as movement of the computer system.

In accordance with some embodiments, a portion (e.g., 718) of the capture guide (e.g., the first portion, the second portion, and/or a third portion (e.g., 718) of the capture guide) is displayed to appear at a depth corresponding to a target subject (e.g., 712C) within a field of view of the first camera and/or the second camera. In some embody embodiments, while displaying the media capture user interface, in accordance with a determination that a set of one or more target criteria are met, displaying, via the display generation component, a portion of the capture guide (e.g., the first portion, the second portion, and/or a third portion of the capture guide) to appear at a depth of a target subject within a field of view of at least one camera of the computer system. In some embodiments, the set of one or more target criteria include a criterion that is met when the target subject is identified within the field of view. In some embodiments, the set of one or more target criteria include a criterion that is met when a hardware input device (e.g., a hardware button) is activated. In some embodiments, the portion of the capture guide follows the target subject as the target subject moves within the field of view. Displaying a portion of the capture guide to appear at the depth of the target subject provides feedback that the target subject has been identified and is included within a field of view of what is or will be captured.

In accordance with some embodiments, a portion (e.g., 712C) of (e.g., the first portion, the second portion, and/or a third portion) of the capture guide is world-locked to a target subject (e.g., a person, a physical object) within a field of view of at least one camera (e.g., the first camera and/or the second camera) of the computer system. In some embodiments, as the computer system moves relative to the target subject, the portion of the capture guide that is world-locked to the target subject also moves based on the relative movement such that the arrangement between target subject (e.g., as displayed via the display generation component) and the portion of the capture guide that is world-locked to the target subject remains the same. In some embodiments, while displaying the media capture user interface and in accordance with a determination that a set of one or more lock criteria are met, displaying, via the display generation component, a portion of the capture guide (e.g., the first portion, the second portion, and/or a third portion of the capture guide) at a location corresponding to a target subject within a field of view of at least one camera of the computer system, wherein the display location of the portion is updated to maintain at a location corresponding to the target subject when the target subject moves within the field of view (e.g., the field of view is moved such that the target subject appears to be in a different location even though the target subject did not physically move; the field of view has not moved but the target subject has physically moved such that the target subject is in a different location within the field of view). World-locking the portion of the capture guide to the target subject provides feedback that the target subject has been identified by the computer system and is within the field of view of at least one camera.

In accordance with some embodiments, the computer system is in communication with a hardware input device (e.g., 714) (e.g., a depressible and/or capacitive button). In accordance with some embodiments, the computer system (e.g., 700) detects, via the hardware input device (e.g., 704), a user input (e.g., 750B and/or 750D). In response to detecting the user input via the hardware input device, in accordance with a determination that the user input (e.g., 750B) is of a first type (e.g., a touch on the hardware input device without depressing the hardware input device), the computer system displays, via the display generation component (e.g., 702), the capture guide with the first portion (e.g., 720A) (e.g., a first line, a first marking, a first color, and/or a first shape) and the second portion (e.g., 720B) (e.g., without capturing media of a field of view of the first camera and without capturing media of a field of view of the second camera) (e.g., as in FIGS. 7A and 7B). In some embodiments, the hardware input device is a hardware button of the computer system. In some embodiments, the user input is detected while displaying the media capture user interface. In some embodiments, the user input is detected while the display generation component is not displaying anything and/or is in a low-power display mode. In some embodiments, the user input includes a finger touch. In some embodiments, the user input includes a finger touch that does not depress (e.g., completely push down) the hardware input device. In some embodiments, the first type corresponds to when the finger touch is detected but a gesture with respect to the hardware input device has not been completed. In some embodiments, the media capture user interface is displayed in response to detecting the user input. Displaying the capture guide in response to detecting the first type of user input via the hardware input device provides feedback that the first type of user input has been detected via the hardware input device.

In accordance with some embodiments, in response to detecting the user input (e.g., 750B and/or 750D) via the hardware input device (e.g., 704), in accordance with a determination that the user input (e.g., 750D) is of a second type (e.g., a press or depression of the hardware input device) that is different from the first type (e.g., and while displaying the capture guide), the computer system (e.g., 700) captures media (e.g., a 2D photo, a 3D photo, a 2D video, and/or a 3D video) in a field of view of the first camera and/or the second camera (e.g., as in FIGS. 7E and 7F). In some embodiments, the user input is detected while displaying the media capture user interface. In some embodiments, the user input is detected while the display generation component is not displaying anything and/or is in a low-power display mode. In some embodiments, the user input includes activation of the hardware input device. In some embodiment, the second type corresponds to when a gesture has been completed with respect to the hardware input device. Allowing to either display the capture guide or capture media when detecting user input via the hardware input device enables different operations to be performed without the need to display additional controls, thereby decluttering the user interface.

In some embodiments, aspects/operations of methods 800, 1000, and 1200 may be interchanged, substituted, and/or added between these methods. For example, the spatial media that is captured using the capture guide of method 800 can be displayed at locations corresponding to the location of a physical object, as in method 1200. For another example, the use of a user's gaze/attention for targeting as in method 1000 can be used for providing inputs of methods 800 and 1200. For brevity, these details are not repeated here.

FIGS. 9A-9D illustrate exemplary techniques for using gaze information for targeting, in accordance with some embodiments. FIG. 10 is a flow diagram of an exemplary process of using gaze information for targeting, in accordance with various embodiments. The user interfaces in FIGS. 9A-9D are used to illustrate the processes described below, including the processes in FIG. 10.

Figure 9A:
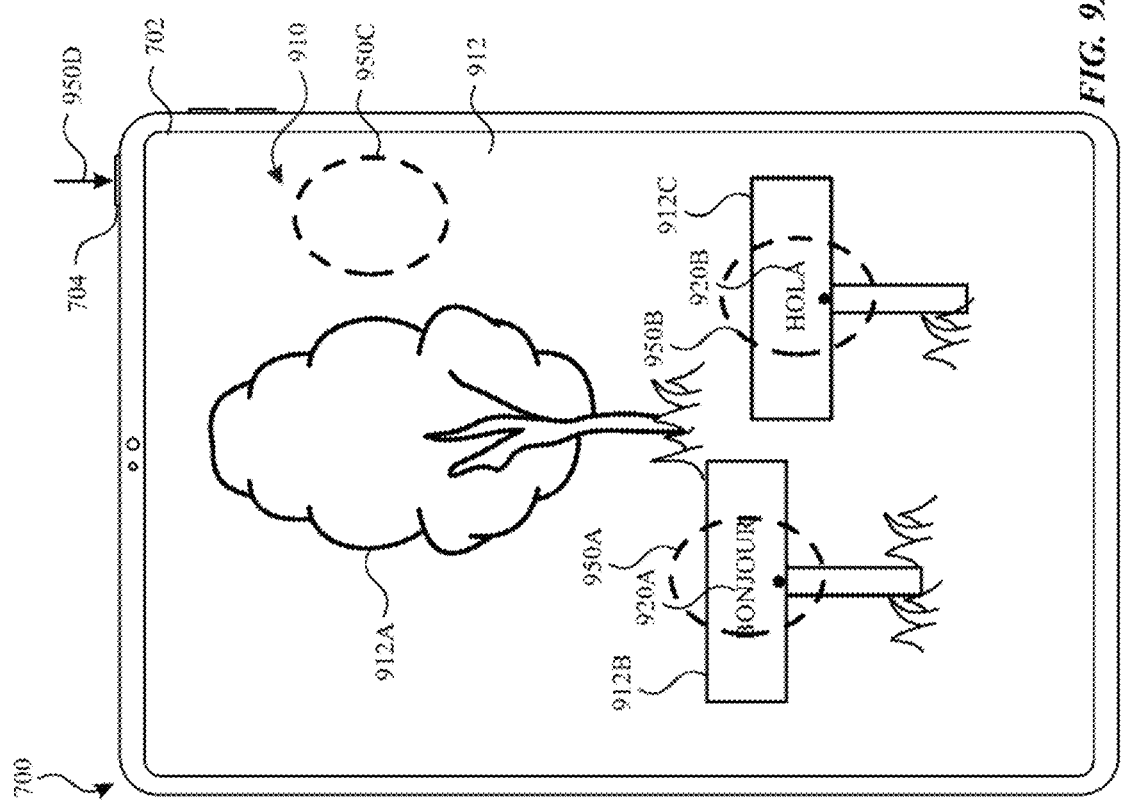

FIG. 9A illustrates computer system 700 with a display generation component (e.g., display 702) and hardware input device 704 (e.g., a physical button). At FIG. 9A, computer system 700 is displaying, via the display generation component (e.g., display 702), user interface 910. In some embodiments, computer system 700 is configured to present virtual objects on one or more transparent or translucent displays, so that a person, using the system, perceives virtual objects superimposed over the physical environment. In some embodiments, computer system 700 is configured to use pass-through video, meaning one or more camera or image sensors capture images of the physical environment, and uses those images in presenting the AR environment on the opaque display.

In some embodiments, user interface 910 includes display of a viewfinder 912 that optionally includes a representation of a field of view of one or more cameras (e.g., a field of view of a first camera, a field of view of a second camera, and/or the overlap between the fields of view of the first camera and the second camera). Although FIGS. 9A-9D illustrate techniques using computer system 700 that is a tablet, the techniques are optionally also applicable using a head-mounted device (e.g., using transparent/translucent displays and/or using pass-through video). In some embodiments where computer system 700 is a head-mounted device, computer system 700 optionally includes two displays (one for each eye of the user of computer system 700), with each display displaying a field of view of a respective camera, to enable the user to perceive depth of the field of view of the two cameras. The field of view includes physical objects, including tree 912A, first sign 912B, and second sign 912C.

At FIG. 9A, while computer system 70) detects (e.g., via eye tracking device 130 and/or one or more sensors of computer system 700) a gaze (e.g., 950A. 950B, or 950C) of the user of computer system 700, computer system 70) detects input 950D (e.g., the first type of input and/or the second type of input) using hardware input device 704.

As illustrated in FIG. 9B, in response to detecting input 950D using hardware input device 704 and in accordance with a determination that gaze 950A of the user of computer system 700 is directed to a location corresponding to first sign 912B, computer system 700 displays a translation 922A (e.g., in a default language) of text 920A (e.g., of a first language, different from the default language) of first sign 912B at the location that corresponds to first sign 912B (e.g., without displaying a translation of text 920B of second sign 912C). In some embodiments, the displayed translation 922A of text 920A of first sign 912B is environment-locked to first sign 912B. Thus, computer system 700 determines the object that the user is gazing at when input 950D is detected and performs an operation based on the object that the user is gazing at when input 950D is detected.

Figure 9D:
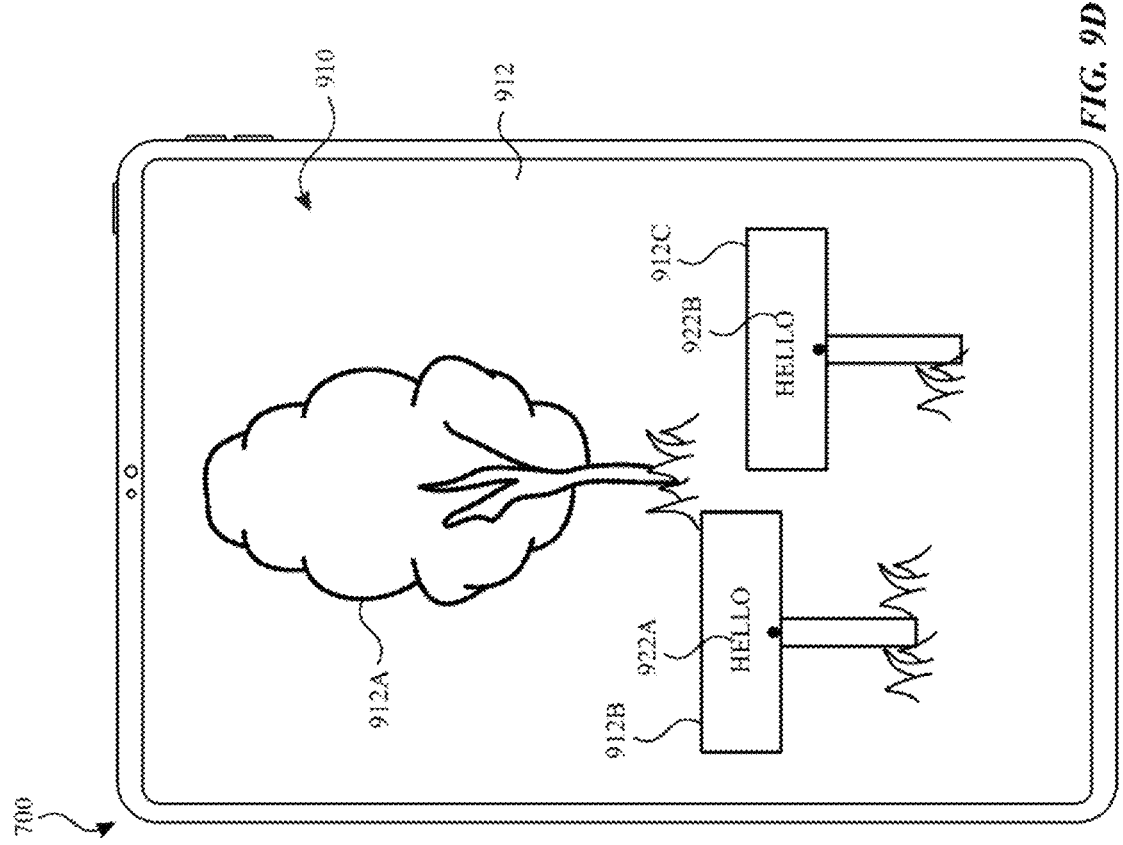
Figure 9C:
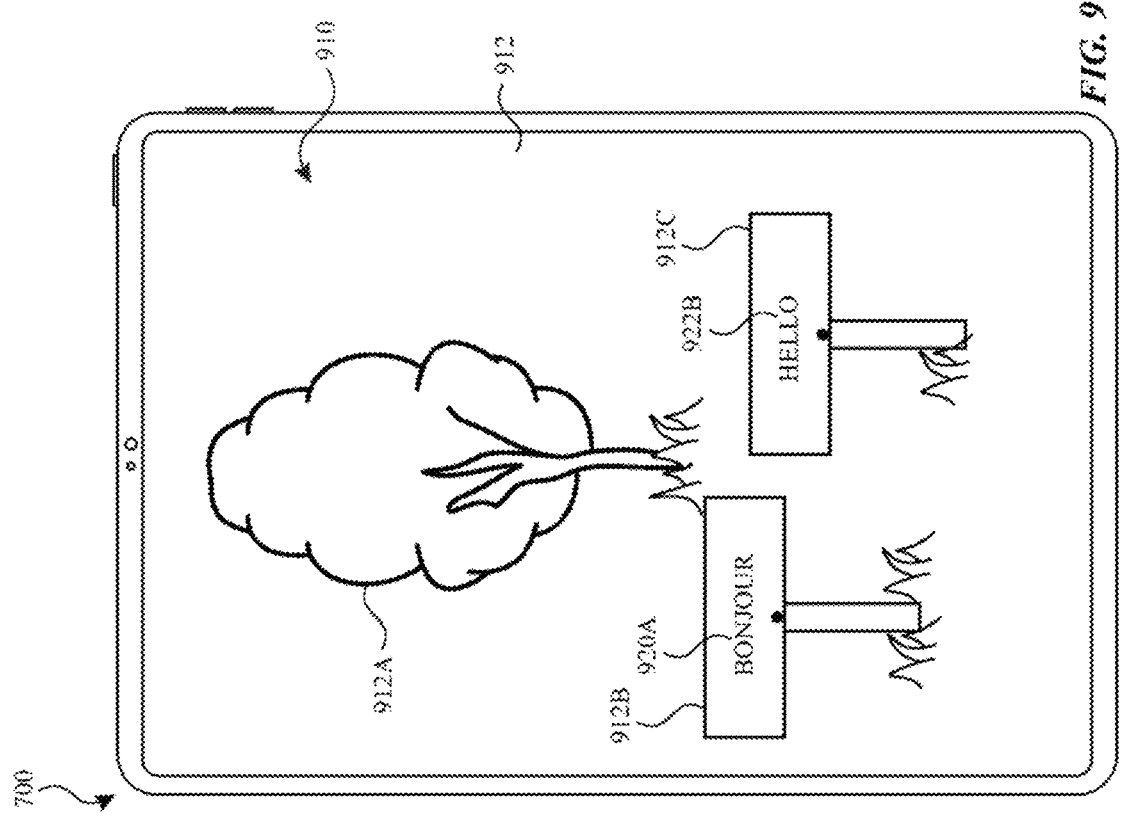

As illustrated in FIG. 9C, in response to detecting input 950D using hardware input device 704 and in accordance with a determination that gaze 950B of the user of computer system 700 is directed to a location corresponding to second sign 912C, computer system 700 displays a translation 922B of text 920B of second sign 912C at the location that corresponds to second sign 912C (e.g., without displaying a translation of text 920A of first sign 912B). In some embodiments, the displayed translation 922B of text 920B of second sign 912C is environment-locked to second sign 912C. Thus, computer system 700 determines the object that the user is gazing at when input 950D is detected and performs an operation based on the object that the user is gazing at when input 950D is detected.

As illustrated in FIG. 9D, in response to detecting input 950D using hardware input device 704 and in accordance with a determination that gaze 950C of the user of computer system 700 is directed to a location that does not correspond to first sign 912B or second sign 912C (and/or that the gaze of the user is not directed to a control object), computer system 700 performs a default operation (e.g., based on an application currently being displayed). In some embodiments, the default operation is based on a state of an application currently being displayed. In some embodiments, when the application currently being displayed is configured such that the default operation is to display translations of texts of multiple objects, computer system 700 displays translations of texts of multiple (e.g., less than all or all) objects in the field of view of the one or more cameras, such as displaying both a translation 922A of text 920A of first sign 912B at the location that corresponds to first sign 912B and a translation 922B of text 920B of second sign 912C at the location that corresponds to second sign 912C. In some embodiments, the displayed translation 922B of text 920B of second sign 912C is environment-locked to second sign 912C. Thus, computer system 700 determines that the user is not gazing at a particular object when input 950D is detected and performs an operation based on the user's gaze when input 950D is detected. In some embodiments, when the application currently being displayed is configured such that the default operation is to perform an operation that is different from displaying translations of texts of multiple objects, computer system 700 performs the operation that is different from displaying translations of texts of multiple objects.

Additional descriptions regarding FIGS. 9A-9D are provided below in reference to method 1000 described with respect to FIGS. 9A-9D.

FIG. 10 is a flow diagram of an exemplary method 1000 for using gaze information for targeting, in accordance with some embodiments. In some embodiments, method 1000 is performed at a computer system (e.g., computer system 101 in FIG. 1 and/or computer system 700)(e.g., a desktop computer, a portable device (e.g., a notebook computer, tablet computer, or handheld device), or a personal electronic device (e.g., a wearable electronic device, such as a watch or a head-mounted display)) that is in communication with a display generation component (e.g., display generation component 120 in FIGS. 1, 3, and 4) (e.g., a heads-up display, display 702, a touchscreen, and/or a projector) and a hardware input device (e.g., 704)(e.g., a hardware button, a hardware slider, and/or a rotational input mechanism such as a hardware knob). In some embodiments, the display generation component is at least partially opaque. In some embodiments, the method 1000 is governed by instructions that are stored in a non-transitory (or transitory) computer-readable storage medium and that are executed by one or more processors of a computer system, such as the one or more processors 202 of computer system 101 (e.g., control 110 in FIG. 1). Some operations in method 1000 are, optionally, combined and/or the order of some operations is, optionally, changed.

The computer system (e.g., 700) displays (1002), via the display generation component (e.g., 702), a user interface (e.g., 710 or 910) including a first portion (e.g., 912B, 912C, 712C, and/or 714) of the user interface and a second portion (e.g., 912B, 912C, 712C, and/or 714) of the user interface, wherein the second portion (e.g., 912B, 912C, 712C, and/or 714) of the user interface is different from the first portion (e.g., 912B, 912C, 712C, and/or 714) of the user interface. In some embodiments, the second portion is at least partially separate from the first portion.

The computer system (e.g., 700) detects (1004) activation (e.g., 950D, 750B, and/or 750D) of the hardware input device (e.g., 704). In some embodiments, the activation includes depression of the hardware input device. In some embodiments, the activation includes depression and release of the hardware input device.

In response (1006) to detecting the activation of the hardware input device, in accordance with a determination that the attention of a user is directed to the first portion (e.g., 912B, 912C, the portion corresponding to 950C, 714, and/or 712C) of the user interface (e.g., that the user is looking at the first portion), the computer system (e.g., 700) performs (1008) a first operation (e.g., selecting a subject as in FIG. 7B, capturing an image as in FIG. 7F, and/or translating text as in FIGS. 9A-9C). In some embodiments, the determination includes a determination that a focus point of the user corresponds to a location within the first portion.

In response (1006) to detecting the activation of the hardware input device, in accordance with a determination that the attention of the user is directed to the second portion of the user interface (e.g., that the user is looking at the second portion), the computer system (e.g., 700) performs (1010) a second operation (e.g., selecting a subject as in FIG. 7B, capturing an image as in FIG. 7F, and/or translating text as in FIGS. 9A-9C) that is different from the first operation. Monitoring where the attention of the user is directed when the hardware input device is activated enables targeting of different portions of the user interface and for different operations to be performed without requiring different user inputs using the hardware input device, thereby providing the user with increased control of the computer system and reducing the number of inputs needed to perform operations.

In some embodiments, the first portion (e.g., 912B, 912C, and/or 714) of the user interface includes display of a first control object (e.g., a display of a first control affordance (e.g., an affordance to capture an image, change a setting, scroll a page, and/or another operation)) and the second portion of the user interface includes display of a second control object (e.g., 912B, 912C, and/or 714) that is different from the first control object (e.g., a display of a second control affordance that is different from the first control affordance). Displaying different controls at locations in which different operations will be performed when the user's attention is directed to those locations provides the user with visual feedback about where the portions are located, thereby providing improved visual feedback.

In some embodiments, the first portion (e.g., 912B, 912C, and/or 714) of the user interface includes display of a first control object and the second portion (e.g., portion corresponding to 950C) of the user interface corresponds to a region without a control object (e.g., the second operation is a default operation when a particular control object is not being targeted using gaze). In some embodiments, the second portion does not include display of a control object (e.g., non-control object content is displayed in the second portion or nothing is displayed in the second portion). Performing the second operation (e.g., a default operation) when the computer system detects a gaze directed to an area without a control object enables additional functionality without displaying additional controls, thereby decluttering the user interface.

In some embodiments, performing the second operation that is different from the first operation includes: in accordance with a determination that an application (e.g., a first application, an application currently being executed by the computer system, and/or an application that was previously executed by the computer system) is in a first state, the second operation is a third operation (e.g., a first type of default operation); and in accordance with a determination that the application is in a second state that is different from the first state, the second operation is a fourth operation (e.g., a first type of default operation) that is different from the third operation (e.g., a second type of default operation). In some embodiments, the state of the application corresponds to a user interface and/or one or more user interface elements currently being displayed. In some embodiments, the state corresponds to a process currently being executed by the computer system. In some embodiments, the state corresponds to whether the application is currently active (e.g., displayed, emphasized, and/or being interacted with by a user). In some embodiments, when the application is in a state (e.g., the first state) in which the application is providing translations of text in the field of view of the one or more cameras, the third operation is an operation to cease providing translations of the text. In some embodiments, when the application is in a state (e.g., the second state) in which the application is not providing translation of the text in the field of view of the one or more cameras, the fourth operation is an operation to initiate providing translations of the text. In some embodiments, when the application is in a state (e.g., the first state) in which the application is capturing images and/or videos, the third operation is an operation to cease capturing images and/or videos. In some embodiments, when the application is in a state (e.g., the second state) in which the application is not capturing images and/or videos, the fourth operation is an operation to initiate capturing images and/or videos. Performing different operations based on a state of an application reduces the number of inputs needed to perform operations.

In some embodiments, performing the second operation that is different from the first operation includes: in accordance with a determination that a user interface of a first application (e.g., a translation application as in FIGS. 9A-9D) is being displayed when activation of the hardware input device (e.g., 704) is detected, the second operation is a fifth operation (e.g., subject selection and/or image capture)(e.g., a first type of default operation); and in accordance with a determination that a user interface of a second application (e.g., a camera application as in FIGS. 7A-7H), different from the first application, is being displayed when activation of the hardware input device (e.g., 704) is detected, the second operation is a sixth operation that is different from the fifth operation (e.g., a second type of default operation). In some embodiments, the default operation that is performed changes based on which application user interface is currently being displayed. In some embodiments, when a user interface of the first application (e.g., a translation application) is being displayed, the fifth operation is an operation to provide translations of various text in the field of view of the one or more cameras. In some embodiments, when a user interface of the second application (e.g., an image capturing application) is being displayed, the sixth operation is an operation to initiate capturing (or cease capturing) translations of the text. In some embodiments, when the application is in a state (e.g., the first state) in which the application is capturing images and/or videos, the third operation is an operation to cease capturing images and/or videos. In some embodiments, when the application is in a state (e.g., the second state) in which the application is not capturing images and/or videos, the fourth operation is an operation to initiate capturing images and/or videos. Performing different operations based on which application is displayed reduces the number of inputs needed to perform operations (e.g., user doesn't need to specify the operation as it is automatically selected based on the displayed application).

In some embodiments, the hardware input device (e.g., 704) is a physical button (e.g., a depressible button or a non-depressible button). In some embodiments, the physical button (a depressible button and/or a solid state button) is a physically (more than just visually) distinguished region of the computer system that is responsive to touch and/or pressure to perform an activation operation. In some embodiments, the areas directly adjacent to (e.g., surrounding) the physical button are not configured to detect touch and/or pressure. In some embodiments, the physical button is a solid state button. In some embodiments (e.g., for solid state buttons), in response to detecting activation of a physical button, the computer system provides tactile feedback (e.g., using a tactile feedback generator of the computer system) to indicate that activation of the physical button was detected. The hardware input device being a physical button enables different operations to be performed with input at the same input device without displaying additional controls. For example, detecting activation of the physical button will cause different operations to be performed depending on where the attention of the user is directed.

In some embodiments, the computer system is in communication with one or more cameras (e.g., a first camera and/or a second camera), wherein the user interface (e.g., 710) is a media capture user interface, and wherein the first operation is a capture, via the one or more cameras, of media (e.g., 722) (e.g., spatial media, an image, and/or a video). In some embodiments, the second operation is a capture, via the one or more cameras, of a second type of media (different from the media captured during the first operation). Capturing media when the computer system detects the user looking at the second portion reduces the number of inputs needed to capture an image and allows such functionality to be performed without the need to display additional controls.

In some embodiments, the user interface (e.g., 910) is a translation user interface, and wherein the first operation includes displaying, via the display generation component, a translation (e.g., 922A and/or 9223)(e.g., from one language to another) of one or more characters (e.g., one or more words, one or more symbol, and/or any other representation in a language). In some embodiments, the one or more characters are located at a portion of the corresponding to the operation that is executed. Translating characters based on where a user's attention is directed reduces the number of inputs needed to perform such functionality, without the need to display additional controls.

In some embodiments, before displaying the user interface (e.g., 710 at FIG. 73), the computer system (e.g., 700) detects, via the hardware input device (e.g., 704), user input of a first input type (e.g., 7503) (e.g., a finger resting on the hardware input device and/or a touch input without depressing the hardware input device), wherein the activation of the hardware input device is user input of a second input type (e.g., 750D) (e.g., depressing the hardware input device) that is different from the first input type. In some embodiments, the user interface is displayed in response to detecting the user input of the first input type (e.g., 750B). Performing different operations depending on a type of user input detected via the hardware input device enables efficient use of limited hardware input devices without the needs to display additional controls. In addition, displaying a user interface when the second input type of user input is detected allows for a user to be provided feedback about a state of the computer system with the second input type of input and then perform different operations based on the first input type of user input.

In some embodiments, aspects/operations of methods 800, 1000, and 1200 may be interchanged, substituted, and/or added between these methods. For example, the spatial media that is captured using the capture guide of method 800 can be displayed at locations corresponding to the location of a physical object, as in method 1200. For another example, the use of a user's gaze/attention for targeting as in method 1000 can be used for providing inputs of methods 800 and 1200.

FIGS. 11A-11E illustrate exemplary techniques for manipulating a virtual object, in accordance with some embodiments. FIG. 12 is a flow diagram of an exemplary process of manipulating a virtual object, in accordance with some embodiments. The user interfaces in FIGS. 11A-11E are used to illustrate the processes described below, including the processes in FIG. 12.

Figure 11A:
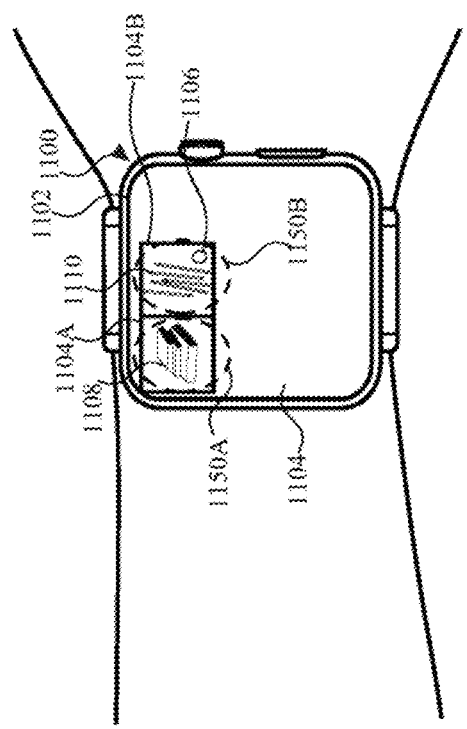
Figure 11D:
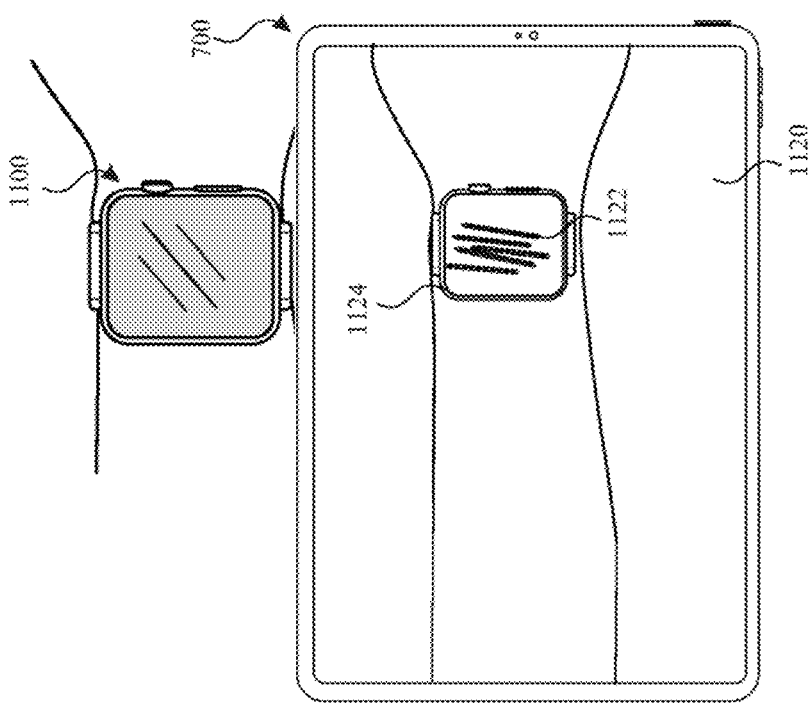
Figure 11C:
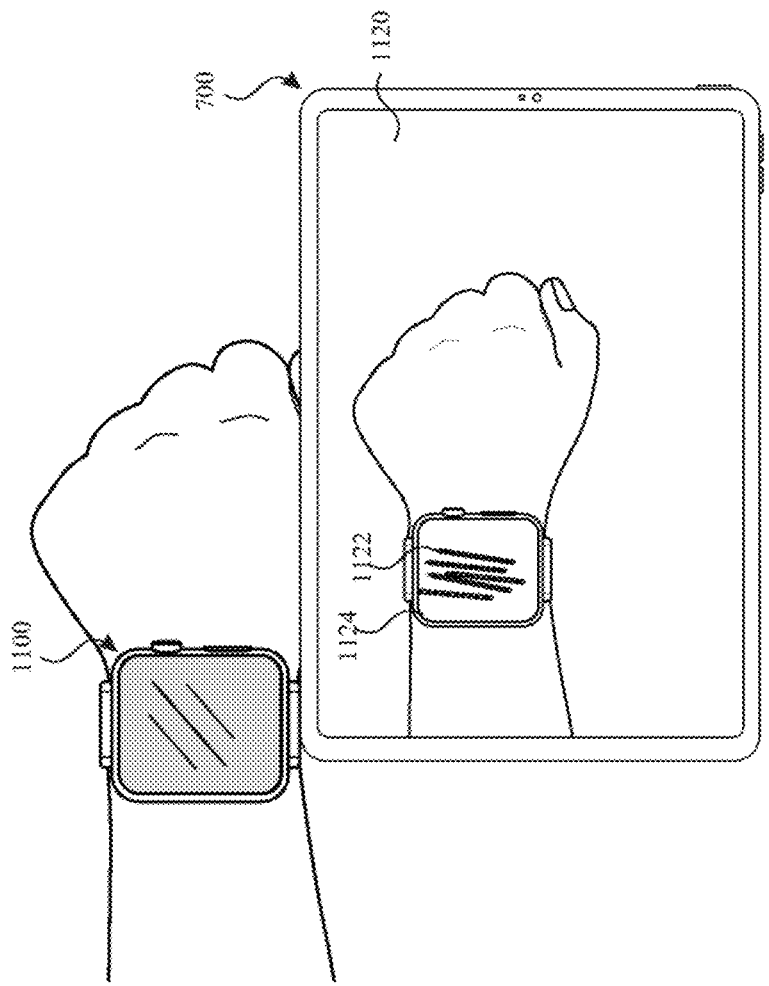
Figure 11E:
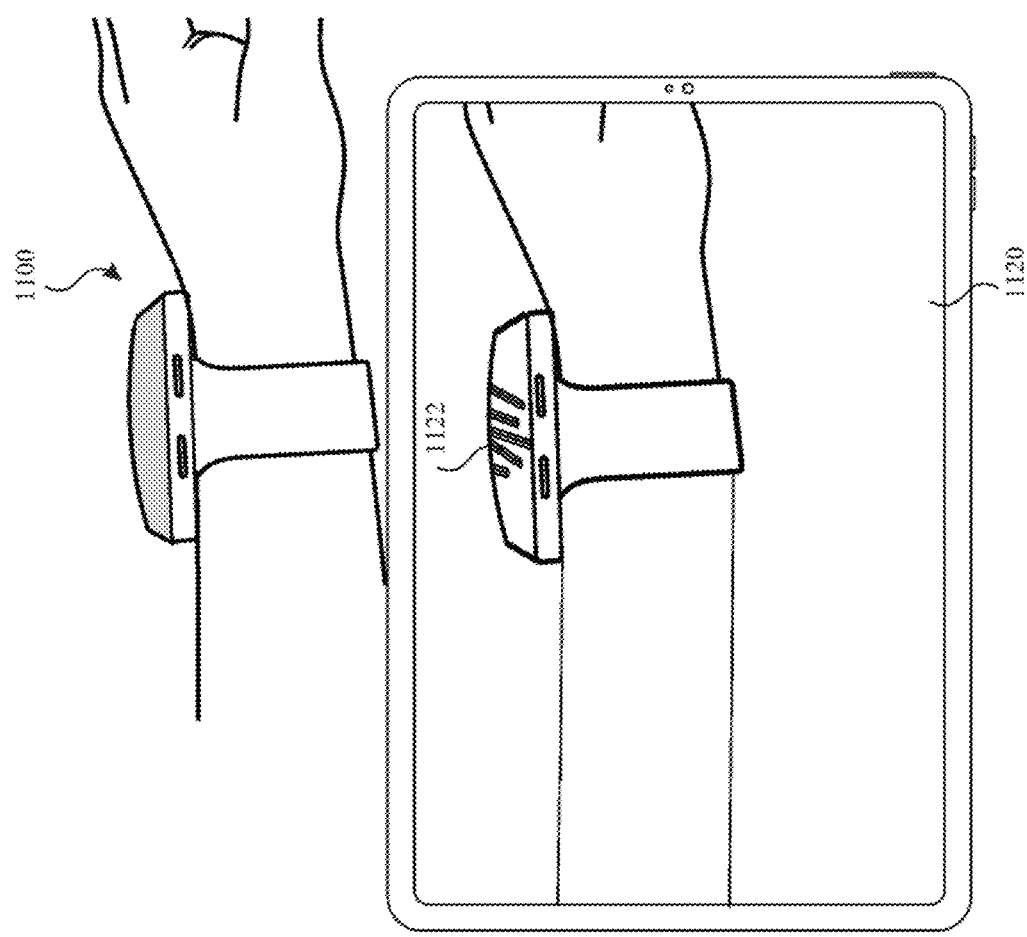
Figure 12:
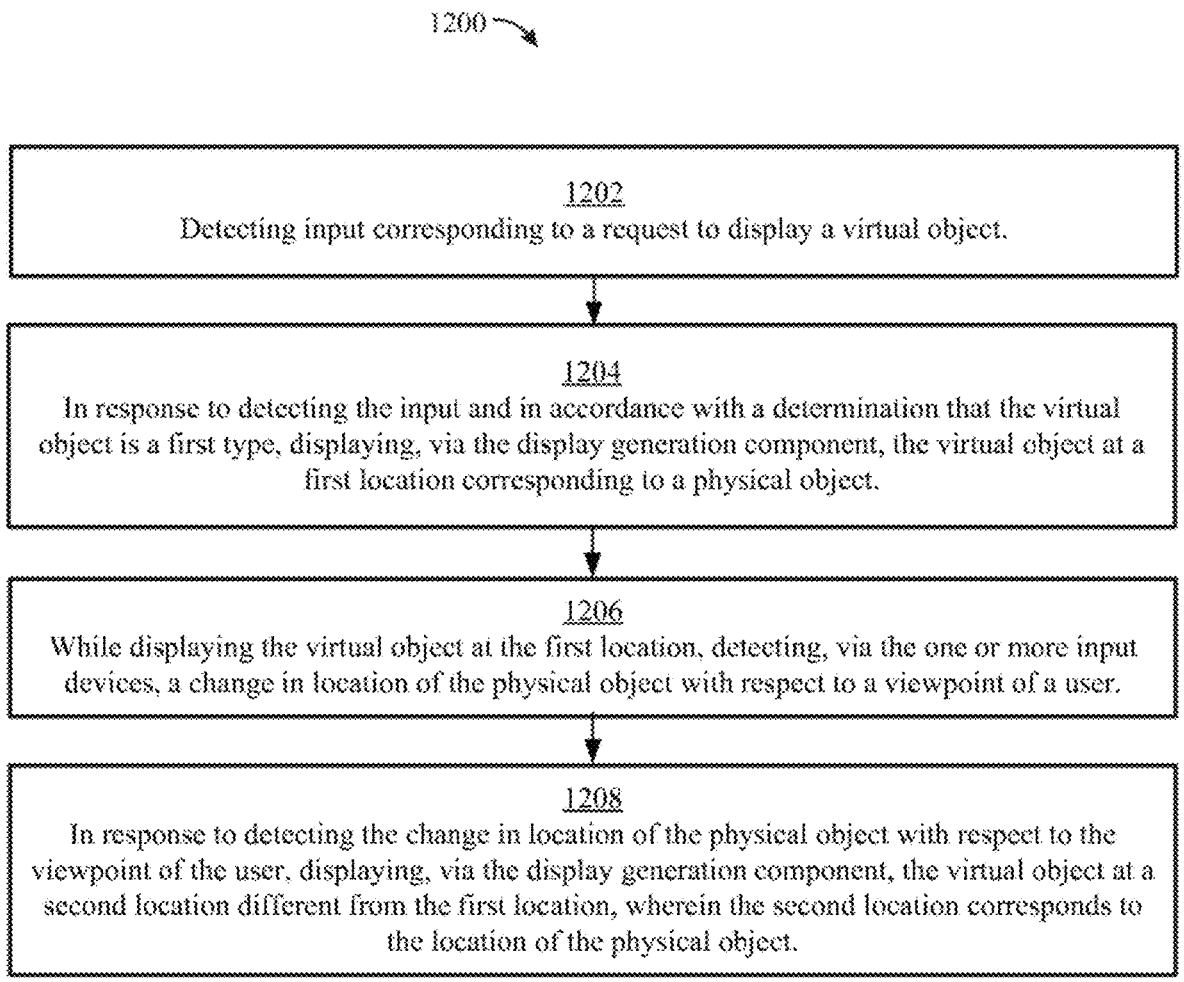
FIG. 12 is a flow diagram of methods of manipulating a virtual object, in accordance with various embodiments.

FIG. 11A illustrates a remote computer system 1100 that is separate/remote from computer system 700, which (for example) is illustrated in FIGS. 11C-11E. Although FIGS. 11C-11E illustrate techniques using computer system 700 that is a tablet, the techniques are optionally also applicable using a head-mounted device (e.g., using transparent/translucent displays and/or using pass-through video). In some embodiments, computer system 700 is configured to present virtual objects on one or more transparent or translucent displays, so that a person, using the system, perceives virtual objects superimposed over the physical environment. In some embodiments, computer system 700 is configured to use pass-through video, meaning one or more camera or image sensors capture images of the physical environment, and uses those images in presenting the AR environment on the opaque display. In some embodiments where computer system 700 is a head-mounted device, computer system 700 optionally includes two displays (one for each eye of the user of computer system 700), with each display displaying a different perspective of the same or similar content (e.g., an object and/or a field of view of a respective camera) to enable the user to perceive depth in the content.

Remote computer system 1100 has a display 1102 with a touch-sensitive surface. In some embodiments, remote computer system 1100 is a wearable device, such as a smartwatch, as illustrated in FIG. 11A. At FIG. 11A, remote computer system 1100 displays, via display 1102, a user interface 1104 of a photo album application. In some embodiments, remote computer system 1100 is not configured to display (e.g., is not capable of displaying) media (e.g., object, images, and/or videos) in a manor that a user can perceive depth within the displayed media. In some embodiments, remote computer system 1100 does not have a separate display for each eye of the user and/or does not have a first portion of a display for one eye of the user and a second portion of the display for the other eye of the user.

At FIG. 11A, user interface 1104 of the photo album application includes first representation 1104A of first media that includes books 1108 and second representation 1104B of second media that includes pencils 1110. Second representation 1104B includes spatial indication 1106 that indicates that second media that includes pencils 1110 is spatial media. First representation 1104A does not include a corresponding spatial indication because first media is not spatial media. At FIG. 11A, remote computer system 1100 receives user input (e.g., 1150A or 1150B) directed to a representation of media in user interface 1104 of the photo album application.

At FIG. 11B, in response to detecting user input 1150A (e.g., a tap input and/or a gesture) directed at first representation 1104A (and, optionally, in accordance with a determination that the user input is directed to a representation corresponding to media that is not spatial media), remote computer system 1100 displays, via display 1102, third representation 1112 (e.g., that is larger than first representation 1104A and/or without displaying a representation of the second media) of the first media that includes books 1108 (e.g., without sending information about the first media that includes books 1108 to computer system 700 and/or without transitioning display 1102 to a low contrast state (e.g., without dimming, without turning off, and/or without displaying a gray and/or black screen). In some embodiments, remote computer system 1100 does not change a view of the books 1108 based on a respective change between display 1102 and a viewpoint of the user (e.g., different parts of books 1108 are not revealed as the user moves and/or rotates remote computer system 1100).

In some embodiments, remote computer system 1100 receives user input corresponding to a request to display user interface 1104 of the photo album application, as illustrated in FIG. 11A, before receiving user input 1150B.

At FIG. 11A, remote computer system 1100 receives user input (e.g., 1150A or 1150B) directed to a representation of media in user interface 1104 of the photo album application. In response to detecting user input 1150B (e.g., a tap input and/or a gesture) directed at second representation 1104B (and, optionally, in accordance with a determination that the user input is directed to a representation corresponding to media that is spatial media), remote computer system 1100 sends information about the second media that includes pencils 1110 to computer system 700, transitions display 1102 to the low contrast state (e.g., dimming, turning off, and/or displaying a gray and/or black screen), and/or ceases displaying representations of the first media that includes books 1108 and the second media that includes pencils 1110, as shown in FIG. 11C.

At FIG. 11C, in response to receiving, from remote computer system 1100, information about the second media that includes pencils 1110, computer system 700 presents, via a display generation component (e.g., display 702), augmented reality environment 1120. In some embodiments, computer system 700 presents augmented reality environment 1120 in response to receiving user input at computer system 700 (in addition to and/or instead of receiving information about the second media that includes pencils 1110 from computer system 1100).

At FIG. 11C, augmented reality environment 1120 includes fourth representation 1122 of the second media that includes pencils 1110 that is overlaid on representation 1124 of display 1102 of remote computer system 1100. In some embodiments, representation 1122 of the second media is presented using pass-through video (e.g., representation 1124 is presented by capturing video of remote computer system 1100 via one or more cameras and displaying the video (e.g., in real time) via the display generation component (e.g., on display 702)). In some embodiments, representation 1122 of the second media is presented using one or more transparent or translucent displays (e.g., representation 1124 is presented to the user by enabling the user to see through the display generation component (e.g., display 702) to see remote computer system 1100).

As illustrated in FIGS. 11C-11E, representation 1122 of the second media that includes pencils 1110 is environment-locked to display 1102 of remote computer system 1100. At FIG. 11D, computer system 700 detects movement of remote computer system 1100 with respect to computer system 700 and, in response, updates display, via the display generation component (e.g., on display 702), of representation 1122 of the second media that includes pencils 1110 so that representation 1122 of the second media that includes pencils 1110 is displayed via the display generation component (e.g., on display 702) at a location that corresponds to the location of representation 1124 of display 1102 of remote computer system 1100 and at an orientation that is based on (and/or corresponds to) the orientation of display 1102 of remote computer system 1100 (e.g., to show a different perspective of pencils 1110 (e.g., by shifting and/or rotating the view of pencils 1110 in a first direction)). Accordingly, computer system 7M) allows the user to move remote computer system 1100 in the physical environment to see different perspectives of pencils 1110 via the display generation component (e.g., via display 702) of computer system 700.

At FIG. 11E, computer system 700 detects further movement of remote computer system 1100 with respect to computer system 700 and, in response, updates display, via the display generation component (e.g., on display 702), of representation 1122 of the second media that includes pencils 1110 so that representation 1122 of the second media that includes pencils 1110 is displayed via the display generation component (e.g., on display 702) at a location that corresponds to the location of representation 1124 of display 1102 of remote computer system 1100 and at an orientation that is based on (and/or corresponds to) the orientation of display 1102 of remote computer system 1100 (e.g., to show a different perspective of pencils 1110 (e.g., by shifting and/or rotating the view of pencils 1110 in a second direction). Accordingly, computer system 700 allows the user to move remote computer system 1100 in the physical environment to see different perspectives of pencils 1110 via the display generation component (e.g., via display 702) of computer system 700. In some embodiments, in response to computer system 700 detecting (e.g., via one or more camera sensors and/or via input received from remote computer system 1100) rotation (e.g., a first amount of rotation and/or in a first direction) of remote computer system 1100 about a first axis, computer system updates display, via the display generation component (e.g., on display 702), of representation 1122 of the second media by rotating (e.g., a second amount to rotation (same or different from the first amount of rotation)) representation 1122 of the second media by rotating (e.g., in the first direction) about the first axis.

Additional descriptions regarding FIGS. 11A-11E are provided below in reference to method 1200 described with respect to FIGS. 11A-11E.

FIG. 12 is a flow diagram of an exemplary method 1200 for manipulating a virtual object, in accordance with some embodiments. In some embodiments, method 1200 is performed at a computer system (e.g., computer system 101 in FIG. 1 and/or computer system 700) that is in communication with a display generation component (e.g., display generation component 120 in FIGS. 1, 3, and 4) (e.g., a heads-up display, a display 702, a touchscreen, a projector, etc.) and one or more input devices (e.g., a touchpad, a touch-sensitive display, one or more cameras, one or more eye-tracking components, and/or one or more hand-tracking components). In some embodiments, the display generation component is at least partially opaque. In some embodiments, the method 1200 is governed by instructions that are stored in a non-transitory (or transitory) computer-readable storage medium and that are executed by one or more processors of a computer system, such as the one or more processors 202 of computer system 101 (e.g., control 110 in FIG. 1). Some operations in method 1200 are, optionally, combined and/or the order of some operations is, optionally, changed.

The computer system (e.g., 700) detects (1202) input (e.g., received in response to 1150A at computer system 1100)(e.g., user input or an application request) corresponding to a request to display a virtual object. In some embodiments, the virtual object includes content stored by the computer system.

In response to detecting the input, in accordance with a determination that the virtual object is a first type, the computer system (e.g., 700) displays (1204), via the display generation component (e.g., 702), the virtual object (e.g., 1122) at a first location (e.g., as in FIG. 11C) corresponding to a physical object (e.g., computer system 1100)(e.g., a respective portion of the physical object, such as a surface of the physical object). In some embodiments, the first type includes content with spatial properties. In some embodiments, the first type includes content with a plurality of images, a first image corresponding to a first eye and a second image corresponding to a second eye different from the first eye. In some embodiments, the physical object is predefined before detecting the input. In some embodiments, in accordance with a determination that the virtual object is a second type, the virtual object is displayed irrespective of the physical object. In some embodiments, the virtual object of the first type is locked to the physical object. In some embodiments, the physical object is being held by the user. In some embodiments, the virtual object is displayed at the first location in accordance with a determination that the physical object is being held by a user. In some embodiments, in accordance with a determination that the virtual object is a second type, the virtual object is displayed by the physical object instead of the computer system.

While displaying the virtual object at the first location (e.g., as in FIG. 11C), the computer system (e.g., 700) detects (1206), via the one or more input devices, a change in location of the physical object (e.g., the respective portion of the physical object, such as the surface of the physical object) with respect to a viewpoint of a user. In some embodiments, the viewpoint of the user corresponds to an orientation of an input device (e.g., a camera, a touchpad, a touch-sensitive display, and/or an eye-tracking component) of the one or more input devices.

In response to detecting the change in location of the physical object (e.g., 1100) with respect to the viewpoint of the user, the computer system (e.g., 700) displays (1208), via the display generation component (e.g., 702), the virtual object at a second location (e.g., as in FIGS. 11D and/or 11E) different from the first location (e.g., as in FIG. 11C), wherein the second location corresponds to the location (e.g., the updated or changed location) of the physical object (e.g., 1100) (e.g., the respective portion of the physical object, such as the surface of the physical object). In some embodiments, the virtual object of the first type is displayed at the first location when the physical object and the viewpoint of the user both change such that there is no change in location of the physical object with respect to the viewpoint of the user. In some embodiments, the virtual object is moved to correspond to a location corresponding to the physical object such that the virtual object appears locked to the physical object. Displaying the virtual object at a location corresponding to the physical object enables the virtual object to be displayed at a location expected by a user without displaying additional controls. In addition, the virtual object following the location corresponding to the physical object allows the user to have an expected area to look for the virtual object rather than having to search for the virtual object.

In some embodiments, the change in location of the physical object (e.g., 1100) with respect to a viewpoint of a user is a change in spatial position of the physical object (e.g., 1100) in a physical space. Displaying the virtual object at a spatial location corresponding to the physical object enables the virtual object to be displayed at a location expected by a user without displaying additional controls. In addition, the virtual object following the spatial location corresponding to the physical object allows the user to have an expected area to look for the virtual object rather than having to search for the virtual object.

In some embodiments, while displaying the virtual object (e.g., 1122) at a first orientation (e.g., a first spatial orientation), the computer system (e.g., 700) detects, via the one or more input devices, a change in orientation (e.g., spatial orientation) of the physical object (e.g., the respective portion of the physical object, such as the surface of the physical object) with respect to the viewpoint of the user (e.g., as in FIG. 11E). In response to detecting the change in orientation of the physical object (e.g., 1100) with respect to the viewpoint of the user, the computer system (e.g., 700) displays, via the display generation component (e.g., 702), the virtual object (e.g., 1122) at a second orientation (e.g., as in FIG. 11E) (e.g., a second spatial orientation) that is different from the first orientation, wherein the second orientation corresponds to the orientation (e.g., the updated or changed orientation) of the physical object (e.g., the respective portion of the physical object, such as the surface of the physical object). In some embodiments, the virtual object of the first type is displayed at the first orientation when the physical object and the viewpoint of the user both change such that there is no change in orientation of the physical object with respect to the viewpoint of the user. In some embodiments, the virtual object is moved to correspond to an orientation corresponding to the physical object such that the virtual object appears locked to the physical object. Displaying the virtual object at an orientation corresponding to the physical object enables computer system to display different orientations of the virtual object without the need to display additional controls.

In some embodiments, the virtual object (e.g., 1122) of the first type is displayed using a first image displayed via a first display for a first eye of the user and a second image displayed via a second display, different from the first display, for a second eye of the user. Displaying the virtual object of the first type to appear as if it is being displayed by the physical object enables the computer system to display properties of the virtual object (e.g., different orientations) on a device that would not normally be able to show such properties (assuming that the physical object is a two-dimensional display). The computer system is able to display two images at the same time and allow for a user to view the images in a way that the virtual object is properly displayed in 3D space (e.g., view the multiple images as if they are a single image), a situation that may not be possible on a single two-dimensional display.

In some embodiments, the virtual object of the first type (e.g., a virtual object with one or more spatial properties) is based on a capture of spatial media (e.g., as in FIGS. 7E-7F)(e.g., spatial visual media, such as a spatial image and/or a spatial video). In some embodiments, a spatial capture is a capture of spatial media. In some embodiments, the spatial capture includes 3D imaging of multiple perspectives of the object (e.g., such that the object can be rotated and/or moved to see different sides of the object). The virtual object being a spatial capture that is displayed as if locked to the physical object allows the computer system to provide the user with information about where to look for the virtual object and to receive inputs to manipulate the position and/or orientation of the virtual object by detecting a change in the user's viewpoint relative to the physical object.

In some embodiments, the input corresponding to the request to display the virtual object is received from a remote device (e.g., remote computer system 1100) with a second display generation component (e.g., 1102) that is different from the display generation component (e.g., 702), and wherein the request to display the virtual object corresponds to user input (e.g., 1150B), detected via the remote device (e.g., 1100) (e.g., corresponding to selection of the virtual object). Having selection of the virtual object occur on a remote device allows for the remote device to control where and what device should display the virtual object (e.g., the remote device can cause the virtual object to be displayed on a device that is able to display the virtual object's properties).

In some embodiments, the physical object is the remote device (e.g., 1100). The physical object being the device that detects selection of the virtual object allows for the remote device to already be the device that a user's attention is directed and so reduces time for which the user must look for where the virtual object is being displayed.

In some embodiments, a display screen (e.g., 1102) of the remote device (e.g., 1100) is configured to be in a low-contrast state while displaying the virtual object (e.g., 1122). In some embodiments, the remote device transitions to the low-contrast state in response to the input. In some embodiments, the display screen of the remote device ceases to be in the low-contrast state after display of the virtual object has ceased (e.g., the computer system indicates to the remote device that the display of the virtual object has ceased and the remote device ceases to operate in the low-contrast state). Configuring the screen of the remote device to be in a low-contrast state while displaying the virtual object allows for the virtual object to be displayed without content displayed by the remote device interfering.

In some embodiments, the low-contrast state is an off state or a state of displaying only a single color (e.g., black or gray) (e.g., as in FIGS. 11C-11E). The low-contrast state being in an off state or a state displaying only a single color further reduces the chances that display of the virtual object will be interfered by what is on the screen of the remote device.

In some embodiments, before displaying the virtual object (e.g., 1122) via the display generation component (e.g., 702), the computer system (e.g., 700) displays, via the second display generation component of the remote device (e.g., 1100), a media item (e.g., 1112) other than the virtual object (e.g., 1122) (e.g., without help from the computer system). Displaying different items by different devices allows the system to take advantage of display components of the different devices, such as by displaying particular items with display components that are able to display particular properties of the particular items.

In some embodiments, while displaying a first portion of the virtual object (e.g., without displaying a second portion of the virtual object), the computer system (e.g., 700) detects, via the one or more input devices, a change in orientation of the physical object (e.g., the remote device or an object other than the remote device) with respect to the viewpoint of a user (e.g., as in the change in orientation between FIGS. 11D and 11E). In response to detecting the change in orientation of the physical object with respect to the viewpoint of the user, the computer system (e.g., 700) displays, via the display generation component (e.g., 702), a second portion of the virtual object (e.g., ends of pencils 1122 as in FIG. 11E) that is different from the first portion of the virtual object (e.g., sides of pencils 1122 as in FIG. 11D), wherein the second portion of the virtual object is not displayed while displaying the first portion of the virtual object. Displaying different portions of the virtual object as the orientation of the physical object changes allows a user to view such portions without the need for the computer system to display additional controls and provides the computer system with a quick and efficient technique for displaying the various parts of the virtual object.

In some embodiments, aspects/operations of methods 800, 1000, and 1200 may be interchanged, substituted, and/or added between these methods. For example, the spatial media that is captured using the capture guide of method 800 can be displayed at locations corresponding to the location of a physical object, as in method 1200. For another example, the use of a user's gaze/attention for targeting as in method 1000 can be used for providing inputs of methods 800 and 1200.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can generated by inferring preferences based on non-personal information data or a bare minimum amount of personal information, such as the content being requested by the device associated with a user, other non-personal information available to the service, or publicly available information.

What is claimed is:

1. A computer system configured to communicate with a display generation component, one or more input devices, a first camera, and a second camera, the computer system comprising:
   one or more processors; and
   memory storing one or more programs configured to be executed by the one or more processors, the one or more programs including instructions for:
      displaying, via the display generation component, a media capture user interface for capturing stereoscopic media that combines image information captured by the first camera and the second camera during a same time period, including a capture guide with a first portion of the capture guide and a second portion of the capture guide, wherein the first portion of the capture guide has a first appearance and the second portion of the capture guide has a second appearance; and
      while displaying the media capture user interface including the capture guide:
         in accordance with a determination that an orientation of an axis between the first camera and the second camera has changed in a first manner relative to a physical environment, changing a position of the first portion of the capture guide relative to the second portion of the capture guide to indicate a change in orientation of the axis between the first camera and the second camera relative to the physical environment, wherein the changing includes changing an appearance of the first portion of the capture guide to have a same orientation relative to the physical environment before and after the change in the orientation of the axis between the first camera and the second camera relative to the physical environment; and
         in accordance with a determination that the orientation of the axis between the first camera and the second camera has not changed in the first manner relative to the physical environment, maintaining the position of the first portion of the capture guide relative to the second portion of the capture guide.

2. The computer system of claim 1, wherein changing the appearance of the first portion of the capture guide to have the same orientation relative to the physical environment before and after the change in the orientation of the axis between the first camera and the second camera relative to the physical environment includes changing the appearance of the first portion of the capture guide to have the same orientation relative to a horizon of the physical environment before and after the change in the orientation of the axis between the first camera and the second camera relative to the physical environment.

3. The computer system of claim 1, wherein the change in orientation of the axis between the first camera and the second camera relative to the physical environment is based on a change in an orientation of the computer system.

4. The computer system of claim 1, the one or more programs further including instructions for:
   while displaying the media capture user interface including the capture guide:
      in accordance with a determination that the orientation of the axis between the first camera and the second camera has changed in a second manner relative to the physical environment that is different from the first manner relative to the physical environment, maintaining the position of the first portion of the capture guide relative to the second portion of the capture guide.

5. The computer system of claim 1, the one or more programs further including instructions for:
   while displaying the media capture user interface including the capture guide:
      detecting movement of the computer system; and
      in response to detecting movement of the computer system, changing display positions of the first portion of the capture guide and the second portion of the capture guide.

6. The computer system of claim 1, wherein displaying the media capture user interface includes displaying a media capture affordance, and the one or more programs further including instructions for:
   while displaying the media capture user interface, detecting input selecting the media capture affordance; and
   in response to detecting input selecting the media capture affordance, capturing media.

7. The computer system of claim 1, the one or more programs further including instructions for:
   while displaying the media capture user interface including the capture guide, capturing media of contents in a field of view of the first camera and the second camera.

8. The computer system of claim 7, wherein the captured media is spatial media.

9. The computer system of claim 1, the one or more programs further including instructions for:
   detecting a change in a field of view of the first camera and/or the second camera that occurs at a first speed and in a first direction; and
   in response to detecting the change in the field of view, shifting a display position, via the display generation component, of one or more portions of the capture guide in a second direction that is based on the first direction and at a second speed that is different from the first speed.

10. The computer system of claim 9, wherein the one or more portions of the capture guide includes the second portion of the capture guide.

11. The computer system of claim 10, wherein the second portion includes display of media captured by at least one of the first camera and the second camera.

12. The computer system of claim 9, wherein the one or more portions of the capture guide includes the first portion.

13. The computer system of claim 1, wherein a portion of the capture guide is displayed to appear at a depth corresponding to a target subject within a field of view of the first camera and/or the second camera.

14. The computer system of claim 1, wherein a portion of the capture guide is world-locked to a target subject within a field of view of at least one camera of the computer system.

15. The computer system of claim 1, wherein the computer system is in communication with a hardware input device, and the one or more programs further including instructions for:
  detecting, via the hardware input device, a user input; and
  in response to detecting the user input via the hardware input device:
    in accordance with a determination that the user input is of a first type, displaying, via the display generation component, the capture guide with the first portion and the second portion.

16. The computer system of claim 15, the one or more programs further including instructions for:
  in response to detecting the user input via the hardware input device:
in accordance with a determination that the user input is of a second type that is different from the first type, capturing media in a field of view of the first camera and/or the second camera.

17. A non-transitory computer-readable storage medium storing one or more programs configured to be executed by one or more processors of a computer system that is in communication with a display generation component, one or more input devices, a first camera, and a second camera, the one or more programs including instructions for:
  displaying, via the display generation component, a media capture user interface for capturing stereoscopic media that combines image information captured by the first camera and the second camera during a same time period, including a capture guide with a first portion of the capture guide and a second portion of the capture guide, wherein the first portion of the capture guide has a first appearance and the second portion of the capture guide has a second appearance; and
  while displaying the media capture user interface including the capture guide:
    in accordance with a determination that an orientation of an axis between the first camera and the second camera has changed in a first manner relative to a physical environment, changing a position of the first portion of the capture guide relative to the second portion of the capture guide to indicate a change in orientation of the axis between the first camera and the second camera relative to the physical environment, wherein the changing includes changing an appearance of the first portion of the capture guide to have a same orientation relative to the physical environment before and after the change in the orientation of the axis between the first camera and the second camera relative to the physical environment; and
    in accordance with a determination that the orientation of the axis between the first camera and the second camera has not changed in the first manner relative to the physical environment, maintaining the position of the first portion of the capture guide relative to the second portion of the capture guide.

18. The non-transitory computer-readable storage medium of claim 17, wherein changing the appearance of the first portion of the capture guide to have the same orientation relative to the physical environment before and after the change in the orientation of the axis between the first camera and the second camera relative to the physical environment includes changing the appearance of the first portion of the capture guide to have the same orientation relative to a horizon of the physical environment before and after the change in the orientation of the axis between the first camera and the second camera relative to the physical environment.

19. The non-transitory computer-readable storage medium of claim 17, wherein the change in orientation of the axis between the first camera and the second camera relative to the physical environment is based on a change in an orientation of the computer system.

20. The non-transitory computer-readable storage medium of claim 17, the one or more programs further including instructions for:
  while displaying the media capture user interface including the capture guide:
    in accordance with a determination that the orientation of the axis between the first camera and the second camera has changed in a second manner relative to the physical environment that is different from the first manner relative to the physical environment, maintaining the position of the first portion of the capture guide relative to the second portion of the capture guide.

21. The non-transitory computer-readable storage medium of claim 17, the one or more programs further including instructions for:
  while displaying the media capture user interface including the capture guide:
    detecting movement of the computer system; and
    in response to detecting movement of the computer system, changing display positions of the first portion of the capture guide and the second portion of the capture guide.

22. The non-transitory computer-readable storage medium of claim 17, wherein displaying the media capture user interface includes displaying a media capture affordance, and the one or more programs further including instructions for:
  while displaying the media capture user interface, detecting input selecting the media capture affordance; and
  in response to detecting input selecting the media capture affordance, capturing media.

23. The non-transitory computer-readable storage medium of claim 17, the one or more programs further including instructions for:
  while displaying the media capture user interface including the capture guide, capturing media of contents in a field of view of the first camera and the second camera.

24. The non-transitory computer-readable storage medium of claim 23, wherein the captured media is spatial media.

25. The non-transitory computer-readable storage medium of claim 17, the one or more programs further including instructions for:
   detecting a change in a field of view of the first camera and/or the second camera that occurs at a first speed and in a first direction; and
   in response to detecting the change in the field of view, shifting a display position, via the display generation component, of one or more portions of the capture guide in a second direction that is based on the first direction and at a second speed that is different from the first speed.

26. The non-transitory computer-readable storage medium of claim 25, wherein the one or more portions of the capture guide includes the second portion of the capture guide.

27. The non-transitory computer-readable storage medium of claim 26, wherein the second portion includes display of media captured by at least one of the first camera and the second camera.

28. The non-transitory computer-readable storage medium of claim 25, wherein the one or more portions of the capture guide includes the first portion.

29. The non-transitory computer-readable storage medium of claim 17, wherein a portion of the capture guide is displayed to appear at a depth corresponding to a target subject within a field of view of the first camera and/or the second camera.

30. The non-transitory computer-readable storage medium of claim 17, wherein a portion of the capture guide is world-locked to a target subject within a field of view of at least one camera of the computer system.

31. The non-transitory computer-readable storage medium of claim 17, wherein the computer system is in communication with a hardware input device, and the one or more programs further including instructions for:
   detecting, via the hardware input device, a user input; and
   in response to detecting the user input via the hardware input device:
      in accordance with a determination that the user input is of a first type, displaying, via the display generation component, the capture guide with the first portion and the second portion.

32. The non-transitory computer-readable storage medium of claim 31, the one or more programs further including instructions for:
   in response to detecting the user input via the hardware input device:
in accordance with a determination that the user input is of a second type that is different from the first type, capturing media in a field of view of the first camera and/or the second camera.

33. A method, comprising:
   at a computer system that is in communication with a display generation component, one or more input devices, a first camera, and a second camera:
      displaying, via the display generation component, a media capture user interface for capturing stereoscopic media that combines image information captured by the first camera and the second camera during a same time period, including a capture guide with a first portion of the capture guide and a second portion of the capture guide, wherein the first portion of the capture guide has a first appearance and the second portion of the capture guide has a second appearance; and
      while displaying the media capture user interface including the capture guide:
         in accordance with a determination that an orientation of an axis between the first camera and the second camera has changed in a first manner relative to a physical environment, changing a position of the first portion of the capture guide relative to the second portion of the capture guide to indicate a change in orientation of the axis between the first camera and the second camera relative to the physical environment, wherein the changing includes changing an appearance of the first portion of the capture guide to have a same orientation relative to the physical environment before and after the change in the orientation of the axis between the first camera and the second camera relative to the physical environment; and
         in accordance with a determination that the orientation of the axis between the first camera and the second camera has not changed in the first manner relative to the physical environment, maintaining the position of the first portion of the capture guide relative to the second portion of the capture guide.

34. The method of claim 33, wherein changing the appearance of the first portion of the capture guide to have the same orientation relative to the physical environment before and after the change in the orientation of the axis between the first camera and the second camera relative to the physical environment includes changing the appearance of the first portion of the capture guide to have the same orientation relative to a horizon of the physical environment before and after the change in the orientation of the axis between the first camera and the second camera relative to the physical environment.

35. The method of claim 33, wherein the change in orientation of the axis between the first camera and the second camera relative to the physical environment is based on a change in an orientation of the computer system.

36. The method of claim 33, further comprising:
   while displaying the media capture user interface including the capture guide:
      in accordance with a determination that the orientation of the axis between the first camera and the second camera has changed in a second manner relative to the physical environment that is different from the first manner relative to the physical environment, maintaining the position of the first portion of the capture guide relative to the second portion of the capture guide.

37. The method of claim 33, further comprising:
   while displaying the media capture user interface including the capture guide:
      detecting movement of the computer system; and
      in response to detecting movement of the computer system, changing display positions of the first portion of the capture guide and the second portion of the capture guide.

38. The method of claim 33, wherein displaying the media capture user interface includes displaying a media capture affordance, and the method further comprising:
   while displaying the media capture user interface, detecting input selecting the media capture affordance; and
   in response to detecting input selecting the media capture affordance, capturing media.

39. The method of claim 33, further comprising:
while displaying the media capture user interface including the capture guide, capturing media of contents in a field of view of the first camera and the second camera.

40. The method of claim 39, wherein the captured media is spatial media.

41. The method of claim 33, further comprising:
detecting a change in a field of view of the first camera and/or the second camera that occurs at a first speed and in a first direction; and
in response to detecting the change in the field of view, shifting a display position, via the display generation component, of one or more portions of the capture guide in a second direction that is based on the first direction and at a second speed that is different from the first speed.

42. The method of claim 41, wherein the one or more portions of the capture guide includes the second portion of the capture guide.

43. The method of claim 42, wherein the second portion includes display of media captured by at least one of the first camera and the second camera.

44. The method of claim 41, wherein the one or more portions of the capture guide includes the first portion.

45. The method of claim 33, wherein a portion of the capture guide is displayed to appear at a depth corresponding to a target subject within a field of view of the first camera and/or the second camera.

46. The method of claim 33, wherein a portion of the capture guide is world-locked to a target subject within a field of view of at least one camera of the computer system.

47. The method of claim 33, wherein the computer system is in communication with a hardware input device, and the method further comprising:
detecting, via the hardware input device, a user input; and
in response to detecting the user input via the hardware input device:
in accordance with a determination that the user input is of a first type, displaying, via the display generation component, the capture guide with the first portion and the second portion.

48. The method of claim 47, further comprising:
in response to detecting the user input via the hardware input device:
in accordance with a determination that the user input is of a second type that is different from the first type, capturing media in a field of view of the first camera and/or the second camera.

* * * * *